US012645200B2

(12) United States Patent
Yang

(10) Patent No.: US 12,645,200 B2
(45) Date of Patent: Jun. 2, 2026

(54) SYSTEMS AND METHODS FOR ADMINISTERING A 3D-PRINTING-BASED MANUFACTURING PROCESS

(71) Applicant: Gantri, Inc., San Leandro, CA (US)

(72) Inventor: Yi Yang, San Francisco, CA (US)

(73) Assignee: Gantri, Inc., San Leandro, CA (US)

(*) Notice: Subject to any disclaimer, the term of this patent is extended or adjusted under 35 U.S.C. 154(b) by 403 days.

(21) Appl. No.: 18/350,950

(22) Filed: Jul. 12, 2023

(65) Prior Publication Data

US 2024/0027996 A1 Jan. 25, 2024

Related U.S. Application Data

(60) Provisional application No. 63/369,296, filed on Jul. 25, 2022.

(51) Int. Cl.
*G05B 19/4099* (2006.01)

(52) U.S. Cl.
CPC .................... *G05B 19/4099* (2013.01); *G05B 2219/49023* (2013.01)

(58) Field of Classification Search
None
See application file for complete search history.

(56) References Cited

U.S. PATENT DOCUMENTS

| | | |
|---|---|---|
| 5,433,416 A | 7/1995 | Johnson |
| 6,371,424 B1 | 4/2002 | Shaw |

| | | |
|---|---|---|
| D474,161 S | 5/2003 | Mansson et al. |
| 6,824,028 B2 | 11/2004 | Mutai et al. |
| D578,069 S | 10/2008 | Chen et al. |
| 8,155,943 B2 | 4/2012 | Nasle |
| 9,332,615 B1 | 5/2016 | Peng |
| 9,456,479 B1 | 9/2016 | Peng |

(Continued)

FOREIGN PATENT DOCUMENTS

| | | |
|---|---|---|
| CN | 105034391 | 11/2015 |
| CN | 205989515 | 3/2017 |

(Continued)

OTHER PUBLICATIONS

Hoy, Brandon, "Design and Implementation of a Three-Dimensional Printer using a Cylindrical Printing Process" Student Report, 2016.

(Continued)

*Primary Examiner* — Jason Lin
(74) *Attorney, Agent, or Firm* — Levine Bagade Han LLP

(57) ABSTRACT

Disclosed are methods and systems for administering or managing a 3D-printing-based manufacturing process. The methods and systems can be tailored or optimized for administering or managing a 3D-printing-based manufacturing process where the products are made on demand for customers in response to orders received via an online retail website. In one embodiment, a method comprises generating a stock identifier used to identify a product during and after manufacturing, creating a plurality of jobs to be undertaken to manufacture the product, assigning a job status to each of the plurality of jobs associated with the stock identifier, and assigning the jobs associated with the stock identifier to various 3D printers and workers.

19 Claims, 14 Drawing Sheets

(56) References Cited

U.S. PATENT DOCUMENTS

| | | | |
|---|---|---|---|
| D783,544 S | 4/2017 | Peng | |
| 10,138,917 B2 | 11/2018 | Koch | |
| D868,609 S | 12/2019 | Wang | |
| D883,832 S | 5/2020 | Wang | |
| D892,045 S | 8/2020 | Zhng | |
| D910,580 S | 2/2021 | Zhu | |
| D932,427 S | 10/2021 | Schoeck et al. | |
| D933,597 S | 10/2021 | Natsume et al. | |
| D936,579 S | 11/2021 | Wang et al. | |
| 11,215,319 B2 | 1/2022 | Yang et al. | |
| D973,602 S | 12/2022 | Yang et al. | |
| 11,698,164 B2 | 7/2023 | Yang et al. | |
| 2005/0243365 A1* | 11/2005 | Noda | H04N 1/32502 |
| | | | 358/1.15 |
| 2006/0038097 A1 | 2/2006 | Diller | |
| 2008/0042321 A1 | 2/2008 | Russell et al. | |
| 2008/0294501 A1* | 11/2008 | Rennich | G06Q 30/0201 |
| | | | 705/7.29 |
| 2009/0299882 A1* | 12/2009 | Erickson | G06Q 10/087 |
| | | | 705/28 |
| 2009/0327335 A1 | 12/2009 | Wahab et al. | |
| 2010/0254757 A1 | 10/2010 | Saul | |
| 2011/0146163 A1 | 6/2011 | Naroditsky et al. | |
| 2014/0095588 A1* | 4/2014 | Gowen | G06F 3/1242 |
| | | | 709/203 |
| 2015/0035198 A1 | 2/2015 | Saba et al. | |
| 2015/0272367 A1 | 10/2015 | Casey | |
| 2015/0273768 A1 | 10/2015 | Alchemy | |
| 2015/0286724 A1 | 10/2015 | Knaapen et al. | |
| 2016/0144564 A1 | 5/2016 | Padgett et al. | |
| 2016/0339634 A1 | 11/2016 | Fuller | |
| 2017/0038015 A1 | 2/2017 | Lunz et al. | |
| 2017/0140884 A1 | 5/2017 | Peng | |
| 2017/0248937 A1 | 8/2017 | Guimbretiere et al. | |
| 2018/0036941 A1 | 2/2018 | Xu et al. | |
| 2018/0129192 A1* | 5/2018 | Murakami | G06Q 10/1091 |
| 2018/0215092 A1 | 8/2018 | Dudley et al. | |
| 2018/0218296 A1* | 8/2018 | Feiten | G06Q 10/0633 |
| 2019/0102815 A1* | 4/2019 | Norman | G06Q 30/06 |
| 2020/0184125 A1 | 6/2020 | Machalica | |
| 2020/0340647 A1 | 10/2020 | Gielen et al. | |
| 2020/0397542 A1 | 12/2020 | Andersen et al. | |
| 2021/0241472 A1 | 8/2021 | Yokoyama et al. | |
| 2021/0372559 A1 | 12/2021 | Yang et al. | |
| 2022/0005107 A1* | 1/2022 | Kentris | G06Q 10/0837 |
| 2022/0072781 A1 | 3/2022 | Taylor et al. | |
| 2022/0082205 A1 | 3/2022 | Yang et al. | |
| 2022/0308552 A1 | 9/2022 | Yang | |

FOREIGN PATENT DOCUMENTS

| | | |
|---|---|---|
| WO | WO 2017/080951 | 5/2017 |
| WO | WO 2018/188988 | 10/2018 |
| WO | WO 2021/025939 | 2/2021 |
| WO | WO 2024/026208 | 2/2024 |

OTHER PUBLICATIONS

Axxess, Date: Jan. 9, 2021, [online], [site visited Jul. 14, 2022]. URL: https://www.axxind.com/smarthome/lamp-dimmer/ (Year:2021). Creative, Date: May 25, 2021, [online], [site vistited Jul. 14, 2022]. URL: https://www.creative-cables.us/dimmer/16624-white-inline-dimmer-switch-8057730721622.html (Year: 2021).

* cited by examiner

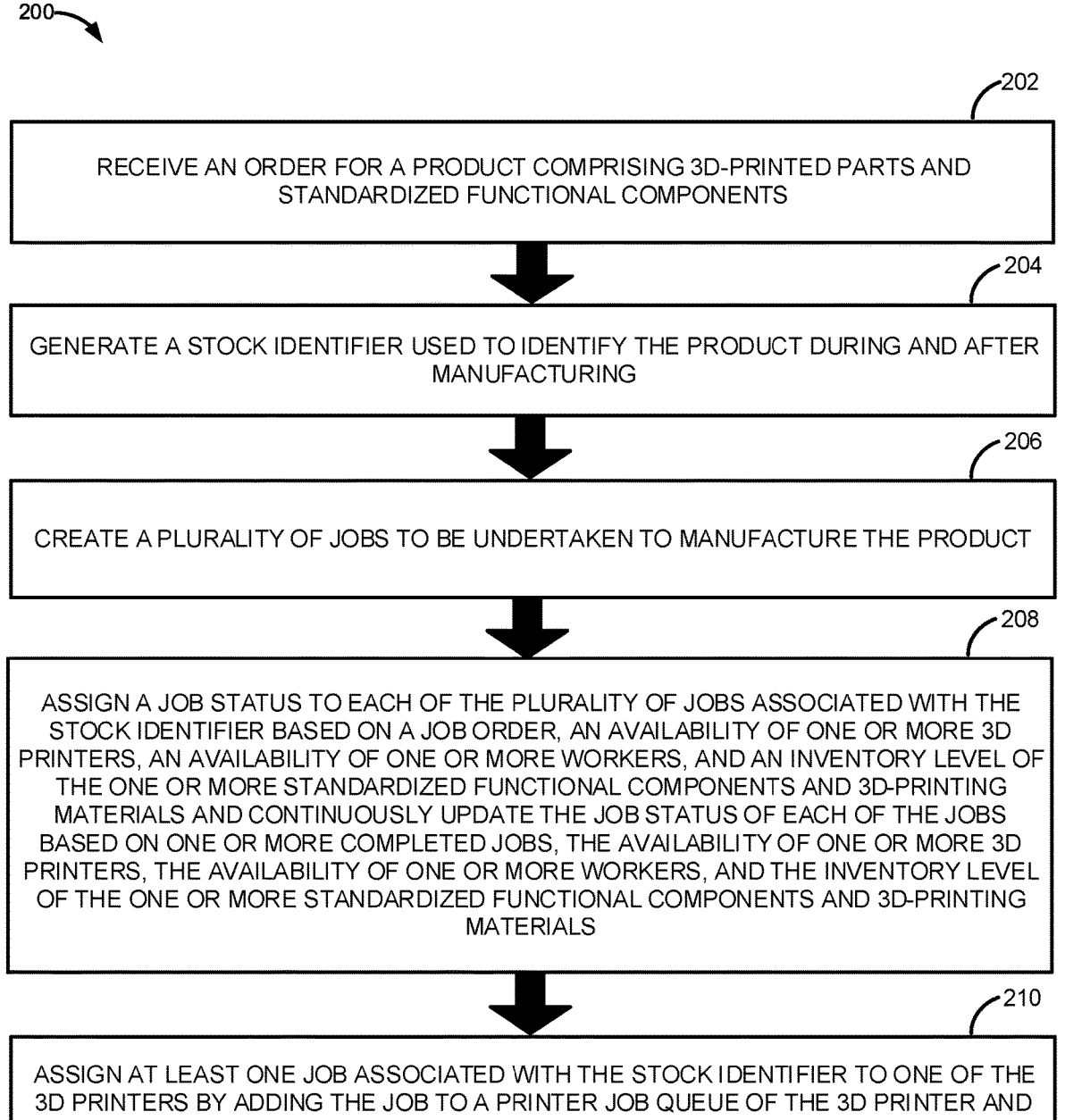

200

202

RECEIVE AN ORDER FOR A PRODUCT COMPRISING 3D-PRINTED PARTS AND STANDARDIZED FUNCTIONAL COMPONENTS

204

GENERATE A STOCK IDENTIFIER USED TO IDENTIFY THE PRODUCT DURING AND AFTER MANUFACTURING

206

CREATE A PLURALITY OF JOBS TO BE UNDERTAKEN TO MANUFACTURE THE PRODUCT

208

ASSIGN A JOB STATUS TO EACH OF THE PLURALITY OF JOBS ASSOCIATED WITH THE STOCK IDENTIFIER BASED ON A JOB ORDER, AN AVAILABILITY OF ONE OR MORE 3D PRINTERS, AN AVAILABILITY OF ONE OR MORE WORKERS, AND AN INVENTORY LEVEL OF THE ONE OR MORE STANDARDIZED FUNCTIONAL COMPONENTS AND 3D-PRINTING MATERIALS AND CONTINUOUSLY UPDATE THE JOB STATUS OF EACH OF THE JOBS BASED ON ONE OR MORE COMPLETED JOBS, THE AVAILABILITY OF ONE OR MORE 3D PRINTERS, THE AVAILABILITY OF ONE OR MORE WORKERS, AND THE INVENTORY LEVEL OF THE ONE OR MORE STANDARDIZED FUNCTIONAL COMPONENTS AND 3D-PRINTING MATERIALS

210

ASSIGN AT LEAST ONE JOB ASSOCIATED WITH THE STOCK IDENTIFIER TO ONE OF THE 3D PRINTERS BY ADDING THE JOB TO A PRINTER JOB QUEUE OF THE 3D PRINTER AND ASSIGN AT LEAST ANOTHER JOB ASSOCIATED WITH THE STOCK IDENTIFIER TO ONE OF THE WORKERS BY ADDING THE OTHER JOB TO A WORKER JOB QUEUE OF THE WORKER

FIG. 2

PRODUCT 302

SOCKET
HODLER 422

LIGHT SOCKET 420

LIGHT EMITTING
COMPONENT 418

STANDARDIZED
FUNCTIONAL
COMPONENT 402

SHADE
404

LIGHT
DIFFUSER
406

RODS 424

434

3D-PRINTED
PARTS 400

LIGHT BASE
408

BASE CAP 410

WEIGHT RETAINER
412

WEIGHTS 426

ROD CONNECTORS 428

ROD SECUREMENT
FLANGES 430

WEIGHT CAVITY
414

BASE PLATE 416

RUBBER PADS 432

906—

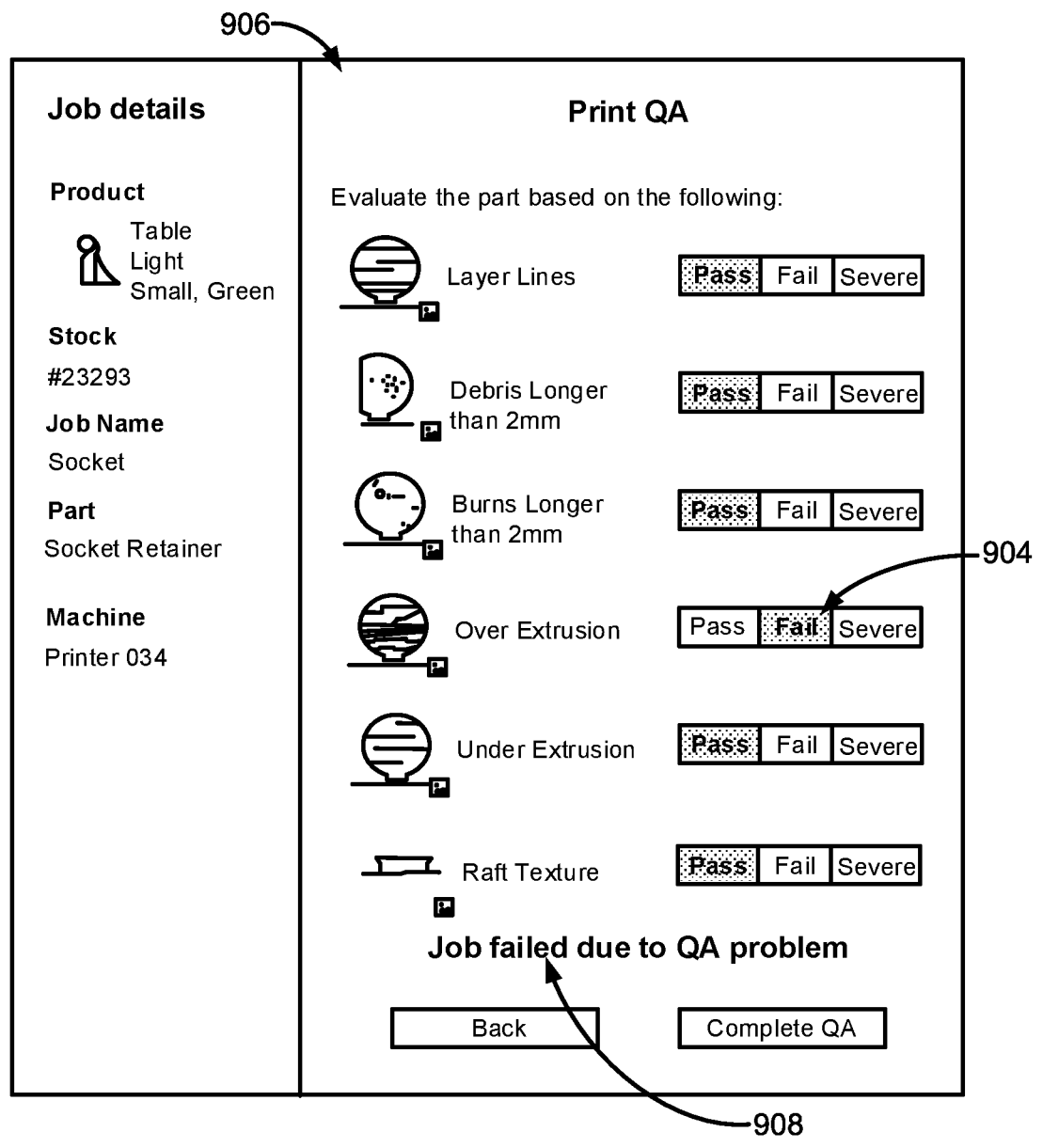

Job details

Product

Table
Light
Small, Green

Stock

23293

Job Name

Socket

Part

Socket Retainer

Machine

Printer 034

Print QA

Evaluate the part based on the following:

Layer Lines — | Pass | Fail | Severe |

Debris Longer than 2mm — | Pass | Fail | Severe |

Burns Longer than 2mm — | Pass | Fail | Severe |

Over Extrusion — | Pass | Fail | Severe | —904

Under Extrusion — | Pass | Fail | Severe |

Raft Texture — | Pass | Fail | Severe |

Job failed due to QA problem

| Back |      | Complete QA |

SYSTEMS AND METHODS FOR ADMINISTERING A 3D-PRINTING-BASED MANUFACTURING PROCESS

CROSS-REFERENCE TO RELATED APPLICATION

This application claims the benefit of U.S. Provisional Application No. 63/369,296, filed on Jul. 25, 2022, the content of which is incorporated herein by reference in its entirety.

FIELD OF TECHNOLOGY

The present disclosure relates generally to the field of manufacturing 3D-printed products and, more specifically, to improved systems and methods for administering a 3D-printing-based manufacturing process for producing 3D-printed goods for consumers on demand.

BACKGROUND

Consumer goods and household goods are commonly made by traditional manufacturing processes such as injection molding. From a cost perspective, traditional manufacturing processes usually require that a manufactured product be produced in large quantities to offset the high overhead costs associated with mold design and tooling. However, once a product is mass produced using a custom mold, it is often difficult to change the design of the product without additional overhead costs. In addition, if any product-related issues are discovered after a production run has completed or is near completion, the outcome of such a production run may be products that are unusable or unfit for sale, resulting in considerable waste. Therefore, traditional manufacturing is often not appropriate for making high-quality design-centered products where consumer expectations are high and consumer tastes vary or change over time.

While certain 3D printing processes, such as fused deposition modeling (FDM) or fused filament fabrication (FFF), are emerging as a preferred alternative to traditional manufacturing, companies that specialize in 3D-printing-based manufacturing are often faced with a new set of challenges concerning the best way to administer or coordinate 3D-printing workflows. These problems are especially pronounced for companies that manufacture products comprising multiple parts where the printing of each part can take upwards of several hours and the completion of the entire product can require the services of multiple 3D printers and workers over multiple days. Furthermore, it can be challenging to gauge the true cost, in terms of both labor and materials, of producing a complex 3D-printed product on demand. This can lead to difficulties in pricing such a 3D-printed product, especially when the product is sold directly to consumers rather than through traditional wholesale channels.

Therefore, a solution is needed which addresses not only the shortcomings and disadvantages of traditional manufacturing processes but also the challenges faced by those specializing in 3D-printing-based manufacturing, especially at scale. Such a solution should not be overly complicated and should allow high-quality 3D-printed products to be manufactured on demand, on time, and on budget.

SUMMARY

Disclosed herein are systems and methods for administering a 3D-printing-based manufacturing process for producing 3D-printed goods for consumers on demand. In some embodiments, a method of administering a 3D-printing-based manufacturing process is disclosed. The method comprising: receiving an order from a computing device of a customer, wherein the order includes a product made of 3D-printed parts and one or more standardized functional components; generating, at an administration server, a stock identifier used to identify the product during and after manufacturing; creating, at the administration server, a plurality of jobs to be undertaken to manufacture the product, wherein the stock identifier is associated with each of the jobs, and wherein the jobs include 3D-printing jobs to print the 3D-printed parts, finishing jobs to finish each of the 3D-printed parts, assembly jobs to assemble the 3D-printed parts and the one or more standardized functional components into an assembled product, quality assurance jobs to inspect the 3D-printed parts and the assembled product, and packing jobs to pack the assembled product; assigning, at the administration server, a job status to each of the plurality of jobs associated with the stock identifier based on a job order, an availability of one or more 3D printers, an availability of one or more workers, and an inventory level of the one or more standardized functional components and 3D-printing materials and continuously updating the job status of each of the jobs based on one or more completed jobs, the availability of one or more 3D printers, the availability of one or more workers, and the inventory level of the one or more standardized functional components and 3D-printing materials; and assigning at least one job associated with the stock identifier to one of the 3D printers by adding the job to a printer job queue of the 3D printer and assigning at least another job associated with the stock identifier to one of the workers by adding the other job to a worker job queue of the worker.

In some embodiments, the method further comprises: calculating, at the administration server, a stock yield percentage based in part on a total amount of completed jobs and a total amount of failed jobs associated with the stock identifier during the manufacturing process; calculating a part yield percentage based in part on a total amount of completed jobs and a total amount of failed jobs associated with the manufacturing of one 3D-printed part of the product, wherein the 3D-printed part is also associated with the stock identifier; and adjusting the printer job queue of the 3D printer such that the jobs associated with the stock identifier and assigned to the 3D printer ranks higher in the printer job queue than other jobs not associated with the stock identifier or adjusting the worker job queue of the worker such that the jobs associated with the stock identifier and assigned to the worker ranks higher in the worker job queue than other jobs not associated with the stock identifier due in part to least one of the stock yield percentage and the part yield percentage calculated.

In some embodiments, the method further comprises: automatically duplicating, at the administration server, one of the failed jobs associated with the stock identifier resulting in a duplicated job associated with the stock identifier, wherein calculating the stock yield percentage further includes factoring in an outcome of the duplicated job into any calculations of the stock yield percentage, and wherein calculating the part yield percentage further includes factoring in the outcome of the duplicated job into any calculations of the part yield percentage of a 3D-printed part when the duplicated job is needed to manufacture the 3D-printed part; and assigning the duplicated job associated with the stock identifier to one of the 3D printers or one of the workers by adding the duplicated job to the printer job queue of the 3D printer or adding the duplicated job to the worker job queue of the worker.

In some embodiments, the method further comprises: pre-emptively duplicating one or more of the jobs created to manufacture one of the 3D-printed parts of the product when a historical part yield percentage calculated by the administration server falls below a threshold percentage; and automatically assigning the pre-emptively duplicated job to one of the 3D printers or workers.

In some embodiments, the method further comprises: calculating a print yield percentage of one of the 3D printers over a period of time, wherein the print yield percentage is calculated based on an amount of 3D-printing jobs started by the 3D printer that completed and an amount of 3D-printing jobs started by the 3D printer that failed due to a machine failure during this period of time; calculating a print quality assurance (print QA) yield percentage of the 3D printer over the period of time, wherein the print QA yield percentage is calculated based on an amount of 3D-printing jobs finished by the 3D printer that failed a QA inspection of a 3D-printed part produced as a result of the finished 3D-printing job and an amount of 3D-printing jobs finished by the 3D printer that passed the QA inspection of the 3D-printed part produced as a result of the finished 3D-printing job; automatically taking the 3D printer offline based on at least one of the print yield percentage and the print QA yield percentage, wherein no further 3D-printing job is automatically assigned to the 3D printer by the administration server when the 3D printer is offline.

In some embodiments, the method further comprises: tracking a number of consecutive failed jobs of the 3D printer; and automatically taking the 3D printer offline based on the number of consecutive failed jobs, wherein no further 3D-printing job is automatically assigned to the 3D printer by the administration server when the 3D printer is offline.

In some embodiments, the product is associated with a stock keeping unit (SKU) identifier and product class. In these embodiments, the method further comprises: calculating a SKU yield percentage based on an amount of failed jobs and an amount of completed jobs associated with the SKU identifier over multiple orders; calculating a product class yield percentage based on an amount of failed jobs and an amount of completed jobs associated with the product class over multiple orders; and increasing a price of the product associated with the SKU identifier when the SKU yield percentage falls below a SKU yield threshold percentage or increasing a price of all products included within the product class when the product class yield percentage falls below a product class yield threshold percentage.

In some embodiments, the method further comprises: receiving a second order from another computing device, wherein the second order is a high-priority order, wherein the second order includes a second product, and wherein the second product includes a second set of 3D-printed parts and standardized functional components; generating, at the administration server, a second stock identifier used to identify the second product during and after manufacturing; creating, at the administration server, a plurality of second jobs to be undertaken to manufacture the second product, wherein the second stock identifier is associated with each of the second jobs; automatically assigning at least some of the second jobs to one or more 3D printers and workers; and prioritizing, at the administration server, the completion of the second jobs associated with the second stock identifier by ranking the second jobs above other jobs not associated with the second stock identifier in at least one of the printer job queue of one of the 3D printers and the worker job queue of one of the workers.

In some embodiments, the method further comprises: tracking a worker yield percentage of the worker, wherein the worker yield percentage is calculated based on an amount of failed jobs and an amount of completed jobs assigned to the worker; and removing the worker from a set of available workers or designating the worker for further training when the worker yield percentage falls below a worker yield percentage threshold, wherein no further jobs are automatically assigned to the worker by the administration server when the worker is removed from the set of available workers.

In some embodiments, the method further comprises: receiving, at the administration server, a return order notification for the product having a return reason, wherein the return reason is attributed to at least one of: a defective 3D-printed part, wherein the defective 3D-printed part is associated with the stock identifier, a defective standardized functional component, and an assembly issue; tracing the defective 3D-printed part associated with the stock identifier to one of the 3D printers assigned to print the defective 3D-printed part if the return reason is attributed to the defective 3D-printed part; tracing the defective 3D-printed part associated with the stock identifier to one or more workers assigned jobs associated with the defective 3D-printed part if the return reason is attributed to the defective 3D-printed part; tracing the defective standardized functional component to a standardized functional component associated with the stock identifier that was incorporated into the product if the return reason is attributed to the defective standardized functional component; and tracing the assembly issue to one or more workers assigned to assembly jobs for assembling the 3D-printed parts for the product if the return reason is attributed to the assembly issue, wherein the assembly jobs are associated with the stock identifier.

Also disclosed is a system for administering a 3D-printing-based manufacturing process. The system comprising a plurality of 3D printers; and a server comprises one or more processors, wherein the one or more processors are programmed to execute instructions to: receive an order from a computing device of a customer or a retail server, wherein the order includes a product made of 3D-printed parts and one or more standardized functional components; generate a stock identifier used to identify the product during and after manufacturing; create a plurality of jobs to be undertaken to manufacture the product, wherein the stock identifier is associated with each of the jobs, and wherein the jobs include 3D-printing jobs to print the 3D-printed parts, finishing jobs to finish each of the 3D-printed parts, assembly jobs to assemble the 3D-printed parts and the one or more standardized functional components into an assembled product, quality assurance jobs to inspect the 3D-printed parts and the assembled product, and packing jobs to pack the assembled product; assign a job status to each of the plurality of jobs associated with the stock identifier based on a job order, an availability of the 3D printers, an availability of one or more workers, and an inventory level of the one or more standardized functional components and 3D-printing materials and continuously updating the job status of each of the jobs based on one or more completed jobs, the availability of one or more 3D printers, the availability of one or more workers, and the inventory level of the one or more standardized functional components and 3D-printing materials; and assign at least one job associated with the stock identifier to one of the 3D printers by adding the job to a printer job queue of the 3D printer and assigning at least another job associated with the stock identifier to one of the workers by adding the other job to a worker job queue of the worker.

In some embodiments, the one or more processors are programmed to execute further instructions to: calculate a stock yield percentage based in part on a total amount of completed jobs and a total amount of failed jobs associated with the stock identifier during the manufacturing process; calculate a part yield percentage based in part on a total amount of completed jobs and a total amount of failed jobs associated with the manufacturing of one 3D-printed part of the product, wherein the 3D-printed part is also associated with the stock identifier; and adjust the printer job queue of the 3D printer such that the jobs associated with the stock identifier and assigned to the 3D printer ranks higher in the printer job queue than other jobs not associated with the stock identifier or adjusting the worker job queue of the worker such that the jobs associated with the stock identifier and assigned to the worker ranks higher in the worker job queue than other jobs not associated with the stock identifier due in part to at least one of the stock yield percentage and the part yield percentage calculated.

In some embodiments, the one or more processors are programmed to execute further instructions to: automatically duplicate one of the failed jobs associated with the stock identifier resulting in a duplicated job associated with the stock identifier, wherein calculating the stock yield percentage further includes factoring in an outcome of the duplicated job into any calculations of the stock yield percentage, and wherein calculating the part yield percentage further includes factoring in the outcome of the duplicated job into any calculations of the part yield percentage of a 3D-printed part when the duplicated job is needed to manufacture the 3D-printed part; and assign the duplicated job associated with the stock identifier to one of the 3D printers or one of the workers by adding the duplicated job to the printer job queue of the 3D printer or adding the duplicated job to the worker job queue of the worker.

In some embodiments, the one or more processors are programmed to execute further instructions to: pre-emptively duplicate one or more of the jobs created to manufacture one of the 3D-printed parts of the product when a historical part yield percentage calculated by the administration server falls below a threshold percentage; and automatically assign the pre-emptively duplicated job to one of the 3D printers or workers.

In some embodiments, the one or more processors are programmed to execute further instructions to: calculate a print yield percentage of one of the 3D printers over a period of time, wherein the print yield percentage is calculated based on an amount of 3D-printing jobs started by the 3D printer that completed and an amount of 3D-printing jobs started by the 3D printer that failed due to a machine failure during this period of time; calculate a print quality assurance (print QA) yield percentage of the 3D printer over the period of time, wherein the print QA yield percentage is calculated based on an amount of 3D-printing jobs finished by the 3D printer that failed a QA inspection of a 3D-printed part produced as a result of the finished 3D-printing job and an amount of 3D-printing jobs finished by the 3D printer that passed the QA inspection of the 3D-printed part produced as a result of the finished 3D-printing job; automatically take the 3D printer offline based on at least one of the print yield percentage and the print QA yield percentage, wherein no further 3D-printing job is automatically assigned to the 3D printer by the administration server when the 3D printer is offline.

In some embodiments, the one or more processors are programmed to execute further instructions to: track a number of consecutive failed jobs of the 3D printer; and automatically take the 3D printer offline based on the number of consecutive failed jobs, wherein no further 3D-printing job is automatically assigned to the 3D printer by the administration server when the 3D printer is offline.

In some embodiments, the product is associated with a stock keeping unit (SKU) identifier and product class. In these embodiments, the one or more processors are programmed to execute further instructions to: calculate a SKU yield percentage based on an amount of failed jobs and an amount of completed jobs associated with the SKU identifier over multiple orders; calculate a product class yield percentage based on an amount of failed jobs and an amount of completed jobs associated with the product class over multiple orders; and increase a price of the product associated with the SKU identifier when the SKU yield percentage falls below a SKU yield threshold percentage or increasing a price of all products included within the product class when the product class yield percentage falls below a product class yield threshold percentage.

In some embodiments, the one or more processors are programmed to execute further instructions to: track a worker yield percentage of the worker, wherein the worker yield percentage is calculated based on an amount of failed jobs and an amount of completed jobs assigned to the worker; and remove the worker from a set of available workers or designating the worker for further training when the worker yield percentage falls below a worker yield percentage threshold, wherein no further jobs are automatically assigned to the worker by the administration server when the worker is removed from the set of available workers.

In some embodiments, the one or more processors are programmed to execute further instructions to: receive a return order notification for the product having a return reason, wherein the return reason is attributed to at least one of: a defective 3D-printed part, wherein the defective 3D-printed part is associated with the stock identifier, a defective standardized functional component, and an assembly issue; trace the defective 3D-printed part associated with the stock identifier to one of the 3D printers assigned to print the defective 3D-printed part if the return reason is attributed to the defective 3D-printed part; trace the defective 3D-printed part associated with the stock identifier to one or more workers assigned jobs associated with the defective 3D-printed part if the return reason is attributed to the defective 3D-printed part; trace the defective standardized functional component to a standardized functional component associated with the stock identifier that was incorporated into the product if the return reason is attributed to the defective standardized functional component; and trace the assembly issue to one or more workers assigned to assembly jobs for assembling the 3D-printed parts for the product if the return reason is attributed to the assembly issue, wherein the assembly jobs are associated with the stock identifier.

Further disclosed is a non-transitory computer-readable medium comprising machine-executable instructions stored thereon, wherein the instructions comprise the steps of: receiving an order from a computing device of a customer, wherein the order includes a product made of 3D-printed parts and one or more standardized functional components; generating a stock identifier used to identify the product during and after manufacturing; creating a plurality of jobs to be undertaken to manufacture the product, wherein the stock identifier is associated with each of the jobs, and wherein the jobs include 3D-printing jobs to print the 3D-printed parts, finishing jobs to finish each of the 3D-printed parts, assembly jobs to assemble the 3D-printed parts and the one or more standardized functional components into an assembled product, quality assurance jobs to inspect the 3D-printed parts and the assembled product, and packing jobs to pack the assembled product; assigning a job status to each of the plurality of jobs associated with the stock identifier based on a job order, an availability of one or more 3D printers, an availability of one or more workers, and an inventory level of the one or more standardized functional components and 3D-printing materials and continuously updating the job status of each of the jobs based on one or more completed jobs, the availability of one or more 3D printers, the availability of one or more workers, and the inventory level of the one or more standardized functional components and 3D-printing materials; and assigning at least one job associated with the stock identifier to one of the 3D printers by adding the job to a printer job queue of the 3D printer and assigning at least another job associated with the stock identifier to one of the workers by adding the other job to a worker job queue of the worker.

BRIEF DESCRIPTION OF THE DRAWINGS

FIG. 2 illustrates one embodiment of a method for administering a 3D-printing-based manufacturing process.

FIG. 9B illustrates an example of a print QA screen that can be used to communicate a result of a QA inspection of a 3D-printed part.

DETAILED DESCRIPTION

Figure 1:
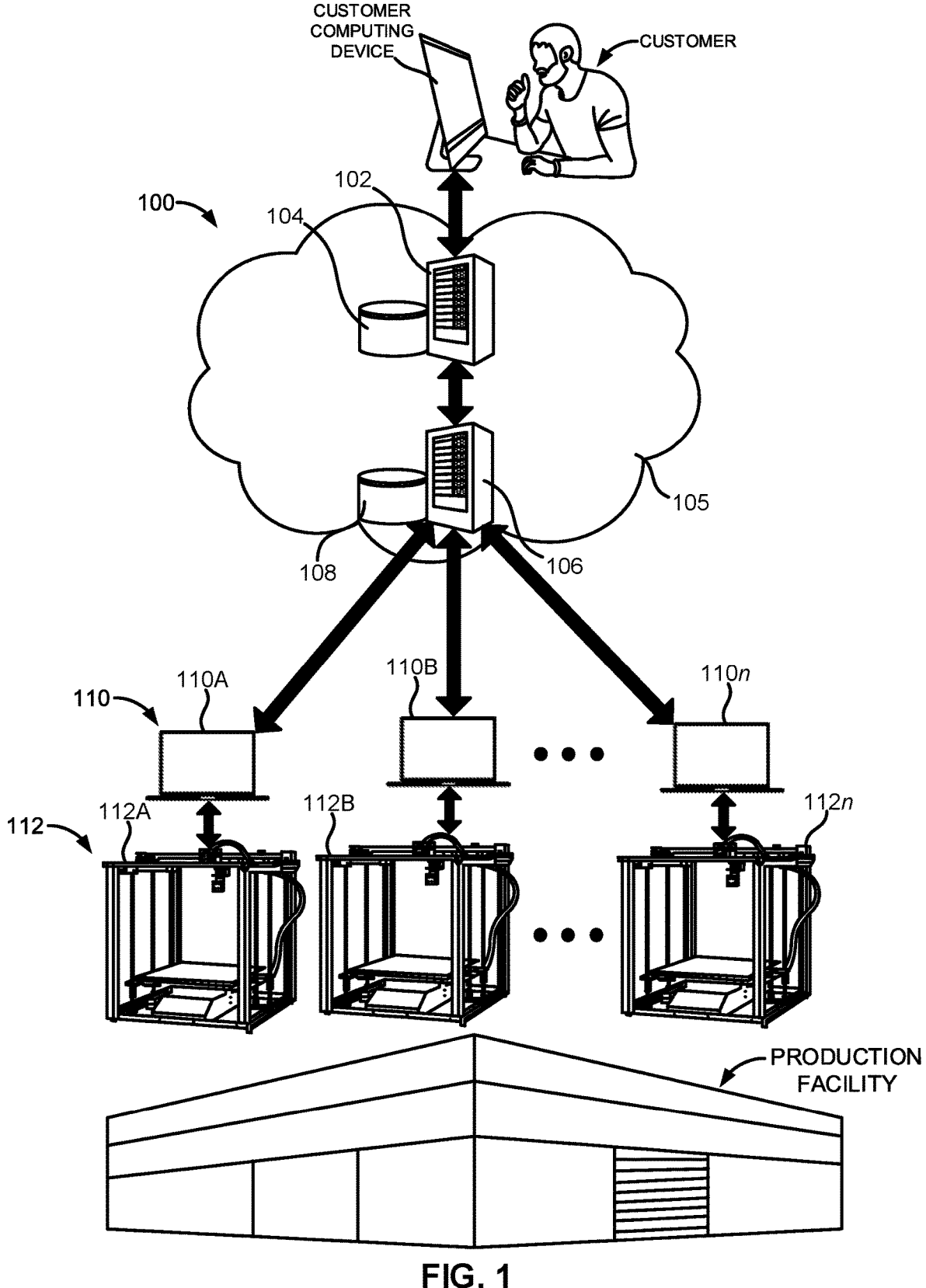
FIG. 1 illustrates one embodiment of a system for administering a 3D-printing-based manufacturing process.

FIG. 1 illustrates one embodiment of a system 100 for administering a 3D-printing-based manufacturing process.

Figure 3:
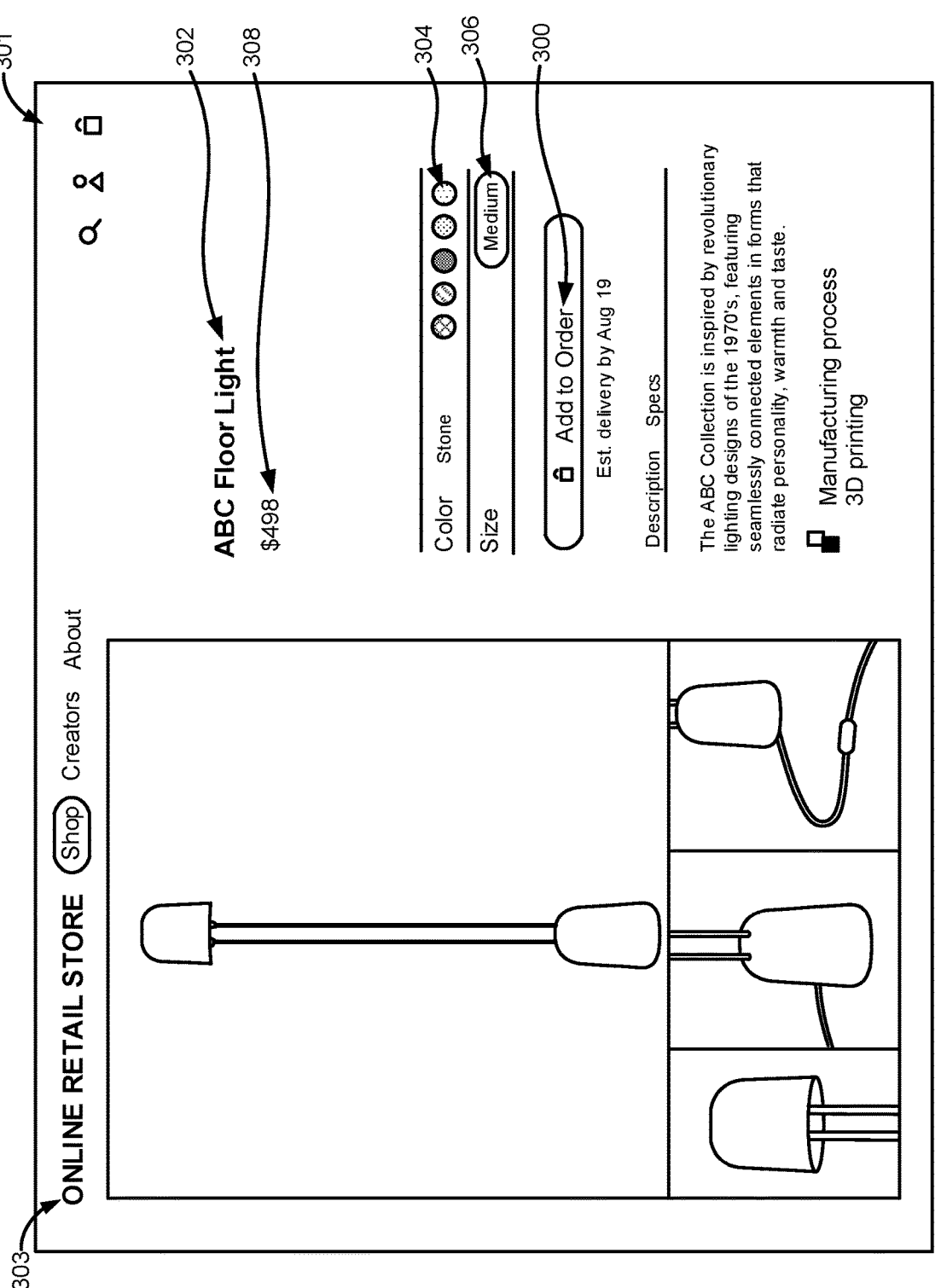
FIG. 3 illustrates one embodiment of a product ordering webpage that can be used by a customer to place an order for a product that can be made using the 3D-printing-based manufacturing process disclosed herein.

More specifically, the system 100 can be used to administer an on-demand 3D-printing-based manufacturing process such that products 302 (see, e.g., FIGS. 3, 4, 5A, etc.) are manufactured on demand in response to orders received via an online retail website 303 (see FIG. 3).

In some embodiments, the system 100 can comprise not only a server, computing devices, and 3D printers for managing the 3D-printing-based manufacturing process but also a server for managing the sale of products via the online retail website 303.

For example, the system 100 can comprise a retail server 102, a retail database 104, an administration server 106, an administration database 108, a plurality of production client devices 110, and a plurality of 3D printers 112.

The administration server 106 can be communicatively coupled to the retail server 102 and the plurality of production client devices 110. The administration database 108 can be communicatively coupled to or otherwise accessible to the administration server 106 and the plurality of production client devices 110.

The retail database 104 can be communicatively coupled to or otherwise accessible to the retail server 102, the administration server 106, a computing device communicatively coupled to the retail server 102 or the administration server 106, or a combination thereof.

Although FIG. 1 illustrates the administration server 106 as being a separate server from the retail server 102, it is contemplated by this disclosure and it should be understood by one of ordinary skill in the art that one server can perform the functions of both the administration server 106 and the retail server 102. In these embodiments, it is contemplated by this disclosure and it should be understood by one of ordinary skill in the art that one database can perform the functions of both the administration database 108 and the retail database 104.

As shown in FIG. 1, the retail server 102 can receive an order 300 (see FIG. 3) from a computing device of a customer. As will be discussed in more detail in relation to FIG. 3, the order 300 can include at least one product 302 comprising 3D-printed parts 400 (see FIG. 4) or 3D-printable parts. The administration server 106 can receive the order 300 from the retail server 102.

As will be discussed in more detail in relation to FIGS. 5A and 5B, the administration server 106 can be configured to generate a stock identifier 502 (see FIG. 5A) used to identify the product 302 during and after the manufacturing process. The administration server 106 can also be configured to create a plurality jobs 510 (see FIG. 5A) to be undertaken by a plurality of workers 1102 (see FIG. 11) and 3D printers 112 to manufacture the product 302. The administration server 106 can be configured to assign the jobs 510 based on a variety of factors including an availability of one or more 3D printers 112, an availability of one or more workers 1102, an inventory level 1208 of one or more standardized functional components 402 (see FIG. 12) and 3D-printing materials 1204 (see FIG. 3), and one or more yield percentages.

In some embodiments, the production client devices 110 can be used by the workers 1102 (see FIG. 11) to control or operate the 3D printers 112. The production client devices 110 can receive messages, instructions, or new/updated queues (e.g., printer job queues 702 and worker job queues 1104) from the administration server 106. The production client devices 110 can also transmit updates, messages, notifications, or data to the administration server 106, the administration database 108, or a combination thereof concerning the status of a job 510. In these and other embodiments, the production client devices 110 can also be used to assist workers with other jobs or tasks (e.g., painting jobs, finishing jobs, assembly jobs, etc.) besides 3D printing jobs.

In some embodiments, one production client device 110 can be used to control or operate multiple 3D printers 112. For example, one production client device 110 can be used to control or operate one or more banks or rows of 3D printers 112.

In alternative embodiments, the administration server 106 can communicate directly with the plurality of 3D printers 112. In these embodiments, the administration server 106 can transmit machine-readable instructions (e.g., G-code) directly to the 3D printers 112 and receive job status updates directly from the 3D printers 112 concerning a status of a print job.

As shown in FIG. 1, the plurality of 3D printers 112 can comprise n number of 3D printers (112n) including at least a first 3D printer 112A and a second 3D printer 112B. The plurality of production client devices 110 can comprise n number of production client devices (110n) including at least a first production client device 110A and a second production client device 110B.

In some embodiments, the n number of 3D printers 112 and the n number of production client devices 110 can be in the range of several hundred to several thousand. The system 100 is designed to be scalable such that new 3D printers 112 and new production client devices 110 can be added as the number of incoming orders 300 increases.

In certain embodiments, all of the 3D printers 112 and production client devices 110 can be located at one production facility. In other embodiments, the 3D printers 112 and the production client devices 110 can be distributed among several production facilities located in different geographic locations.

In some embodiments, the number of production client devices 110 can be greater than the number of 3D printers 112 since the production client devices 110 can also be used for assisting workers at the production facilities with other jobs or tasks besides 3D printing jobs. In other embodiments, the number of 3D printers 112 can be equal to or greater than the number of production client devices 110.

In some embodiments, the printer job queues 702 and the worker job queues 1104 can be maintained by the administration server 106 and transmitted to the production client devices 110. The administration server 106 can continuously transmit updated instances of the printer job queues 702 and the worker job queues 1104 to the production client devices 110. In other embodiments, the printer job queues 702 can be transmitted by the administration server 106 directly to the 3D printers 112.

In certain embodiments, each 3D printer 112 can be assigned a dedicated production client device 110. In these embodiments, one dedicated production client device 110 can control or operate one 3D printer 112 or multiple 3D printers 112.

In alternative embodiments, each worker 1102 can be assigned a dedicated production client device 110. In these embodiments, the dedicated production client device 110 assigned to the worker 1102 can operate or control one or more 3D printers 112 when this production client device 110 is communicatively coupled (e.g., by wired or wireless connections) to the one or more 3D printers 112.

For the purposes of this disclosure, any references to "a 3D printer 112" or "the 3D printer 112" can be considered a reference to any of the 3D printers 112 including the first 3D printer 112A or the second 3D printer 112B. Moreover, any references to "a production client device 110" or "the production client device 110" can be considered a reference to any of the production client devices 110 including the first production client device 110A or the second production client device 110B.

The retail server 102, the retail database 104, the administration server 106, the administration database 108, the plurality of production client devices 110, and the plurality of 3D printers 112 can communicate with one another via one or more networks (for example, network 105). The one or more networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof.

The production client devices 110 and the 3D printers 112 can connect to one another and to the administration server 106, the administration database 108, or a combination thereof over wired connections (e.g., Ethernet, fiber optic cables, etc.) and/or one or more wireless communication protocols or standards such as a 3G wireless communication standard, a 4G wireless communication standard, a 5G wireless communication standard, a long-term evolution (LTE) wireless communication standard, a Bluetooth™ ((IEEE 802.15.1) or Bluetooth™ (Lower Energy (BLE) short-range communication protocol, a wireless fidelity (WiFi) (IEEE 802.11) communication protocol, an ultrawideband (UWB) (IEEE 802.15.3) communication protocol, a ZigBee™ (IEEE 802.15.4) communication protocol, or a combination thereof.

The administration server 106 or the retail server 102 can be or refer to a virtualized computing resource or cloud-based server hosted, supported and/or provided by a cloud computing platform or service (e.g., Amazon Web Services®, Microsoft Azure®, Google Cloud®, etc.). In these and other embodiments, the actual server hardware of the administration server 106 or the retail server 102 can be one or more server computers (e.g., blade servers or rack-mounted servers) located in a data center, server farm/cluster, or dedicated server facility. Any references to the administration server 106 or the retail server 102 can also refer to the actual server hardware located in such facilities and any references to the one or more processors of the administration server 106 or the retail server 102 can refer to the one or more processors of such server hardware. Moreover, any references to tasks or operations undertaken by the administration server 106 or the retail server 102 can refer to the same tasks or operations undertaken by the one or more processors of the actual server hardware.

In other embodiments, any of the tasks or operations undertaken or performed by the administration server 106 or the retail server 102 can also be undertaken or performed by one or more stand-alone servers, mainframes, and/or dedicated desktop or laptop computers. For example, any of the tasks or operations undertaken by the administration server 106 or the retail server 102 can also be undertaken or performed by a standalone server located at the production facility.

The administration server 106 can be configured to store or retrieve data, files, or information to or from the administration database 108 and the retail server 102 can be configured to store or retrieve data, files, or information to or from the retail database 104. The administration database 108 or the retail database 104 can be or refer to one or more cloud-based databases (e.g., an Amazon Web Services® cloud-based database, a Google Cloud® database, a Microsoft Azure® cloud-based database, etc.). For example, the cloud-based database can be a relational database (e.g., an SQL database or an SQLite database), or a key-value database.

For purposes of the present disclosure, any references to a server (e.g., the administration server 106 or the retail server 102) can also be interpreted as a reference to a specific component, processor, module, chip, or circuitry within the server. For example, each of the administration server 106 or the retail server 102 can comprise one or more server processors, server memory and storage units, and a server communication interface. The server processors can be coupled to the server memory and storage units and the server communication interface through high-speed buses or interfaces. The one or more server processors can comprise one or more CPUs, GPUs, ASICs, FPGAs, or a combination thereof. The one or more server processors can execute software stored in the server memory and storage units to execute the methods or instructions described herein. The one or more server processors can be embedded processors, processor cores, microprocessors, logic circuits, hardware FSMs, DSPs, or a combination thereof. As a more specific example, at least one of the server processors can be a 64-bit processor.

The server memory and storage units can store software, data (including video or image data), tables, logs, databases, or a combination thereof. The server memory and storage units can comprise an internal memory and/or an external memory, such as a memory residing on a storage node or a storage server. The server memory and storage units can be a volatile memory or a non-volatile memory. For example, the server memory and storage units can comprise nonvolatile storage such as NVRAM, Flash memory, solid-state drives, hard disk drives, and volatile storage such as SRAM, DRAM, or SDRAM.

The server communication interface can refer to one or more wired and/or wireless communication interfaces or modules. For example, the server communication interface can be a network interface card. The server communication interface can comprise or refer to at least one of a WiFi communication module, a cellular communication module (e.g., a 4G or 5G cellular communication module), and a Bluetooth®/BLE or other-type of short-range communication module. The administration server 106 can connect to or communicatively couple with the retail server 102, the production client devices 110, and the 3D printers 112 via the server communication interface and the retail server 102 can connect to or communicatively couple with the administration server 106 and the customer computing devices via the server communication interface.

The retail server 102, the administration server 106, the production client devices 110, and the 3D printers 112 can be configured to transmit data, files, or information to each other via secure connections. The secure connections can be real-time bidirectional connections secured using one or more encryption protocols such as a secure sockets layer (SSL) protocol, a transport layer security (TLS) protocol, or a combination thereof. Additionally, data or packets transmitted over the secure connection can be encrypted using a Secure Hash Algorithm (SHA) or another suitable encryption algorithm.

Software instructions run on any of the servers (e.g., the administration server 106, the retail server 102, or a combination thereof), including any of the method steps, disclosed herein, can be written in the Ruby® programming language (e.g., using the Ruby on Rails® web application framework), the C# programming language, the PHP programming language, the Node.js (JavaScript) programming language, the Java™ programming language, the Python® programming language, or a combination thereof.

In some embodiments, the production client device 110 can be a desktop computer or a laptop computer. In other embodiments, the production client device 110 can be a high-performance tablet computer or other type of portable electronic device.

In certain embodiments, the production client device 110 can refer to a personal communication device such as a smartphone carried by a worker 1102. In other embodiments, the production client device 110 can be or comprise a pair of smart eyeglasses that can record videos or images and communicate with the administration server 106.

For purposes of this disclosure, any references to the production client device 110 can also be interpreted as a reference to a specific component, processor, module, chip, or circuitry within the production client device 110.

The production client device 110 can comprise one or more client device processors, client device memory and storage units, client device communication modules, and video image sensors or cameras. The client device can also comprise a positioning unit and a portable power storage unit. The components of the production client device 110 can be connected to one another via high-speed buses or interfaces.

The client device processors can include one or more central processing units (CPUs), graphical processing units (GPUs), Application-Specific Integrated Circuits (ASICs), field-programmable gate arrays (FPGAs), or a combination thereof. The client device processors can execute software stored in the client device memory and storage units to execute the methods or instructions described herein.

The client device memory and storage units can comprise volatile memory and non-volatile memory or storage. For example, the client device memory and storage units can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. The client device memory and storage units can store software, firmware, data (including video and image data), tables, logs, databases, or a combination thereof.

The client device communication modules can comprise at least one of a cellular communication module, a WiFi communication module, a Bluetooth® communication module, or a combination thereof. For example, the cellular communication module can support communications over a 5G network or a 4G network (e.g., a 4G long-term evolution (LTE) network).

The WiFi communication module can allow the production client device 110 to communicate with other production client devices 110 or one or more 3D printers 112 over a WiFi (IEEE 802.11) commination protocol such as the 802.11n, 802.11ac, or 802.11ax protocol. The Bluetooth® module can allow the production client device 110 to communicate with other production client device 110 or one or more 3D printers 112 over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules can comprise a combined WiFi and Bluetooth® module.

The production client device 110 can also comprise one or more built-in video image sensors or cameras for capturing video or images of a 3D-printed part 400 that has successfully passed its quality assurance (QA) inspection or a 3D-printed part 400 that has failed its QA inspection. A worker 1102 can also use the built-in video image sensors or cameras of a production client device 110 to capture videos or images of a 3D printer malfunction.

The production client device 110 can also comprise a high-precision positioning unit having a global positioning system (GPS) receiver. The GPS receiver can receive GPS signals from a GPS satellite. The positioning unit can provide positioning data that can allow the administration server 106 to determine the geolocation of each of the production client devices 110 within a production facility.

Software instructions run on any of the production client devices 110, including any of the method steps disclosed herein, can be written in the Objective-C programing language, Swift® programming language, Java® programming language, JavaScript programming language, Python® programming language, Kotlin® programing language, Golang™ programming language, C++ programming language, or a combination thereof.

The production client devices 110 can transmit machine-readable instructions (e.g., G-code) to the 3D printers 112 to cause the 3D printers 112 to 3D print the parts 400 used to make the products 302 sold on the online retail website 300 (see FIG. 3).

In some embodiments, at least one of the 3D printers 112 can be a cartesian 3D printer. Cartesian 3D printers are named for the three-axes Cartesian coordinate system that uses x, y, z coordinates to determine the location of the printhead. Cartesian printers are often built with rails that allow the printhead to move in the x- and y-dimensions and actuators that move the printhead up or down in the z-dimension.

In other embodiments, at least one of the 3D printers 112 can be a delta 3D printer. Delta 3D printers usually rely on three arms that move up and down on vertical rails arranged in a triangular formation. Each arm can move up and down the rails, independently of one another. Delta printers use trigonometric functions based on the angles created by these arms to determine the location of the printhead within the 3D print space.

In some embodiments, the 3D printers 112 can be fused deposition modeling (FDM) 3D printers where 3D-printing material in the form of filaments (e.g., thermoplastic filaments) are melted and extruded on to a printbed and a part is constructed layer-by-layer by melting and extruding the 3D-printing material. In further embodiments, at least one of the 3D printers 112 can be a selective laser sintering (SLS) 3D printer. An SLS 3D printer relies on a laser to selectively sinter the particles of a 3D printing material (e.g., a polymeric powder) and fuses the particles together to build the part layer-by-layer. In additional embodiments, at least one of the 3D printers 112 can be a stereolithography (SLA) 3D printer. An SLA 3D printer relies on a technique called vat photopolymerization where a laser is used to cure a liquid resin (e.g., photopolymer resin) into a hardened material (e.g., hardened plastic). Using this technique, the SLA 3D printer can "print" a part layer-by-layer through photopolymerization.

In some embodiments, at least one of the 3D printers 112 can be a binder jetting 3D printer where a printhead selectively deposits a liquid binding agent (called a binder) on to a layer of powdered particles to form a layer of a part. Additional powdered particles are then deposited once more on the formed layer and the printhead selectively depositing the liquid binding agent or binder on the new layer of powdered particles. This process repeats until the part is "printed" in this manner layer-by-layer.

In additional embodiments, at least one of the 3D printers 112 can be a cylindrical-coordinate 3D printer. The cylindrical-coordinate 3D printer can be any of the 3D printers disclosed in International Publication No. WO 2021/025939, published on Feb. 11, 2021, the content of which is incorporated herein by reference in its entirety. For example, the cylindrical-coordinate 3D printer can comprise a rotatable printbed support assembly, a vertically-translatable base plate configured to support the printbed support assembly, a plurality of rail segments positioned above the printbed support assembly and aligned radially with the printbed support assembly, and at least one gantry carrier configured to move along each of the rail segments. In some embodiments, at least two of the gantry carriers can be configured to be moved simultaneously. Each of the gantry carriers can be configured to carry or support a printhead the gantry carrier.

Although FIG. 1 illustrates a plurality of 3D printers 112 as the production machinery, it is contemplated by this disclosure and it should be understood by one of ordinary skill in the art that the system 100 (and method 200) disclosed herein can also be used to control or operate other types of machinery such as robotic manufacturing arms or other types of robotic manufacturing assemblies, robotic painting machines or assemblies, robotic sanding or deburring machines or assemblies, robotic sorting/picking machines or assemblies, robotic packing machines or assemblies, or a combination thereof. Moreover, the system 100 (and method 200) disclosed herein can also be used to control or operate certain automated storage machines or assemblies.

Figure 4:
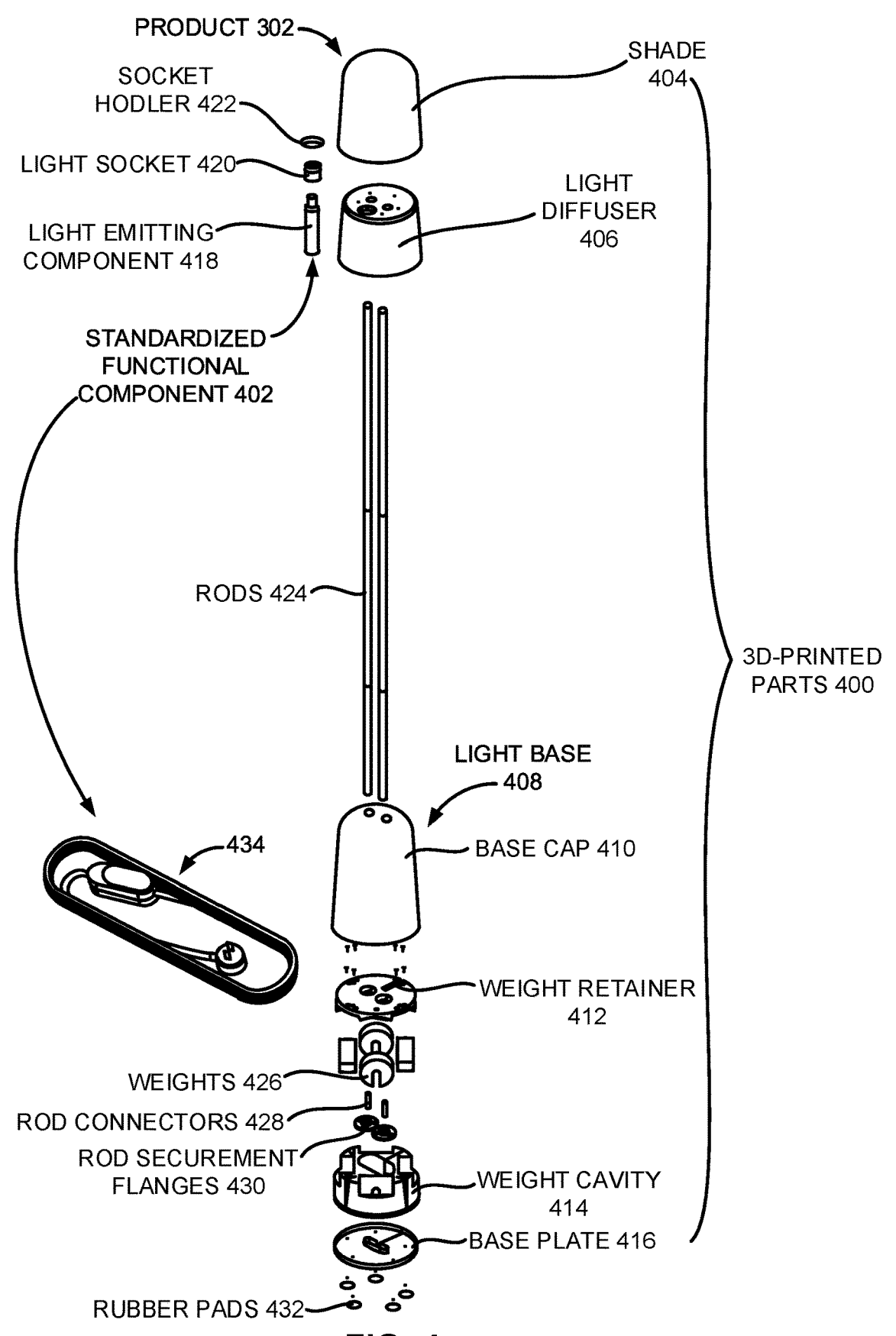
FIG. 4 illustrates an exploded view of one embodiment of a product that can be made using the 3D-printing-based manufacturing process disclosed herein.

FIG. 2 illustrates one embodiment of a method 200 of administering or managing a 3D-printing-based manufacturing process for producing products 302 comprising 3D-printed parts 400 (see FIGS. 3 and 4 for examples of such a product 302). In certain embodiments, the method 200 is tailored or optimized for administering or managing a 3D-printing-based manufacturing process where the products 302 are made on demand for customers in response to orders 300 received via an online retail website 303 (see FIG. 3). The method 200 can be distinguished from traditional manufacturing methods where one product is made in batches or in bulk using injection molding or cast molding; oftentimes, before the product is sold through retail channels.

In some embodiments, the method 200 can be used to administer the production of 3D-printed lighting products on demand. In other embodiments, the method 200 can be used to administer the production of 3D-printed furniture on demand. In further embodiments, the method 200 can be used to administer the production of 3D-printed consumer goods, kitchen goods, bathroom goods, or other type of household goods on demand.

The method 200 can be enabled using any of the servers, client devices, and 3D printers shown as part of the system 100 depicted in FIG. 1.

The method 200 can comprise receiving an order 300 (see FIG. 3) for a product 302 comprising 3D-printed parts 400 and one or more standardized functional components 402 (see, e.g., FIG. 4) in operation 202. A retail server 102 (see FIG. 1) can receive the order 300 from a computing device of a customer. The retail server 102 can then transmit the order 300, including all selections made by the customer concerning a product color 304 and a product size 306 (see FIG. 3), to the administration server 106.

The method 200 can also comprise generating, at the administration server 106, a stock identifier 502 (see FIG. 5A) used to identify the product 302 ordered by the customer during and after the manufacturing process in operation 204. In some embodiments, the stock identifier 502 can be a number assigned to the product 302. In other embodiments, the stock identifier 502 can be an alphanumeric string comprising numbers and letters. The stock identifier 502 can be used to track the product 302 through the different phases of the manufacturing process. For example, the stock identifier 502 can be used to track the various parts 400 of the product 302 that need to be 3D printed, finished, and inspected as part of the manufacturing process. The stock identifier 502 can also be used to track the product 302 after the product 302 is manufactured and shipped to the customer if the product 302 is eventually returned by the customer.

The stock identifier 502 can also be used to track the standardized functional components 402 that are incorporated into the product 302 along with the 3D-printed parts 400. For example, the stock identifier 502 can be used to track the light bulbs, light switches, electrical cords, and screws or other fasteners used to make the product 302.

The method 200 can further comprise creating, at the administration server 106, a plurality of jobs 510 (see FIG. 5A) that need to be undertaken or performed in order to manufacture the product 302 in operation 206. The jobs 510 can comprise 3D-printing jobs 512 to print the 3D-printed parts 400 of the product 302, finishing jobs 514 to finish each of the 3D-printed parts 400, assembly jobs 516 to assemble the 3D-printed parts 400 and the one or more standardized functional components 402 into an assembled product, quality assurance (QA) jobs 518 to inspect the 3D-printed parts 400 and the assembled product, and packing jobs 520 to pack the assembled product (see FIGS. 5A and 5B). The stock identifier 502 can be associated with each of the jobs 510.

The method 200 can also comprise assigning, at the administration server 106, a job status 522 (see FIGS. 5A and 5B) to each of the plurality of jobs 510 associated with the stock identifier 502 based on a job order 523 (see FIG. 5B), an availability of one or more 3D printers 112, an availability of one or more workers 1102 (see FIG. 11), and an inventory level 1208 of the one or more standardized functional components 402 and 3D-printing materials 1204 (see FIG. 12) and continuously updating the job status 522 of each of the jobs 510 based on one or more completed jobs 524, the availability of one or more 3D printers 112, the availability of one or more workers 1102, and the inventory level 1208 of the one or more standardized functional components 402 and 3D-printing materials 1204 in operation 208.

The method 200 can further comprise assigning at least one job 510 associated with the stock identifier 502 to one of the 3D printers 112 by adding the job 510 to a printer job queue 702 (see FIG. 7) of the 3D printer 112 and assigning at least another job 510 associated with the stock identifier 502 to one of the workers 1102 by adding the other job 510 to a worker job queue 1104 of the worker 1102 in operation 210.

One technical problem faced by the applicants is how to design a 3D-printing-based manufacturing process that could manufacture high-end products at scale where each of these products comprises multiple parts and the printing of each part can take upwards of several hours and where the completion of the entire product can take multiple days and require the services of multiple 3D printers and workers. One technical solution discovered and developed by the applicant is to divide up the manufacturing process into a plurality of discrete jobs where all of the jobs are tracked (including any and all failed jobs) and the jobs are assigned to certain 3D printers and workers based on the availability and performance of such 3D printers and workers.

It will be understood by one of ordinary skill in the art that the method 200 and certain of the method steps/operations disclosed herein can be embodied in a non-transitory readable medium, machine-readable medium, and/or a machine-accessible medium comprising instructions compatible, readable, and/or executable by one or more processors of a machine, server, or another type of computing device.

Moreover, the method 200 can comprise additional method steps or operations as discussed in relation to FIGS. 5A, 5B, 6, 7, 8, 9A, 9B, 10, 11, and 12.

FIG. 3 illustrates one embodiment of a product ordering webpage 301 of an online retail website 303. As previously discussed, a customer can place an order 300 (e.g., an online order) for a product 302 manufactured using the system 100 and method 200 disclosed here. As will be discussed in more detail in relation to FIG. 4, the product 302 can be made of 3D-printed parts 400 and standardized functional components 402.

The customer can place the order 300 by accessing the online retail website 303 using the customer's computing device. The order 300 can be received at the retail server 102 and all data and information concerning the order 300 can be stored in the retail database 104. The retail server 102 can then transmit data and information concerning the order 300 to the administration server 106.

As shown in FIG. 3, the product ordering webpage 301 can also allow the customer to select a product color 304 and a product size 306 when placing the order 300. As will be discussed in more detail in later sections, the administration server 106 can automatically generate or create a plurality of jobs 510 that need to be completed in order to manufacture the product 302. The types of jobs 510 created can depend on the product size 306 and the product color 304.

The product ordering webpage 301 can also list a product price 308. As will be discussed in more detail in later sections, the product price 308 can be adjusted (e.g., increased or decreased) based on one or more yield percentages tracked by the system 100.

FIG. 4 illustrates an exploded view of one embodiment of a product 302 (e.g., a lighting product) that can be made using the system 100 and methods 200 disclosed herein. As shown in FIG. 4, the product 302 can comprise 3D-printed parts 400 and several standardized functional components 402.

The standardized functional components 402 can be mass-manufactured in advance (that is, before the product 302 is manufactured). For example, the standardized functional components 402 can be procured from a supplier or vendor of such components or can be manufactured using traditional manufacturing techniques such as injection molding, mold casting, die casting, metal casting, extrusion, computer numerical control (CNC) milling, forging, sheet metal stamping, or a combination thereof. In certain embodiments, the standardized functional components 402 can be manufactured without undergoing a 3D printing process (that is, the functional components 402 are not made using 3D printing).

The functional components 402 can be standardized such that the same functional components 402 can be used for different products 302. For example, one of the standardized functional components 402 can be a light switch and the same light switch can be used for all different types of lighting products.

When the product 302 is a lighting product, the 3D-printed parts 400 can comprise a light shade 404, a light diffuser 406, and a light base 408 comprising a base cap 410, a weight retainer 412, a weight cavity 414, and a base plate 416.

In some embodiments, the light shade 404, the base cap 410, the weight retainer 412, the weight cavity 414, and the base plate 416 can be made of an opaque polymeric material. For example, these 3D-printed parts 400 can be printed using an opaque polymeric filament. As a more specific example, the opaque polymeric filament can be an opaque filament made of PLA. In certain embodiments, the opaque PLA filament can be a plant-based PLA filament.

In these and other embodiments, the light diffuser 406 or light shield can be made of a translucent polymeric material. For example, the light diffuser 406 can be printed using a translucent polymeric filament. As a more specific example, the translucent polymeric filament can be a translucent filament made of PLA. In certain embodiments, the translucent PLA filament can be a plant-based clear PLA filament. In other embodiments, the translucent filament can be a translucent/clear PETG filament or translucent/clear PETT filament. The light diffuser 406 can be made to diffuse light emitted by a light-emitting component 418 (e.g., a light bulb or LED component).

When the product 302 is a lighting product, the standardized functional components 402 can comprise the light-emitting component 418 (e.g., a light bulb, LED component, etc.), a light socket 420 (e.g., a light socket), a light socket holder 422, one or more rods 424, a plurality of weights 426, a plurality of rod connectors 428, a plurality of rod securement flanges 430, and a plurality of rubber pads 432 configured to be affixed to a bottom exterior surface of the base plate 416 to prevent the base plate 416 from sliding. The standardized functional components 402 can also comprise a light actuator 434 or light switch and cord. In some embodiments, the light actuator 434 can be a slidable actuator having a translatable slide bar for controlling or dimming the amount of light emitted. In other embodiments, the light actuator 434 can be a toggle actuator having a toggle switch, a rotary actuator having a rotatable knob, or any combination of a slidable actuator, toggle actuator, and rotary actuator. In further embodiments, the light actuator 434 can comprise a wireless communication unit configured to receive wireless signals from a portable electronic device such as a smartphone, a tablet, or other computing device to control an ON/OFF function or dim level of the lighting product.

The weight retainer 412 can be mated or otherwise coupled to the weight cavity 414 to retain the plurality of weights 426 used to stabilize or balance the lighting product. For example, FIG. 4 illustrates four weights 426 being used to stabilize or balance the lighting product (e.g., floor light). The weight retainer 412, the plurality of weights 426, and the weight cavity 414 can be housed within the base cap 410.

The base cap 410 can also house the rod connectors 428 and the rod securement flanges 430. The rod connectors 428 and the rod securement flanges 430 can work together to secure the rods 424 to the base of the floor light. The rod connectors 428 can also be used to connect rods 424 to one another to extend or raise the height of the light shade 404 relative to the base cap 410.

As shown in FIG. 4, the light-emitting component 418, the light socket 420, and the light socket holder 422 can be positioned, at least partially, within the light shade 404 and the light diffuser 406 or light shield. The light diffuser 406 can mate with or otherwise be coupled to the light shade 404.

The weights 426 can be made in part of a metallic material (e.g., iron, stainless steel, etc.), a high-density polymeric material, or a combination thereof. The weights 426 can be used to stabilize or balance a base of the lighting product such as a floor light base or a table light base.

Although FIG. 4 illustrates the product 302 as a lighting product (e.g., a floor lamp), it is contemplated by this disclosure that the system 100 and method 200 disclosed herein can be used to administer the on demand production of other types of products 302 comprising 3D-printed parts. For example, the system 100 and method 200 disclosed herein can be used to administer the on demand production of a piece of furniture comprising 3D-printed parts. In further embodiments, the system 100 and method 200 disclosed herein can be used to administer the on demand production of a consumer good, a kitchen good, a bathroom good, or other type of household good comprising 3D-printed parts.

Figure 5A:
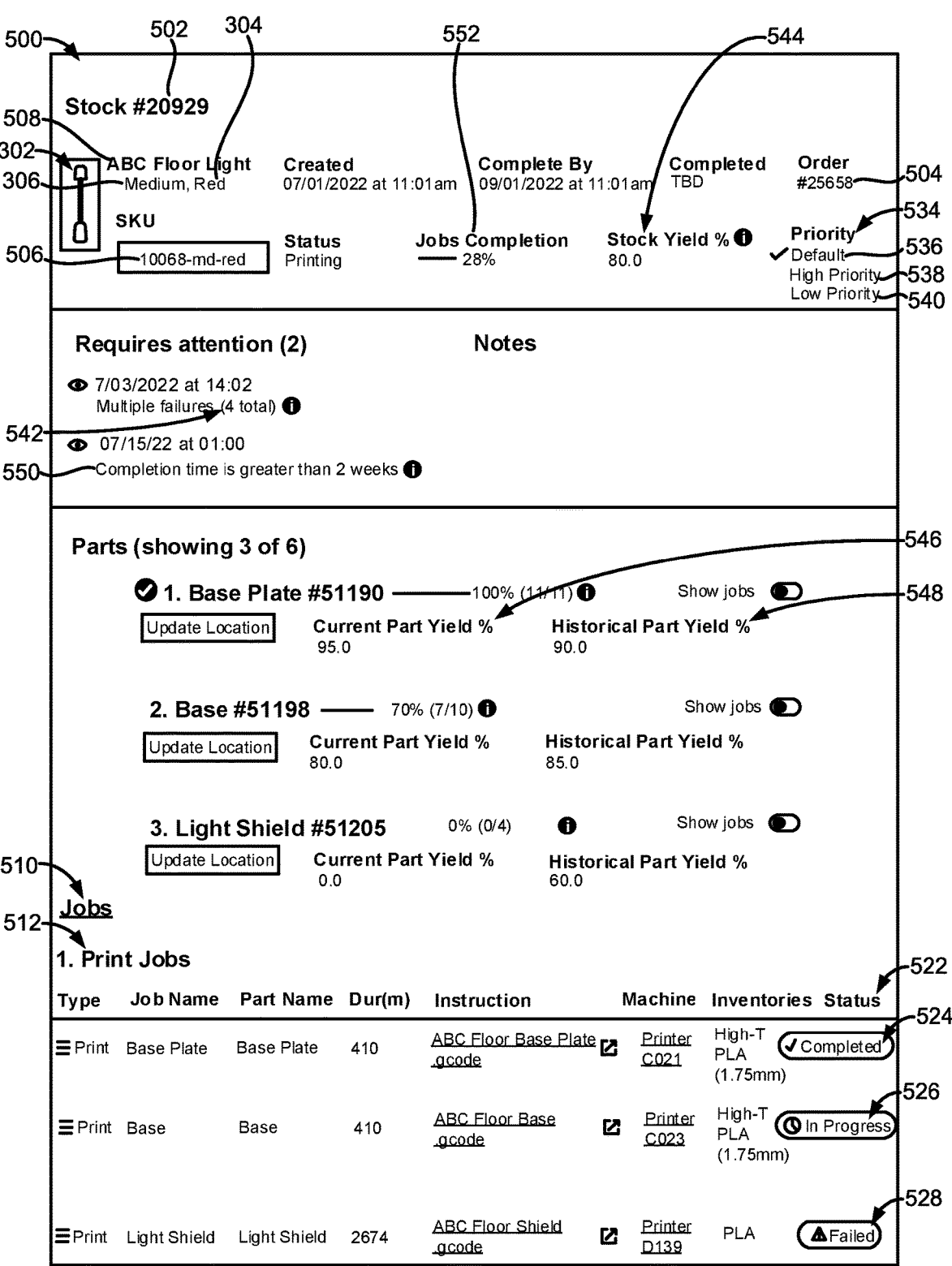
FIGS. 5A and 5B illustrate example portions of a stock status page that can provide a real-time overview of all manufacturing activity associated with the product.
Figure 5B:
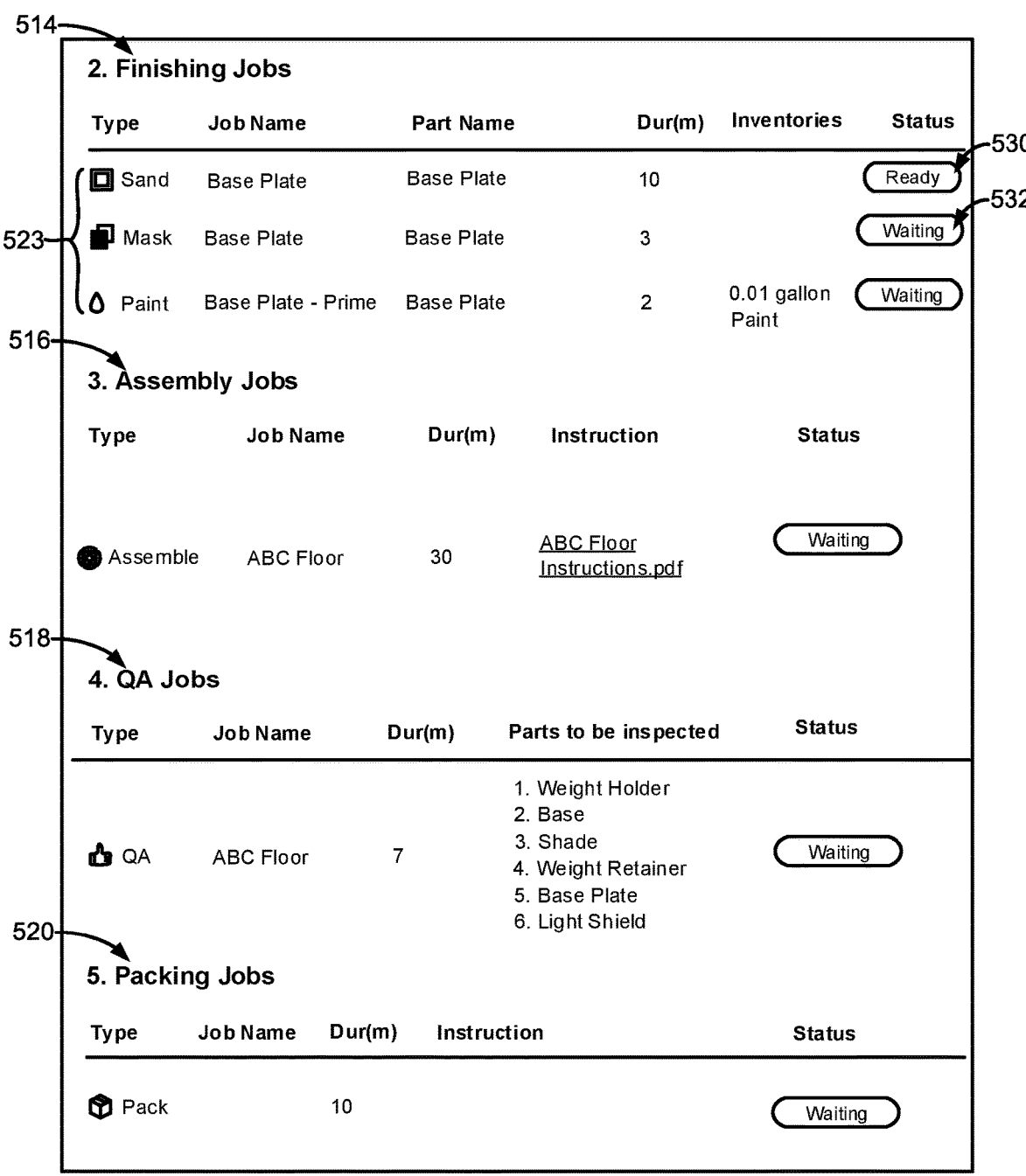

FIGS. 5A and 5B illustrate portions of a stock status page 500 that can be provided as part of an online administration panel or portal. For example, FIG. 5A illustrates part of an initial portion of the stock status page 500 and FIG. 5B illustrates part of a subsequent portion of the stock status page 500 as a user scrolls down.

The stock status page 500 can be rendered on a display of a computing device such as one of the production client devices 110 or a device used by a foreman or manager to monitor the 3D-printing-based manufacturing process.

The stock status page 500 can provide a real-time overview or snapshot of all manufacturing activity associated with the product 302 ordered by the customer. In some embodiments, the stock status page 500 can be accessed through a web browser. In other embodiments, the stock status page 500 can be accessed through a downloadable desktop or mobile software application. The stock status page 500 for each product 302 can be generated and continuously updated by the administration server 106.

As previously discussed, the administration server 106 can generate a stock identifier 502 used to identify the product 302 ordered by the customer during and after the manufacturing process. As shown in FIG. 5A, the stock identifier 502 can be a unique number assigned to the product 302. In other embodiments, the stock identifier 502 can be an alphanumeric string comprising numbers and letters of the alphabet.

The stock identifier 502 can be used to track the product 302 through the different phases or stages of the manufacturing process. For example, the stock identifier 502 can be used to track the various parts 400 of the product 302 that need to be 3D printed, finished, and inspected as part of the manufacturing process.

The stock identifier 502 can also be used to track the standardized functional components 402 that are incorporated into the product 302 along with the 3D-printed parts 400. For example, the stock identifier 502 can be used to track the light bulbs, light switches, electrical cords, and screws or other fasteners that are incorporated into the product 302 along with the 3D-printed parts 400.

The stock identifier 502 can also be used to track the product 302 after the product 302 is manufactured and shipped to the customer if the product 302 is returned by the customer. The administration server 106 can generate the stock identifier 502 and assign the stock identifier 502 to the product 302 as soon as the administration server 106 receives data or information concerning the order 300 from the retail server 102.

The stock identifier 502 can be used to identify the actual item that is produced as a result of the 3D-printing-based manufacturing process. The stock identifier 502 can also be used to identify the actual item that was packed and shipped to the customer. In cases where the manufactured/shipped item is returned by the customer, the stock identifier 502 can also be used to identify the item that was returned.

The stock identifier 502 can be different from an order number 504 or a stock keeping unit (SKU) identifier 506. This is because a singular order 300 can include multiple products or even products from different product classes 508. For example, a customer can place one order 300 that includes one ABC floor light and one XYZ table light.

The SKU identifier 506 can be used to identify all instances of a product of a particular product color 304 and product size 306 (e.g., all medium-sized ABC floor lights that are colored red). One SKU identifier 506 can be associated with multiple stock identifiers 502. The product class 508 can refer to a general classification of the product without regard to product color 304 or product size 306 (e.g., all ABC floor lights).

The administration server 106 can automatically generate or create a plurality of jobs 510 that need to be undertaken and completed in order to manufacture the product 302 and fulfill the order 300. In some embodiments, the jobs 510 can comprise a plurality of 3D-printing jobs 512 to print the parts 400 of the product 302, finishing jobs 514 to finish each of the 3D-printed parts, assembly jobs 516 to assemble the finished 3D-printed parts with one or more standardized functional components 402 into an assembled product, quality assurance (QA) jobs 518 to inspect the 3D-printed parts and the assembled product, and packing jobs 520 to pack the assembled product.

In some embodiments, the finishing job 514 can comprise one or more sanding or deburring jobs, masking jobs, and painting jobs. In certain embodiments, the finishing jobs 514 can also comprise adding certain surface textures or surface details or designs. As a more specific example, the 3D-printed parts 400 can be sanded or deburred using handheld sanding or deburring tools or automated robotic sanding or deburring tools. The painting jobs can involve priming and painting the 3D-printed parts 400 using a paint sprayer or spray gun.

The assembly jobs 516 can comprise assembling a 3D-printed part 400 with other 3D-printed parts 400 and with the standardized functional components 402. For example, the assembly jobs 516 can comprise fastening, adhering, or otherwise coupling the 3D-printed parts 400 with other 3D-printed parts 400 and with the standardized functional components 402. In some embodiments, the standardized functional components 402 can be positioned, at least partially, within one or more cavities or housings of the 3D-printed parts 400.

It should be understood by one of ordinary skill in the art that QA jobs 518, finishing jobs 514, and assembly jobs 516 are just as important to the successful construction of the product 302 as the 3D-printing jobs 512 and that the system 100 and method 200 disclosed herein tracks job completion rates and failures rates related to all such jobs (not just 3D-printing jobs 512).

The types of jobs 510 created and/or the number of jobs 510 created can vary depending on the product ordered by the customer. More specifically, products from different product classes 508 can be comprised of different 3D-printed parts 400 and, in some cases, different standardized functional components 402. Furthermore, each 3D-printed part 400 can have its own unique set of finishing jobs 514, assembly jobs 516, and QA jobs 518 associated with that particular 3D-printed part.

In certain embodiments, the types of jobs 510 created and/or the number of jobs 510 created can depend on the product size 306 and the product color 304 selected by the customer. In these embodiments, the product size 306 and the product color 304 selected by the customer can dictate the type and/or size of the parts 400 that will need to be 3D-printed and the finishing jobs that will need to be undertaken.

Moreover, the types of jobs 510 and the number of jobs 510 created for one product 302 from one product class 508 can differ from the types of jobs 510 and the number of jobs 510 created for a product 302 from another product class 508 since products 302 from each product class 508 can differ in their constituent parts 400 and how such parts 400 are finished and assembled. As such, the workflows that need to be created and managed by the administration server 106 for each of these products 302 are different. The system 100 and method 200 disclosed herein is able to create and manage numerous workflows (each involving numerous jobs 510) in a scalable manner.

In some embodiments, the jobs 510 created or generated by the administration server 106 can be determined in advance by an engineering team and/or design team. For example, the jobs 510 created or generated by the administration server 106 can be devised by an engineering team in collaboration with a designer or design team responsible for designing the product 302. The jobs 510 created or generated by the administration server 106 can be determined based on numerous practice manufacturing runs undertaken by the engineering team, the design team, and/or manufacturing staff.

In other embodiments, the jobs 510 created or generated by the administration server 106 can be revised or updated based on feedback or data/analytics obtained from the manufacturing process. For example, the G-code used by a 3D printer 112 to print a particular part 400 can be updated based on past print failures. Moreover, additional jobs 510 can be added or one job 510 can be broken up into multiple smaller jobs based on feedback or data/analytics obtained from the manufacturing process.

FIGS. 5A and 5B also illustrate that a job status 522 can be assigned to each of the jobs 510 associated with the stock identifier 502. The job status 522 can comprise any one of a "completed" status (also referred to as a completed job 524), an "in progress" status (also referred to as an in progress job 526), a "failed" status (also referred to as a failed job 528), a "ready" status (also referred to as a ready job 530), and a "waiting" status (also referred to as a waiting job 532).

Once a 3D printer 112 or worker 1102 has commenced a ready job 530, the job status 522 of the job 510 can be changed to an in progress job 526. Once the job status 522 of a ready job 530 has been changed to "in progress," the job can either proceed to completion or terminate in failure. If the in progress job 526 proceeds to completion, the job status 522 is changed to a completed job 524. If the in progress job 526 ends in a failure, the job status 522 is changed to a failed job 528.

The jobs status 522 can be assigned by the administration server 106 based in part on a job order 523 (where the job 510 fits in an overall ordering of jobs 510 that need to be completed in order to manufacture the product 302), an availability of one or more 3D printers 112 and workers 1102, and an inventory level 1208 of one or more standardized functional components 402 and 3D-printing materials 1204 needed to manufacture the product 302.

For example, all jobs 510 can initially be assigned a job status 522 of either "ready" or "waiting." A job 510 can be assigned a job status 522 of "ready" when the job is ready to be performed or undertaken. For example, the job 510 is ready to be performed when the job does not require any other jobs to be completed first before this job 510 can be performed and the necessary 3D printer 112, 3D printing material(s) 1204, standardized functional component(s) 402, and/or worker(s) 1102 are available in order to complete the job 510.

A job 510 can be assigned a job status 522 of "waiting" when the job is waiting for one or more conditions to be satisfied before the job status 522 of the job 510 can be changed to "ready." For example, the one or more conditions can comprise: (i) waiting for one or more other jobs to be completed first since the job order 523 dictates that the completion of these other jobs is a necessary pre-condition to the present job being performed (e.g., a painting job cannot be performed until a masking job has been performed first); (ii) waiting for a 3D printer 112 or a worker 1102 to become available; (iii) waiting for an inventory level 1208 of one or more standardized functional components 402 or 3D-printing materials 1204 to be replenished.

The administration server 106 can assign the ready jobs 530 to one or more 3D printers 112 and workers 1102. The administration server 106 can assign the ready jobs 530 to a 3D printer 112 by adding the ready jobs 530 to a printer job queue 702 (see FIG. 8) of a 3D printer 112.

In some embodiments, the administration server 106 can maintain all printer job queues 702 and transmit such printer job queues 702 to production client devices 110 tasked with operating the 3D printers 112. For example, the administration server 106 can transmit a printer job queue 702 for 3D printer CO23 to a production client device 110 assigned to or otherwise tasked with operating 3D printer CO23 for a work shift. In other embodiments, the administration server 106 can transmit printer job queues 702 directly to the 3D printers 112.

The administration server 106 can assign the ready jobs 530 to a worker 1102 by adding the ready job 530 to a worker job queue 1104 (see FIG. 11) of the worker 1102. The administration server 106 can maintain all worker job queues 1104 and transmit each of the worker job queues 1104 to a production client device 110 assigned to the worker 1102 or another computing device that can be accessed by the worker 1102.

The ready jobs 530 can be added to the printer job queues 702 or the worker job queues 1104 based on a point value associated with each of the ready jobs 530. In some embodiments, the administration server 106 can calculate a point value for each of the ready jobs 530. The administration server 106 can also calculate a point value for each of the waiting jobs 532.

The point value for each of the ready jobs 530 and waiting jobs 532 can be stored in the administration database 108. In some embodiments, the point value for each of the ready jobs 530 and waiting jobs 532 can be hidden from view from the workers 1102 such that the point values are not displayed as part of the stock status page 500 or another page or dashboard screen. In other embodiments, the point value for each of the ready jobs 530 and waiting jobs 532 can be displayed as part of the stock status page 500 or another page or dashboard screen and visible to the workers 1102.

The point value associated with a ready job 530 can be used to rank the ready job 530 against other ready jobs 530 (based on a points-based ranking system) to determine which ready jobs 530 are performed first by the available 3D printers 112 and workers 1102.

The point value of each ready job 530 can be initially assigned or allotted when the order 300 for the product 302 was first received by the retail server 102. As previously discussed, a stock identifier 502 can be created to identify the product 302 during the manufacturing process. The same stock identifier 502 can also be associated with all jobs 510 that need to be undertaken to manufacture the product 302. The point value initially assigned or allotted to each ready job 530 associated with the stock identifier 502 can be a default amount (e.g., 10 points). This point value (beginning with the default amount on the day that the order 300 was received) can be incremented by a preset amount (e.g., 1 point) periodically (e.g., at the end of each day, each half-day, each hour, each half-hour, etc.) until the ready job 530 is finished or completed.

The point value of each waiting job 532 can also be initially assigned or allotted when the order 300 for the product 302 was first received by the retail server 102. The point value initially assigned or allotted to each waiting job 532 associated with the stock identifier 502 can be the same default amount (e.g., 10 points) as that assigned or allotted for each ready job 530. This point value (beginning with the default amount on the day that the order 300 was received) can also be incremented by a preset amount (e.g., 1 point) periodically (e.g., at the end of each day, each half-day, each hour, each half-hour, etc.) until the status of the waiting job 532 changes to a ready job 530 and the ready job 530 is finished or completed. The point value for each waiting job 532 can carry over when the status of the waiting job 532 changes to a ready job 530 (for example, when a particular 3D printer 112 becomes available or when an out-of-stock standardized functional component 402 is replenished). That is, the point value accrued by the waiting job 532 then becomes the point value of the ready job 530 now taking its place.

In some embodiments, ready jobs 530 associated with a particular stock identifier 502 can be added to a printer job queue 702 of a 3D printer 112 or a worker job queue 1104 of a worker 1102 based on the point value of each of the ready jobs 530. The point values of the ready jobs 530 can be used to rank or order the ready jobs 530. This ranking or ordering of the ready jobs 530 can make up the rank or order of the printer job queue 702 or the worker job queue 1104.

This ranking or ordering of the ready jobs 530 is important since all 3D printers 112 and workers 1102 of the system 100 work sequentially down their printer job queues 702 and worker job queues 1104, respectively. A ready job 530 having a higher rank (or higher point value) is performed before another ready job 530 having a lower rank (or lower point value). Since 3D printers 112 or workers 1102 usually do not finish all of the ready jobs 530 in their queues during their periods of operation or their work shifts, respectively, those ready jobs 530 that are ranked higher in the queues will have a better chance of being completed during these periods of operation or these work shifts.

As will be discussed in more detail in relation to FIG. 7 and FIG. 11, the printer job queue 702 and the worker job queue 1104 can each comprise jobs 510 associated with multiple stock identifiers 502 (or multiple products 302). In this sense, ready jobs 530 associated with one stock identifier 502 are "competing" with other ready jobs 530 associated with other stock identifiers 502 for available resources (e.g., available 3D printers 112 and workers 1102) that might enable the completion of such ready jobs 530.

The administration server 106 can continuously adjust the printer job queues 702 and worker job queues 1104 as new ready jobs 530 are added to such queues as a result of new orders 300 being placed and the statuses of waiting jobs 532 change to ready jobs 530. Moreover, the administration server 106 can continuously adjust the printer job queues 702 and worker job queues 1104 as completed jobs 524 are removed from such queues and as the statuses of ready jobs 530 change to waiting jobs 532 due to a change in circumstances.

For example, a ready job 530 can have its job status 522 changed to a waiting job 532 if one of the 3D printers 112 needed to complete the ready job 530 becomes unavailable or is taken offline. Similarly, a ready job 530 can have its job status 522 changed to a waiting job 532 if a skilled worker 1102 needed to complete the ready job 530 becomes unavailable or is absent for a period of time.

As previously discussed, the point value of a ready job 530 that has not been completed can be incremented periodically (e.g., at the end of each day, each half-day, each hour, each half-hour, etc.) by a preset amount (e.g., 1 point) until the ready job 530 is completed. This prevents incomplete ready jobs 530 from languishing in the printer job queues 702 or worker job queues 1104 as older ready jobs 530 will have accrued more points and, thus, will be ranked higher than newer ready jobs 530.

In some embodiments, all ready jobs 530 and waiting jobs 532 across all stock identifiers 502 can be ranked using an overall job ranking before such ready jobs 530 are assigned to a particular 3D printer 112 or worker 1102. The same points-based ranking system discussed above can be used to rank all of the ready jobs 530 and waiting jobs 532 across all stock identifiers 502. Once all of the ready jobs 530 and waiting jobs 532 are ranked, the administration server 106 can automatically assign the ready jobs 530 to all presently-available 3D printers 112 and presently-available workers 1102 in accordance with the overall job ranking. In some embodiments, ready jobs 530 ranked at the top or close to the top of the overall job ranking can be assigned to 3D printers 112 with a higher print yield percentage 802 or a higher print QA yield percentage 804 (see FIG. 8). In certain embodiments, a printer job queue 702 for each available 3D printer 112 and a worker job queue 1104 for each available worker 1102 can be generated for a set time period (e.g., a working day or working shift) such that ready jobs 530 added to such printer job queues 702 and worker job queues 1104 can maintain their relative job rankings for that set time period. At the end of the set time period or at the beginning of a new set time period (e.g., at the beginning of a working day or working shift), the ready jobs 530 that remain unfinished or incomplete and any new ready jobs 530 added can be ranked according to a new overall job ranking and the administration server 106 can automatically assign the ready jobs 530 to all presently-available 3D printers 112 and presently-available workers 1102 in accordance with the new overall job ranking.

FIG. 5A also illustrates that each order 300 can have a priority level 534 attached to the order 300. The priority level 534 can be assigned by the administration server 106, the retail server 102, or a combination thereof. The priority level 534 can be assigned based on an identity or account of a customer, an order type, an order source, or a combination thereof. In some embodiments, the priority level 534 can comprise: (i) a default priority level 536, (ii) a high priority level 538, and (iii) a low priority level 540.

For example, orders 300 placed by VIP customers or repeat customers can have a high priority level 538 assigned to such orders. Also, for example, orders 300 placed for testing purposes, R&D purposes, or marketing purposes can have a lower priority level 538 attached to such orders. All other orders placed through the online retail website 303 can have a default priority level 536 assigned to such orders.

An order 300 having a default priority level 536 attached or otherwise assigned to the order 300 can be treated as a regular order such that ready jobs 530 and waiting jobs 532 of orders 300 having the default priority level 536 are all initially assigned or allotted the same default point value for purposes of ranking or ordering such jobs. For example, this initial default point value can be 10 points and this initial default point value can be incremented by a preset amount (e.g., 1 point) periodically (e.g., at the end of each day, each half-day, each hour, each half-hour, etc.) until the job is finished or completed.

An order 300 having a high priority level 538 attached or otherwise assigned to the order 300 can be treated as a rush or urgent order such that ready jobs 530 and waiting jobs 532 of orders 300 having the high priority level 538 are all initially assigned or allotted a greater point value than the default point value for purposes of ranking or ordering such jobs. For example, this greater or higher initial point value can be 20 points instead of the default initial point value of 10 points. Moreover, this greater initial point value can be incremented by a higher preset amount (e.g., 2 points) periodically (e.g., at the end of each day, each half-day, each hour, each half hour, etc.) until the job is finished or completed. In this way, the administration server 106 prioritizes jobs 510 associated with orders 300 having the high priority level 538 over jobs 510 associated with orders 300 having the default priority level 536. Moreover, since the ready jobs 530 associated with orders 300 having the high priority level 538 are normally ranked higher than ready jobs 530 associated with orders 300 have the default priority level 536, such higher-priority ready jobs 530 are normally included at the top or beginning of printer job queues 702 and worker job queues 1104. This increases the chances that these higher-priority ready jobs 530 are actually completed during a 3D printer's operational period or during a worker's shift and significantly decreases the completion times or lead times of such higher-priority ready jobs 530.

An order 300 having a low priority level 540 attached or otherwise assigned to the order 300 can be treated with the lowest priority such that ready jobs 530 and waiting jobs 532 of orders 300 having the low priority level 540 are all assigned or allotted a lower or lesser initial point value than the default initial point value for purposes of ranking or ordering such jobs. For example, this lower or lesser initial point value can be 5 points instead of the default initial point value of 10 points. Moreover, this lower initial point value can be incremented by a lower preset amount (e.g., 0.5 points) periodically (e.g., at the end of each day, each half-day, each hour, each half-hour, etc.) until the job is finished or completed. In this way, the administration server 106 de-prioritizes jobs 510 associated with orders 300 having the low priority level 540 over jobs 510 associated with orders 300 having the default priority level 536 and the high priority level 538. Moreover, since the ready jobs 530 associated with orders 300 having the low priority level 540 are normally ranked lower than ready jobs 530 associated with orders 300 have the default priority level 536, such lower-priority ready jobs 530 are oftentimes included at the bottom or end of printer job queues 702 and worker job queues 1104. This can increase the completion times or lead times of such lower-priority ready jobs 530.

As a more specific example, the administration server 106 can receive two separate orders 300 (e.g., a first order and a second order) from the retail server 102 with the first order having a default priority level 536 attached or otherwise assigned to the order and the second order having a high priority level 538 attached or otherwise assigned to the order. The second order having the high priority level 538 can be placed by a VIP customer that has placed multiple high-value orders in the past. The administration server 106 can generate a first stock identifier to identify a first product included as part of the first order and a second stock identifier to identify a second product included as part of the second order. The administration server 106 can then create a first set of jobs associated with the first stock identifier and a second set of jobs associated with the second stock identifier. The administration server 106 can then prioritize the completion of the second set of jobs over the first set of jobs. For example, the administration server 106 can prioritize the completion of the second set of jobs over the first set of jobs by assigning a default initial point value to each ready job of the second set of jobs that is greater or higher than the default initial point value assigned to each ready job of the first set of jobs. Moreover, the administration server 106 can also increment the point values associated with the ready jobs of the second set of jobs periodically (e.g., at the end of each day, each half-day, each hour, each half-hour, etc.) by a preset point value that is greater or higher than the present point value used to increment the point value associated with the ready jobs of the first set of jobs. By doing so, the administration server 106 can ensure that the second set of jobs associated with the order having the high priority level 538 are completed before the first set of jobs associated with the order having the default priority level 536 such that the second product is manufactured before the first product and the second order is fulfilled before the first order.

As previously discussed, once a 3D printer 112 or worker 1102 has commenced a ready job 530, the job status 522 of the job 510 can be changed to an in progress job 526. Once the job status 522 of a ready job 530 has been changed to "in progress," the job can either proceed to completion (become a completed job 524) or terminate in failure (become a failed job 528). As will be discussed in more detail in relation to FIGS. 9A and 9B, a job 510 can fail for a variety of reasons. For example, a 3D-printing job 512 can fail due to a machine failure 902 (a failure of the 3D printer 112 performing the 3D-printing job 512) or a print quality failure 908. More specifically, a print quality failure 908 can occur when an end product produced as a result of the 3D-printing job 512 fails a QA inspection (see FIG. 9B).

The administration server 106 can track job failures and completions by tracking a number of yield percentages, completion times, and total job failures 542. The total job failures 542 can be the total number of failed jobs 528 associated with the stock identifier 502. The total job failures 542 can be calculated periodically or intermittently over the course of the manufacturing process. For example, the total job failures 542 can be calculated every few seconds, every few minutes, hourly, daily, bi-weekly, weekly, etc. In some embodiments, the total job failures 542 can be calculated every time an in progress job 526 becomes a failed job 528.

In some embodiments, the yield percentages can comprise a stock yield percentage 544 and a part yield percentage. The part yield percentage can further comprise a current part yield percentage 546 and a historical part yield percentage 548.

The administration server 106 can calculate the stock yield percentage 544 by dividing the total number of completed jobs 524 associated with the stock identifier 502 by a sum of the total number of failed jobs 528 and the total number of completed jobs 524 associated with the stock identifier 502 (stock yield percentage=total number of completed jobs/(total number of failed jobs+total number of completed jobs)).

The stock yield percentage 544 can be calculated periodically or intermittently over the course of the manufacturing process. For example, the stock yield percentage 544 can be calculated every few seconds, every few minutes, hourly, daily, bi-weekly, weekly, etc. In some embodiments, the stock yield percentage 544 can be calculated every time a job 510 is completed or ends in failure. The stock yield percentage 544 can provide real-time insights into the efficiency and effectiveness of the manufacturing process as it pertains to the production of the product 302.

The administration server 106 can calculate the current part yield percentage 546 by dividing the total number of completed jobs 524 associated with the production of one of the 3D-printed parts 400 of the product 302 by a sum of the total number of failed jobs 528 and the total number of completed jobs 524 associated with the production of the 3D-printed part 400 (current part yield percentage for a 3D-printed part=total number of completed jobs associated with the production of the 3D-printed part/(total number of failed jobs+total number of completed jobs associated with the production of the 3D-printed part)). The current part yield percentage 546 can be calculated periodically or intermittently over the course of manufacturing the 3D-printed part 400. For example, the current part yield percentage 546 can be calculated every few seconds, every few minutes, hourly, daily, bi-weekly, weekly, etc. In some embodiments, the current part yield percentage 546 can be calculated every time a job 510 associated with the production of the 3D-printed part 400 is completed or ends in failure. The current part yield percentage 546 can provide real-time insights into the efficiency and effectiveness of the current manufacturing process as it pertains to the production of this particular 3D-printed part 400.

The administration server 106 can calculate the historical part yield percentage 548 by dividing the total number of completed jobs 524 associated with the production of all instances of a 3D-printed part 400 over multiple orders 300 by a sum of the total number of failed jobs 528 and the total number of completed jobs 524 associated with all instances of the 3D-printed part 400 over multiple orders 300 (historical part yield percentage for a 3D-printed part=total number of completed jobs associated with the production of all instances of the 3D-printed part/(total number of failed jobs+total number of completed jobs associated with the production of all instances of the 3D-printed part)). The historical part yield percentage 548 can be calculated periodically or intermittently. For example, the historical part yield percentage 548 can be calculated every few seconds, every few minutes, hourly, daily, bi-weekly, weekly, etc. In some embodiments, the historical part yield percentage 548 can be calculated every time a job 510 associated with the production of a particular 3D-printed part 400 is completed or ends in failure. The historical part yield percentage 546 can provide historical or long-term insights into the efficiency and effectiveness of the manufacturing process as it pertains to the production of a 3D-printed part 400 in general.

The administration server 106 can calculate and track the stock yield percentage 544 as soon as jobs 510 associated with the stock identifier 502 are commenced. The administration server 106 can store the stock yield percentages 544 calculated in the administration database 108. The administration server 106 can display the latest stock yield percentage 544 calculated to an administrator or one or more workers 1102 via the stock status page 500.

The administration server 106 can calculate and track a number of current part yield percentages 546 as soon as jobs 510 associated with 3D-printed parts 400 of a product 302 are commenced. The administration server 106 can store the current part yield percentages 546 calculated in the administration database 108. The administration server 106 can display the latest current part yield percentages 546 calculated to an administrator or one or more workers 1102 via the stock status page 500.

The administration server 106 can also track a number of completion times including a stock completion time 550 and various part completion times. The stock completion time 550 can be the amount of time elapsed since the order 300 for the product 302 was placed by the customer or first received by the administration server 106. The administration server 106 can cease tracking the stock completion time 550 when the product 302 has been manufactured and packed for shipment.

The administration server 106 can also track part completion times for the various 3D-printed parts 400. A part completion time can be the amount of time elapsed from the time that the order 300 for the product 302 was placed by the customer or first received by the administration server 106 until the 3D-printed part 400 is manufactured. The administration server 106 can track a part completion time for each of the 3D-printed parts 400.

The administration server 106 can store the stock completion time 550 and the various part completion times in the administration database 108. The administration server 106 can display the stock completion time 550 and the various part completion times to an administrator or one or more workers 1102 via the stock status page 500.

The administration server 106 can also calculate and track a stock completion percentage 552 and various part completion percentages. The administration server 106 can calculate the stock completion percentage 552 by dividing the number of completed jobs 524 by the total number of jobs 510 initially created in order to manufacture the product 302. The denominator of this calculation does not include any duplicated jobs 608 or failed jobs 528 and only includes the total number of jobs 510 initially created to manufacture the product 302 (assuming all such jobs 510 are successfully completed). The administration server 106 can calculate a part completion percentage for each of the 3D-printed parts 400 of the product 302. The administration server 106 can calculate the part completion percentage by dividing the number of completed jobs 524 for a particular 3D-printed part 400 by the total number of jobs 510 initially created in order to manufacture the 3D-printed part 400. The denominator of this calculation does not include any duplicated jobs 608 or failed jobs 528 and only includes the total number of jobs 510 initially created to manufacture the 3D-printed part 400 (assuming all such jobs 510 are successfully completed). The administration server 106 can calculate and track the stock completion percentage 552 and the various part completion percentages as soon as jobs 510 associated with the stock identifier 502 or the 3D-printed parts 400 are completed.

The administration server 106 can store the stock completion percentage 552 and the various part completion percentages in the administration database 108. The administration server 106 can display the stock completion percentage 552 and the various part completion percentages to an administrator or one or more workers 1102 via the stock status page 500.

The administration server 106 can be programmed to track: the (i) stock yield percentage 544, the (ii) current part yield percentages 546, the (iii) stock completion time 550, the (iv) part completion times, the (v) stock completion percentage 552, the (vi) part completion percentages, the (vii) number of total job failures 542, or a combination thereof in order to ensure the timely production or manufacturing of the product 302.

Moreover, the administration server 106 can be programmed to take certain actions or proactive steps if any of the stock yield percentage 544 or the current part yield percentages 546 falls or is still below a preset minimum threshold percentage. In addition, the administration server 106 can be programmed to take certain actions or proactive steps if any of the stock completion time 550 or part completion times exceeds a preset maximum threshold time. Furthermore, the administration server 106 can also be programmed to take certain actions or proactive steps if any of the stock completion time 550 or part completion times exceeds the preset maximum threshold time and any of the stock yield percentage 544 or the current part yield percentages 546 falls or is below the preset minimum threshold percentage. That is, the administration server 106 can be programmed to take certain actions or proactive steps if a certain amount of time has passed since the order 300 came in and either the stock yield percentage 544 or the current part yield percentages 546 still falls or is below a preset minimum threshold percentage.

In addition, the administration server 106 can also be programmed to take certain actions or proactive steps if any of the stock completion time 550 or part completion times exceeds a preset maximum threshold time and any of the stock completion percentage 552 or the part completion percentages still falls or is below a present minimum threshold percentage. In some embodiments, the administration server 106 can also be programmed to take certain actions or proactive steps if the total job failures 542 associated with the stock identifier 502 exceeds a total job failure threshold.

For example, the administration server 106 can be programmed to take certain actions or proactive steps if the (i) stock yield percentage 544 falls or is below a stock yield minimum threshold percentage (e.g., 40% of 50%), any one of the (ii) current part yield percentages 546 falls or is below a current part yield minimum threshold percentage (e.g., 40% or 50%), the (iii) stock completion time 550 exceeds a stock completion maximum threshold time (e.g., 30 days or 60 days), any one of the (iv) part completion times exceeds a part completion maximum threshold time (e.g., 20 days or 40 days), the (v) stock completion percentage 552 falls or is below a stock completion minimum threshold percentage after a minimum amount of time has passed (e.g., 30 days or 60 days), any one of the (vi) part completion percentages falls or is below a part completion minimum threshold percentage after a minimum amount of time has passed (e.g., 30 days or 60 days), the (vii) number of total job failures 542 exceeds a total job failure threshold, or a combination thereof.

In some embodiments, the actions or proactive steps taken by the administration server 106 can involve adjusting one or more printer job queues 702 or worker job queues 1104 such that one of the ready jobs 530 associated with the stock identifier 502 is moved up the one or more printer job queues 702 or worker job queues 1104. That is, the administration server 106 can be programmed to adjust the printer job queue 702 of one of the 3D printers 112 and the worker job queue 1104 of one of the workers 1102 such that one of the ready jobs 530 associated with the stock identifier 502 is moved up the printer job queue 702 or the worker job queue 1104 based on at least one of the stock yield percentage 544, the current part yield percentages 546, the stock completion time 550, the part completion times, the stock completion percentage 552, the part completion percentages, and the total job failures 542.

The administration server 106 can be programmed to adjust the printer job queue 702 of one of the 3D printers 112 and the worker job queue 1104 of one of the workers 1102 by adjusting the point values of all ready jobs 530 (and, in some cases, waiting jobs 532) associated with the stock identifier 502 or associated with one of the 3D-printed parts 400. For example, the administration server 106 can be programmed to increment or raise the point values of all ready jobs 532 (and, in some cases, waiting jobs 532) associated with the stock identifier 502 if the (i) stock yield percentage 544 falls or is below a stock yield minimum threshold percentage, the (ii) stock completion time 550 exceeds a stock completion maximum threshold time, the (iii) stock completion percentage 552 falls or is below a stock completion minimum threshold percentage after a minimum amount of time has passed, the (iv) number of total job failures 542 exceeds a total job failure threshold, or a combination thereof. Also, for example, the administration server 106 can be programmed to increment or raise the point values of all ready jobs 532 (and, in some cases, waiting jobs 532) associated with a 3D-printed part 400 if the (i) current part yield percentages 546 for that part 400 falls or is below a current part yield minimum threshold percentage, the (ii) part completion time for that part 400 exceeds a part completion maximum threshold time, (iii) the part completion percentage for that part 400 falls or is below a part completion minimum threshold percentage after a minimum amount of time has passed, or a combination thereof. As a more specific example, the administration server 106 can be programmed to increment or raise the point values of all ready jobs 532 (and, in some cases, waiting jobs 532) associated with the stock identifier 502 by adding additional points to the current point value, multiplying the current point value by a preset amount, or squaring the current point value.

As an example, the administration server 106 can be programmed to adjust the printer job queue 702 of one of the 3D printers 112 or the worker job queue 1104 of one of the workers 1102 by adding points (e.g., 10 points) to the current point values of all ready jobs 530 and waiting jobs 532 associated with the stock identifier 502 if the stock completion time 550 exceeds 60 days and the stock yield percentage 544 falls below or is below 40%.

One technical problem faced by the applicant is how to ensure that 3D-printed products are produced on schedule and that any delays due to job failures or inventory shortages do not have significant effects on the production lead time. One technical solution discovered and developed by the applicant is to calculate and track stock yield percentages, stock completion times, stock completion percentages, and total job failures associated with a stock identifier and calculate and track part yield percentages, part competition times, and part completion percentages associated with all of the parts of the product throughout the manufacturing process. Certain rules or conditions can be set such that if any yield percentages or completion percentages fall below a minimum threshold percentage or if any completion times exceed a maximum threshold time, the jobs associated with a particular stock identifier or a particular 3D-printed part can be moved up the queues of the assigned 3D printers or workers to ensure that such jobs are not delayed any further.

Figure 6:
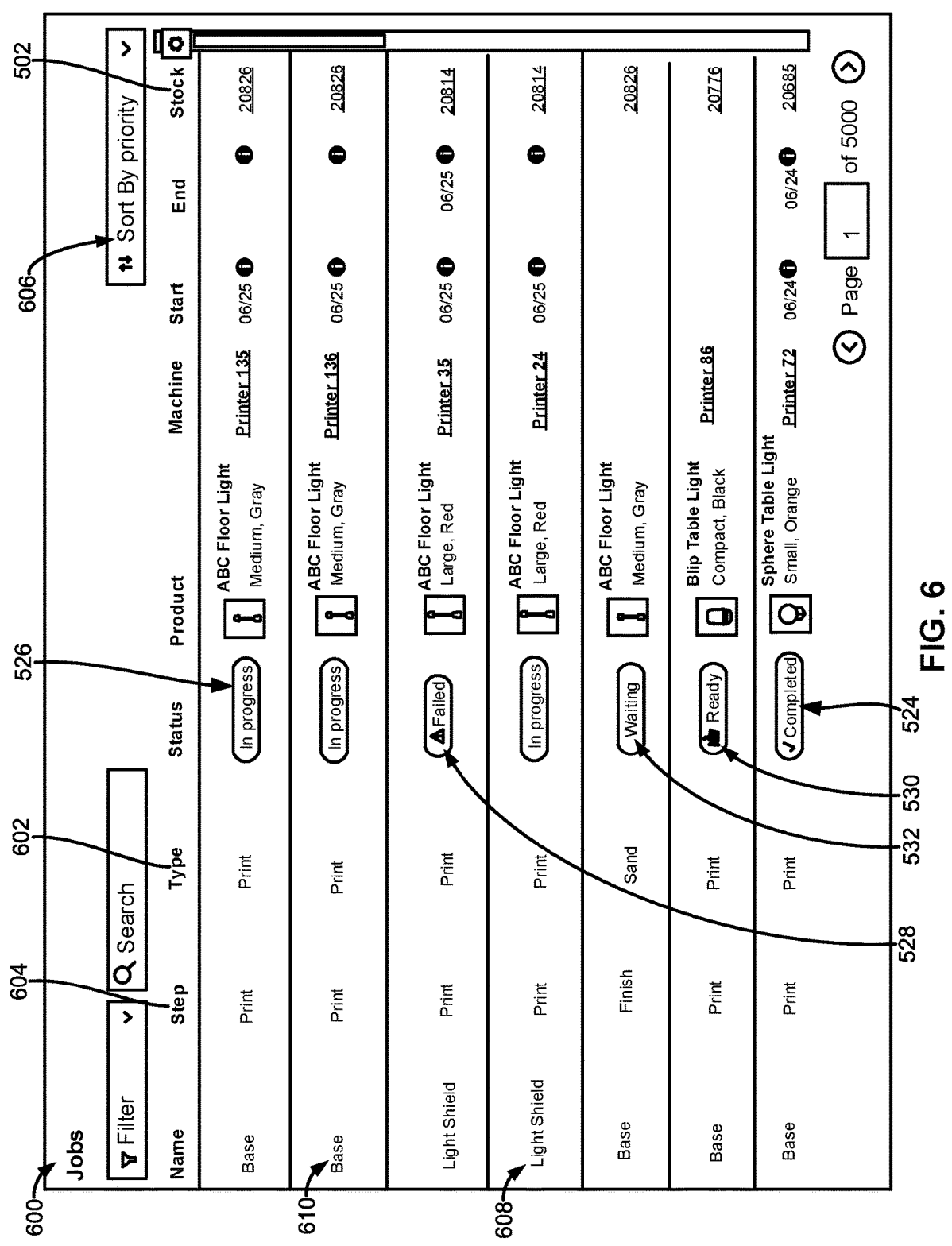
FIG. 6 illustrates one example page of a jobs panel that can provide a real-time overview of the statuses of all jobs created by the system.

FIG. 6 illustrates one example page of a jobs panel 600. The jobs panel 600 can provide a real-time overview or snapshot of the statuses of all jobs 510 created by the administration server 106 as a result of orders 300 placed by customers. The jobs panel 600 can be rendered on a display of a computing device such as one of the production client devices 110 or a device used by a foreman or manager to monitor the 3D-printing-based manufacturing process. In some embodiments, the jobs panel 600 can be accessed through a web browser. In other embodiments, the jobs panel 600 can be accessed through a downloadable desktop or mobile software application.

The jobs panel 600 can be generated and continuously updated by the administration server 106. The jobs panel 600 can be one of several panel screens, dashboard screens, graphical user interface (GUI) screens provided as part of an online administration panel or portal.

As previously mentioned, the jobs panel 600 can provide a real-time overview of the statuses of all jobs 510 including in progress jobs 526, ready jobs 530, waiting jobs 532, completed jobs 524, and failed jobs 528. The jobs panel 600 can allow a user (e.g., a worker 1102 or administrator) to search for a particular job 510 or to filter the jobs 510 displayed by a job type 602 (e.g., 3D-printing jobs 512, finishing jobs 514, assembly jobs 516, QA jobs 518, or packing jobs 520), the job status 522, a manufacturing step or phase 604 (e.g., a printing phase, a finishing phase, a QA phase, an assembly phase, or a packing phase), a product name, the 3D printer 112 assigned to the job (if any), and the stock identifier 502.

The jobs panel 600 can also allow a user (e.g., a worker 1102 or administrator) to sort the jobs 510 by their priority level 534 through a sort functionality 606. For example, the sort functionality 606 can allow the user to search or filter for high-priority jobs.

The sort functionality 606 can also allow a user to sort the jobs 510 based on the points-based ranking system such that jobs 510 (e.g., ready jobs 530 and waiting jobs 532) with a higher point value are ranked before other jobs 510 with a lower point value. As previously discussed, the points-based ranking system can be used by the administration server 106 to rank or order jobs 510 such that those jobs 510 with a higher point value are more likely to be performed or undertaken by a 3D printer 112 or worker 1102 before other jobs 510 with a lower point value.

FIG. 6 also illustrates that the jobs panel 600 can also display one or more duplicated jobs 608. A job 510 can be duplicated for a variety of reasons. For example, a failed job 528 can be duplicated in order to ensure that the failed job 528 is still retained by the system 100 and is attempted once again.

The administration server 106 can be programmed to automatically duplicate a failed job 528 by creating a duplicated job 608. The duplicated job 608 can be associated with the same stock identifier 502 as the failed job 528. The administration server 106 can automatically duplicate the failed job 528 (by creating the duplicated job 608) as soon as an in progress job 526 is marked as having failed by a production client device 110, a 3D printer 112, or a combination thereof.

A duplicated job 608 can be assigned a job status 522 similar to any of the jobs 510 initially created by the administration server 106. For example, a duplicated job 608 can initially be assigned a job status 522 of "ready" or "waiting." The duplicated job 608 can then be automatically assigned to a 3D printer 112, a worker 1102, or a combination thereof. When a duplicated job 608 having a job status 522 of "ready" is started by a 3D printer 112 or worker 1102, the duplicated job 608 can then have its status changed to "in progress." An "in progress" duplicated job 608 can either end in failure (that is, fail once again) or be completed.

In some embodiments, the same point value assigned to a ready job 530 that ultimately resulted in failure (or that became the failed job 528) can automatically be assigned to the duplicated job 608 such that the duplicated job 608 retains the same points-based ranking and is started or undertaken as soon as possible. Moreover, all failed jobs 528 are tracked as part of the calculation of the stock yield percentage 544, any applicable current part yield percentage 546, any applicable historical part yield percentage 548, and the total job failures 542.

For example, the administration server 106 can be programmed to factor in the outcomes of all duplicated jobs 608 in any calculations of the stock yield percentage 544. Moreover, the administration server 106 can be programmed to factor in the outcomes of all duplicated jobs 608 in any calculations of a current part yield percentage 546 or a historical part yield percentage 548 for a particular 3D-printed part 400 when the duplicated job 608 is needed to manufacture the particular 3D-printed part 400. As a more specific example, a product 302 that is currently being manufactured can have a current stock yield percentage 544 of 80% due to 8 completed jobs 524 and 2 failed jobs 528 associated with the manufacturing of the product 302. In this example, one of the failed jobs 528 can be duplicated and undergoes failure once again (that is, the duplicated job 608 fails). In this scenario, the current stock yield percentage 544 for this product 302 can now be lowered to 72.7% (or 8 completed jobs/(8 completed jobs+3 failed jobs)).

One technical problem faced by the applicant is how to deal with jobs that fail (for example, 3D-printing jobs that fail) during the manufacturing process and how to factor such failures into decision-making concerning how the product is manufactured in the short-term and long-term. One technical solution discovered and developed by the applicant is to immediately duplicate a failed job as a duplicated job and to factor the failed job (and the outcome of the duplicated job) into certain yield percentage calculations that can then be used to decide whether jobs associated with a product should be prioritized over other jobs and whether the product (or a part of a product) should be re-engineered or re-designed in the future.

In some embodiments, the administration server 106 can pre-emptively duplicate certain jobs 510 (or all of the jobs 510) related to a particular 3D-printed part 400 based on a historical part yield percentage 548 (see FIG. 5A). As previously discussed, the historical part yield percentage 548 can take into account all completed jobs 524 and all failed jobs 528 related to the manufacturing of a particular 3D-printed part 400 over time and across numerous stock identifiers 502. Such pre-emptively duplicated jobs 610 can be created when the historical part yield percentage 548 is below a preset historical part yield threshold percentage. When the historical part yield percentage 548 for a particular 3D-printed part 400 is below the historical part yield threshold percentage, this suggests that the 3D-printed part 400 may be difficult to manufacture and one or more jobs 510 required to produce the 3D-printed part 400 may be prone to failure. For this reason, the administration server 106 can create one or more pre-emptively duplicated jobs 610 in order to manufacture two or more versions of the 3D-printed part 400 to account for these potential failures.

As shown in FIG. 6, a pre-emptively duplicated job 610 can be in progress at the same time as the "original" job. For example, a series of jobs 510 can be created initially by the administration server 106 in order to produce a base component of a floor light. In this example, the historical part yield percentage 548 for this base component can be below a preset historical part yield threshold percentage (e.g., 40%) such that the administration server 106 also creates a series of pre-emptively duplicated jobs 610 in case any of the "original" jobs 510 fails.

In some embodiments, the pre-emptively duplicated jobs 610 can be created at the same time or contemporaneously as the original jobs 510. In other embodiments, the pre-emptively duplicated jobs 610 can be created after the original jobs 510 are created but before any job failures occur.

One technical problem faced by the applicant is how to ensure that products having parts that are difficult to 3D print and prone to print failures (which are often the parts that contribute to the aesthetics of such products) are not disadvantaged when it comes to how long it takes to manufacture such products. One technical solution discovered and developed by the applicant is to pre-emptively duplicate certain jobs (e.g., 3D-printing jobs) needed to make the part based on the historical part yield percentage for the part. This ensures that even if the "original" job fails, at least one of the duplicated jobs could still succeed and allow the manufacturing process to continue.

The administration server 106 can also be programmed to designate or flag a 3D-printed part 400 for further engineering or re-engineering when the historical part yield percentage 548 for this particular 3D-printed part 400 falls below a preset or predetermined historical part yield threshold percentage (e.g., 30% or 20%). For example, when the historical part yield percentage 548 for a particular 3D-printed part 400 falls below a preset or predetermined historical part yield threshold percentage, this can indicate that this particular 3D-printed part 400 is too difficult to manufacture based on how the 3D-printed part 400 is designed or engineered and that further designing or engineering of the 3D-printed part 400 is needed in order to improve the current part yield percentage 546 and historical part yield percentage 548 for this 3D-printed part 400.

In some embodiments, the administration server 106 can also be programmed to track a SKU yield percentage calculated based on an amount of failed jobs 528 and an amount of completed jobs 524 associated with a SKU identifier 506 (see FIG. 5A). The administration server 106 can also be programmed to track the SKU yield percentage over multiple orders 300 or over a set period of time. As previously discussed, the SKU identifier 506 can be used to identify all instances of a product of a particular product color 304 and product size 306 (for example, all medium-sized ABC floor lights that are colored red). One SKU identifier 506 can be associated with multiple stock identifiers 502.

The administration server 106 can be programmed to calculate the SKU yield percentage by dividing the total number of completed jobs 524 associated with the SKU identifier 506 by a sum of the total number of failed jobs 528 and the total number of completed jobs 524 associated with the SKU identifier 506 (SKU yield percentage=total number of completed jobs associated with SKU/(total number of failed jobs associated with SKU+total number of completed jobs associated with SKU). The SKU yield percentage can be calculated periodically or intermittently In some embodiments, the SKU yield percentage can be calculated every time a job 510 associated with the SKU identifier 506 is completed or ends in failure. The SKU yield percentage can provide real-time insights into the efficiency and effectiveness of the manufacturing process as it pertains to a product 302 that falls under the SKU (for example, all medium-sized ABC floor lights that are colored red).

The SKU yield percentage can be an accurate indicator of how much labor (e.g., worker hours) and other resources (e.g., 3D-printer time, 3D printing materials, etc.) are actually being expended to manufacture instances of the product 302 over time and over multiple orders. More specifically, when the SKU yield percentage is low or is below certain percentage thresholds, this can indicate that significant labor and other resources are being wasted in order to manufacture instances of the product 302.

As a result, the administration server 106 can be programmed to adjust the product price 308 (see FIG. 3) of the product 302 based on the SKU yield percentage (if the product 302 falls under the SKU identifier 506 used to track the SKU yield percentage). For example, the administration server 106 can increase the product price 308 of the product 302 when the SKU yield percentage falls or is below a SKU yield threshold (e.g., when the SKU yield percentage falls below 60%, 50%, or 40%).

In certain embodiments, the administration server 106 can also decrease the product price 308 of a product 302 when the SKU yield percentage exceeds or is above the SKU yield threshold. When the SKU yield percentage exceeds or is above the SKU yield threshold, this can indicate that the manufacturing process is efficient and these efficiencies can be passed on to customers in the form of a price reduction.

In some embodiments, the administration server 106 can also be programmed to track a product class yield percentage calculated based on an amount of failed jobs 528 and an amount of completed jobs 524 associated with a product class 508 (see FIG. 5A). The administration server 106 can also be programmed to track the product class yield percentage over multiple orders 300 or over a set period of time. As previously discussed, the product class 508 can refer to a general classification of the product 302 without regard to product color 304 or product size 306 (e.g., all ABC floor lights).

The administration server 106 can be programmed to calculate the product class yield percentage by dividing the total number of completed jobs 524 associated with the product class 508 by a sum of the total number of failed jobs 528 and the total number of completed jobs 524 associated with the product class 508 (product class yield percentage=total number of completed jobs associated with product class/(total number of failed jobs associated with product class+total number of completed jobs associated with product class). The product class yield percentage can be calculated periodically or intermittently In some embodiments, the product class yield percentage can be calculated every time a job 510 associated with the product class 508 is completed or ends in failure. The product class yield percentage can provide real-time insights into the efficiency and effectiveness of the manufacturing process as it pertains to all products 302 that fall under the product class (for example, all ABC floor lights).

The product class yield percentage can be an accurate indicator of how much labor (e.g., worker hours) and other resources (e.g., 3D-printer time, 3D printing materials, etc.) are actually being expended to manufacture products 302 that fall under the product class 508. More specifically, when the product class yield percentage is low or is below certain percentage thresholds, this can indicate that significant labor and other resources are being wasted in order to manufacture such products 302.

As a result, the administration server 106 can be programmed to adjust the product prices 308 (see FIG. 3) of all products 302 that fall under the product class 508 based on the product class yield percentage. For example, the administration server 106 can increase the product prices 308 of all products 302 that fall under the product class 508 when the product class yield percentage falls or is below a product class yield threshold (e.g., when the product class yield percentage falls below 60%, 50%, or 40%).

In certain embodiments, the administration server 106 can also decrease the product prices 308 of the products 302 that fall under the product class 508 when the product class yield percentage exceeds or is above the product class yield threshold. When the product class yield percentage exceeds or is above the product class yield threshold, this can indicate that the manufacturing process is efficient and these efficiencies can be passed on to customers in the form of a price reduction.

In some embodiments, the administration server 106 can transmit an instruction or command to the retail server 102 to adjust (e.g., raise or lower) the product price(s) 308 of the product(s) 302. In other embodiments, the administration server 106 can access the retail database 104 directly to adjust (e.g., raise or lower) the product price(s) 308 of the product(s) 302.

In some embodiments, the administration server 106 can be programmed to remove a product 302 associated with a particular SKU identifier 502 from the online retail web site 303 when the SKU yield percentage falls below a minimum SKU yield threshold percentage. In these and other embodiments, the administration server 106 can be programmed to remove all products 302 that fall under a product class 508 from the online retail website 303 when the product class yield percentage falls below a minimum product class yield threshold percentage. For example, this can be done in order to allow the product(s) 302 to be re-engineered or re-designed for manufacturing purposes.

In certain embodiments, the administration server 106 can transmit an instruction or command to the retail server 102 to remove one or more products 302 from the online retail website 303. In other embodiments, the administration server 106 can access the retail database 104 directly to remove one or more products 302 from the online retail website 303.

One technical problem faced by the applicant is how to accurately price a high-quality 3D-printed product that is made on demand and that takes into account the true cost, in terms of both labor and materials, of making the product. One technical solution discovered and developed by the applicant is to dynamically set the price of the 3D-printed product such that the price accurately reflects the inefficiencies (or efficiencies) associated with the manufacturing process. For example, the price of the 3D-printed product can be adjusted based on certain yield percentages calculated across multiple orders. As a more specific example, the yield percentages can include a SKU yield percentage or a product class yield percentage. The price of the 3D-printed product can be increased when the SKU yield percentage falls below a minimum SKU yield threshold percentage or the product class yield percentage falls below a minimum product class yield threshold percentage.

Figure 7:
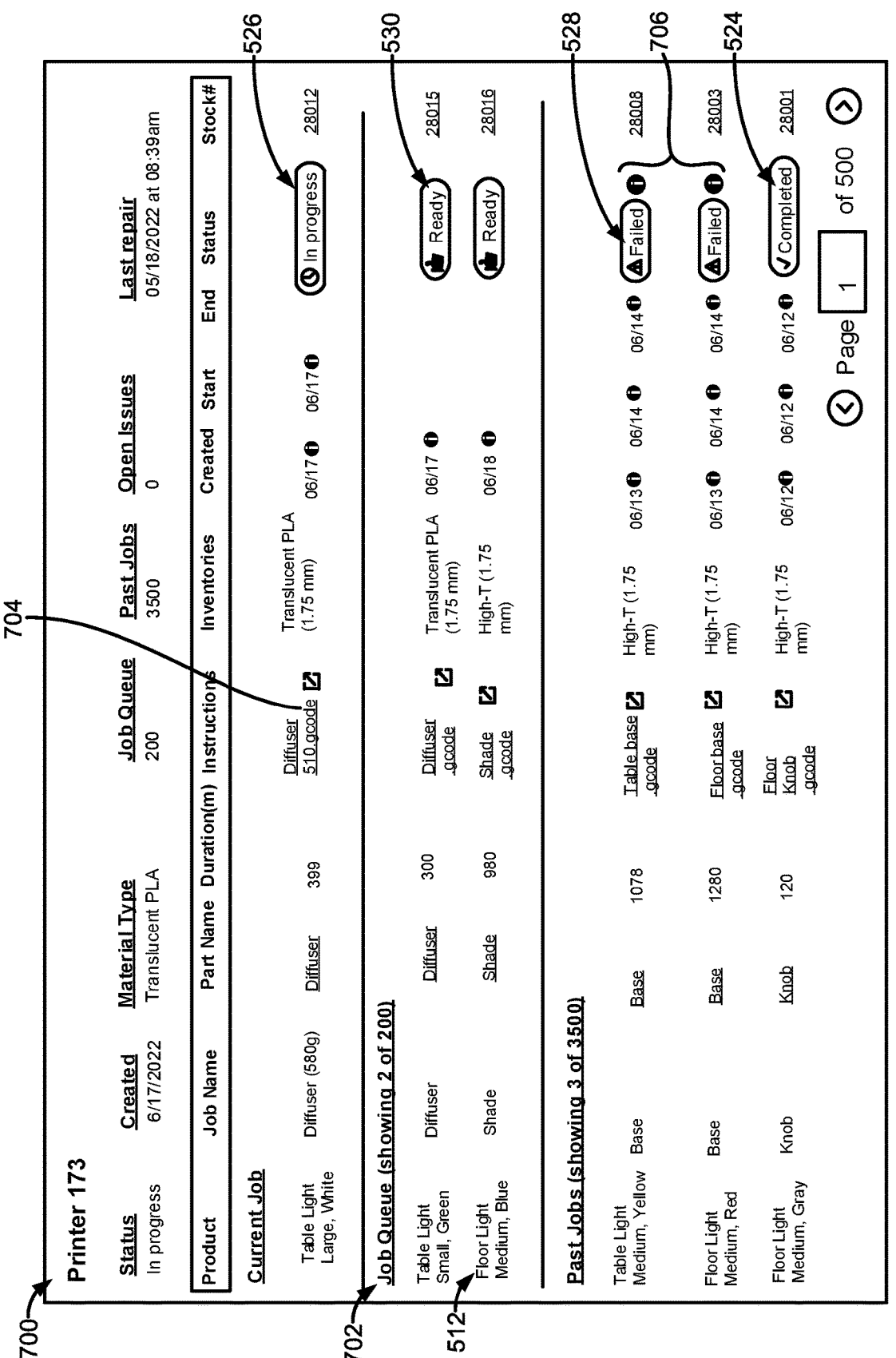
FIG. 7 illustrates an example printer status page that can provide a current status of one of the 3D printers.

FIG. 7 illustrates one embodiment of a printer status page 700. The printer status page 700 can provide a real-time overview or snapshot of the current status of one of the 3D printers 112. Although FIG. 7 illustrates an example printer status page 700 for one of the 3D printers 112, it is contemplated by this disclosure that each of the 3D printers 112 can have its own printer status page 700.

The printer status page 700 can be rendered on a display of a computing device such as one of the production client devices 110 or a device used by a foreman or manager to monitor the 3D-printing-based manufacturing process. In some embodiments, the printer status page 700 can be accessed through a web browser. In other embodiments, the printer status page 700 can be accessed through a down-loadable desktop or mobile software application.

The printer status page 700 can be generated and continuously updated by the administration server 106. The printer status page 700 can be one of several pages or GUI screens provided as part of an online administration panel or portal.

FIG. 7 illustrates that the print status page 700 can show part of a printer job queue 702 for the 3D printer 112. As previously discussed, the administration server 106 can be programmed to generate and maintain the printer job queue 702. The printer job queues 702 for all of the 3D printers 112 can be stored as part of the administration database 108.

In some embodiments, the administration server 106 can be programmed to transmit the printer job queue 702 to a production client device 110 tasked with operating the 3D printer 112. In these embodiments, the administration server 106 can be programmed to continuously or periodically make updates to the printer job queue 702 and transmit updated instances of the printer job queue 702 to the production client device 110.

In other embodiments, the administration server 106 can be programmed to transmit the printer job queue 702 directly to the 3D printer 112. In these embodiments, the administration server 106 can be programmed to continuously or periodically make updates to the printer job queue 702 and transmit updated instances of the printer job queue 702 directly to the 3D printer 112.

The administration server 106 can also be programmed to assign ready jobs 530 (ready 3D-printing jobs 512) to the 3D printer 112 by adding the ready jobs 530 to the printer job queue 702. As previously discussed, the ready jobs 530 can be added to the printer job queue 702 in accordance with a point value associated with each of the ready jobs 530.

As previously discussed, the point value associated with a ready job 530 can be used to rank the ready job 530 against other ready jobs 530 to determine which ready jobs 530 from the printer job queue 702 are performed first by the 3D printer 112.

The point value of a ready job 530 can be initially assigned or allotted when an order 300 necessitating the ready job 530 is first received by the retail server 102. The point value initially assigned or allotted to the ready job 530 can be a default amount (e.g., 10 points). This point value (beginning with the default amount on the day that the order 300 was received) can be incremented by a preset amount (e.g., 1 point) periodically (e.g., at the end of each day, each half-day, each hour, each half hour, etc.) until the ready job 530 is performed and successfully completed by the 3D printer 112.

As previously discussed, some ready jobs 530 can be created in connection with order(s) 300 having a priority level 534 (e.g., a high priority level 538 or a low priority level 540) attached to the order(s) 300. For example, orders 300 placed by VIP customers or repeat customers can have a high priority level 538 assigned to such orders 300. Also, for example, orders 300 placed for testing purposes, R&D purposes, or marketing purposes can have a lower priority level 538 attached to such orders.

An order 300 having a high priority level 538 attached or otherwise assigned to the order 300 can be treated as a rush or urgent order such that ready jobs 530 associated with the order 300 can be initially assigned or allotted a greater point value than the default point value for purposes of ranking or ordering such ready jobs 530. Moreover, this greater initial point value can be incremented by a higher preset amount periodically until the job is finished or completed. In this way, the administration server 106 can be programmed to prioritize such ready jobs 530 above other jobs. This significantly decreases the completion times or lead times of such higher-priority ready jobs 530.

In some embodiments, waiting jobs 532 can also be added to the printer job queue 702. In these embodiments, the waiting jobs 532 can be added to the printer job queue 702 but hidden from view such that waiting jobs 532 are not visible until the job status 522 of such jobs are changed to "ready." As previously discussed, waiting jobs 532 can also be assigned or allotted point values. This point value (beginning with the default amount on the day that the order 300 was received) can also be incremented by a preset amount (e.g., 1 point) periodically. The point value for each waiting job 532 can carry over when the status of the waiting job 532 changes to a ready job 530.

The point value of each waiting job 532 can also be initially assigned or allotted when the order 300 for the product 302 was first received by the retail server 102. The point value initially assigned or allotted to each waiting job 532 associated with the stock identifier 502 can be the same default amount (e.g., 10 points) as that assigned or allotted for each ready job 530. This point value (beginning with the default amount on the day that the order 300 was received) can also be incremented by a preset amount (e.g., 1 point) periodically (e.g., at the end of each day, each half-day, each hour, each half hour, etc.) until the status of the waiting job 532 changes to a ready job 530 and the ready job 530 is finished or completed. The point value for each waiting job 532 can carry over when the status of the waiting job 532 changes to a ready job 530 (for example, when a particular 3D printer 112 becomes available or when an out-of-stock standardized functional component 402 is replenished). That is, the same point value accrued by the waiting job 532 then becomes the point value of the ready job 530 now taking its place In some embodiments, the point value for each of the ready jobs 530 and waiting jobs 532 can be hidden from view such that the point values are not displayed as part of any printer status pages 700.

The printer job queue 702 can comprise ready jobs 530 (ready 3D-printing jobs 512) associated with multiple stock identifiers 502 (or multiple products 302). In this sense, ready jobs 530 associated with one stock identifier 502 are "competing" with other ready jobs 530 associated with other stock identifiers 502 for the services of this 3D printer 112. Moreover, since new ready jobs 530 are likely to be added to the printer job queue 702 before the 3D printer 112 can finish the ready jobs 530 currently in its printer job queue 702, those ready jobs 530 that are ranked higher in the printer job queue 702 will have a better chance of being completed sooner.

The administration server 106 can be programmed to continuously adjust the printer job queue 702 due to: new ready jobs 530 (including any new high-priority ready jobs 530) being created as a result of new incoming orders 300, the statuses of waiting jobs 532 change to ready jobs 530, the statuses of ready jobs 530 change to waiting jobs 532 due to a change in circumstances (e.g., 3D printing material or other inventory becomes unavailable, etc.), certain ready jobs 530 are successfully completed, and certain ready jobs 530 end in failure and are duplicated as duplicated jobs 608.

Moreover, as previously discussed, the administration server 106 can also be programmed to adjust the printer job queue 702 of the 3D printer 112 by elevating the rank or order of one or more ready jobs 530 in the printer job queue 702 due to at least one of: a stock completion time 550, a part completion time, a stock yield percentage 544, a current part yield percentage 546, a stock completion percentage 552, a part completion percentage, and a total number of job failures 542.

For example, the administration server 106 can be programmed to increment or raise the point values of all ready jobs 532 (and, in some cases, waiting jobs 532) associated with a stock identifier 502 (i) if the stock yield percentage 544 associated with the stock identifier 520 falls or is below a stock yield minimum threshold percentage, (ii) if an applicable current part yield percentage 546 falls or is below a current part yield minimum threshold percentage, (iii) if the stock completion time 550 exceeds a stock completion maximum threshold time, (iv) if an applicable part completion time exceeds a part completion maximum threshold time, (v) if the stock completion percentage 552 falls or is below a stock completion minimum threshold percentage after a minimum amount of time has passed, (vi) if an applicable part completion percentage falls or is below a part completion minimum threshold percentage after a minimum amount of time has passed, if (vii) the number of total job failures 542 exceeds a total job failure threshold, or a combination thereof. The administration server 106 can be programmed to increment or raise the point values of such ready jobs 532 (and, in some cases, waiting jobs 532) associated with the stock identifier 502 by adding additional points to the current point value, multiplying the current point value by a preset amount, or squaring the current point value.

In some embodiments, a ready job 530 appearing first or on the top of the printer job queue 702 can have its job status 522 changed from "ready" to "in progress" when the ready job 530 is manually started by a worker 1102 assigned to the 3D printer 112. For example, the worker 1102 can connect or otherwise communicatively couple a production client device 110 to the 3D printer 112 in order to transmit certain machine-readable instructions 704 (e.g., G-Code instructions) to the 3D printer 112. The 3D printer 112 can then execute the machine-readable instructions 704 in order to 3D print the part 400.

In other embodiments, a ready job 530 appearing first on the printer job queue 702 or on the top of the printer job queue 702 can have its job status 522 changed from "ready" to "in progress" when the ready job 530 is automatically started by the 3D printer 112. For example, the 3D printer 112 can automatically commence ready jobs 530 included on its printer job queue 702 by executing machine-readable instructions 704 (e.g., G-Code instructions) related to such ready jobs 530. For example, the administration server 106 can be programmed to transmit any machine-readable instructions 704 related to a ready job 530 to the 3D printer 112 at the same time that the administration server 106 adds the ready job 530 to the printer job queue 702 of the 3D printer 112.

Once the 3D printer 112 has commenced a ready job 530 (i.e., the job status 522 is changed to "in progress), the job can either proceed to completion or end in failure. If the in progress job 526 proceeds to completion, the job status 522 is changed to a completed job 524. If the in progress job 526 ends in failure, the job status 522 is changed to a failed job 528.

As will be discussed in more detail in relation to FIGS. 9A and 9B, a 3D-printing job 512 can fail due to a machine failure 902 (a failure of the 3D printer 112 performing the 3D-printing job 512, see FIG. 9A), a print quality failure 908 (a failure due to the end product produced as a result of the 3D-printing job 512 failing a QA inspection, see FIG. 9B), or a combination thereof. A 3D-printing job 512 is considered complete when the part 400 has been 3D printed and the finished 3D-printed part 400 has passed a QA inspection.

When the 3D-printing job 512 fails due to a machine failure 902, the 3D printer 112 and/or a production client device 110 communicatively coupled to the 3D printer 112 can transmit a job failure notification to the administration server 106. For example, a worker 1102 can notice that an in progress 3D-printing job 512 has ceased prematurely due to a failure of one of the components of the 3D printer 112 (e.g., a carriage of the 3D printer 112 being loose or bent), in this example, the worker 1102 can apply one or more user inputs to a job status page or another page of the administration panel (via, for example, a production client device 110 carried by the worker 1102) to indicate that this particular 3D-printing job 512 has failed.

When the 3D-printing job 512 fails due to a print quality failure 908, a worker 1102 assigned to the QA inspection of the 3D-printed part 400 can apply one or more user inputs to a job status page or another page of the administration panel to indicate that this particular 3D-printing job 512 has failed.

The administration server 106 can be programmed to track the number of failed jobs 528 undertaken by the 3D printer 112. In some embodiments, the administration server 106 can be programmed to track the number consecutive failed jobs 706. The administration server 106 can also be programmed to take certain action with respect to the 3D printer 112 based on the number of consecutive failed jobs 706 (i.e., the number of consecutive 3D-printing jobs 512 undertaken by the 3D printer 112 that ended in failure). For example, the administration server 106 can be programmed to take certain action with respect to the 3D printer 112 when the number of consecutive failed jobs 706 exceeds a threshold amount.

In some embodiments, the administration server 106 can be programmed to automatically take the 3D printer 112 offline or to remove the 3D printer 112 from a pool of available 3D printers based on the number of consecutive failed jobs 706. For example, the administration server 106 can be programmed to automatically take the 3D printer 112 offline or to remove the 3D printer 112 from a pool of available 3D printers when the number of consecutive failed jobs 706 exceeds two (that is, when the 3D printer 112 has three consecutive failed jobs). It has been discovered by the applicant that when a 3D printer 112 has failed three consecutive jobs (including three consecutive print quality failures 908), the likelihood of this 3D printer 112 failing its next job is substantial without the 3D printer 112 undergoing maintenance or diagnostics. The administration server 106 can be programmed to automatically take the 3D printer 112 offline or to remove the 3D printer 112 from a pool of available 3D printers when the number of consecutive failed jobs 706 resulting from print quality failures 908 exceeds two (that is, when the 3D printer 112 has three consecutive print quality failures 908).

In other embodiments, the administration server 106 can be programmed to automatically take the 3D printer 112 offline or to remove the 3D printer 112 from a pool of available 3D printers when the number of consecutive failed jobs 706 resulting from machine failures 902 exceeds two.

Any 3D printer 112 taken offline can be designated for maintenance or diagnostic testing. The 3D printer 112 can remain offline or unavailable until the necessary maintenance or diagnostic testing is performed.

In all such embodiments, when the 3D printer 112 is taken offline or removed from a pool of available 3D printers, no further 3D-printing jobs 512 can be assigned to this 3D printer 112 by the administration server 106. Also, when a 3D printer 112 is taken offline, the ready jobs 530 (and waiting jobs 532) assigned to this 3D printer 112 can be automatically re-assigned by the administration server 106 to currently available 3D printers 112. Those ready jobs 530 (and waiting jobs 532) can then be automatically added to the printer job queues 702 of those available 3D printers 112. Those ready jobs 530 (and waiting jobs 532) can retain their point values when ranking the ready jobs 530 (and waiting jobs 532) against those jobs that were previously included in the printer job queues 702 of the available 3D printers 112.

Figure 8:
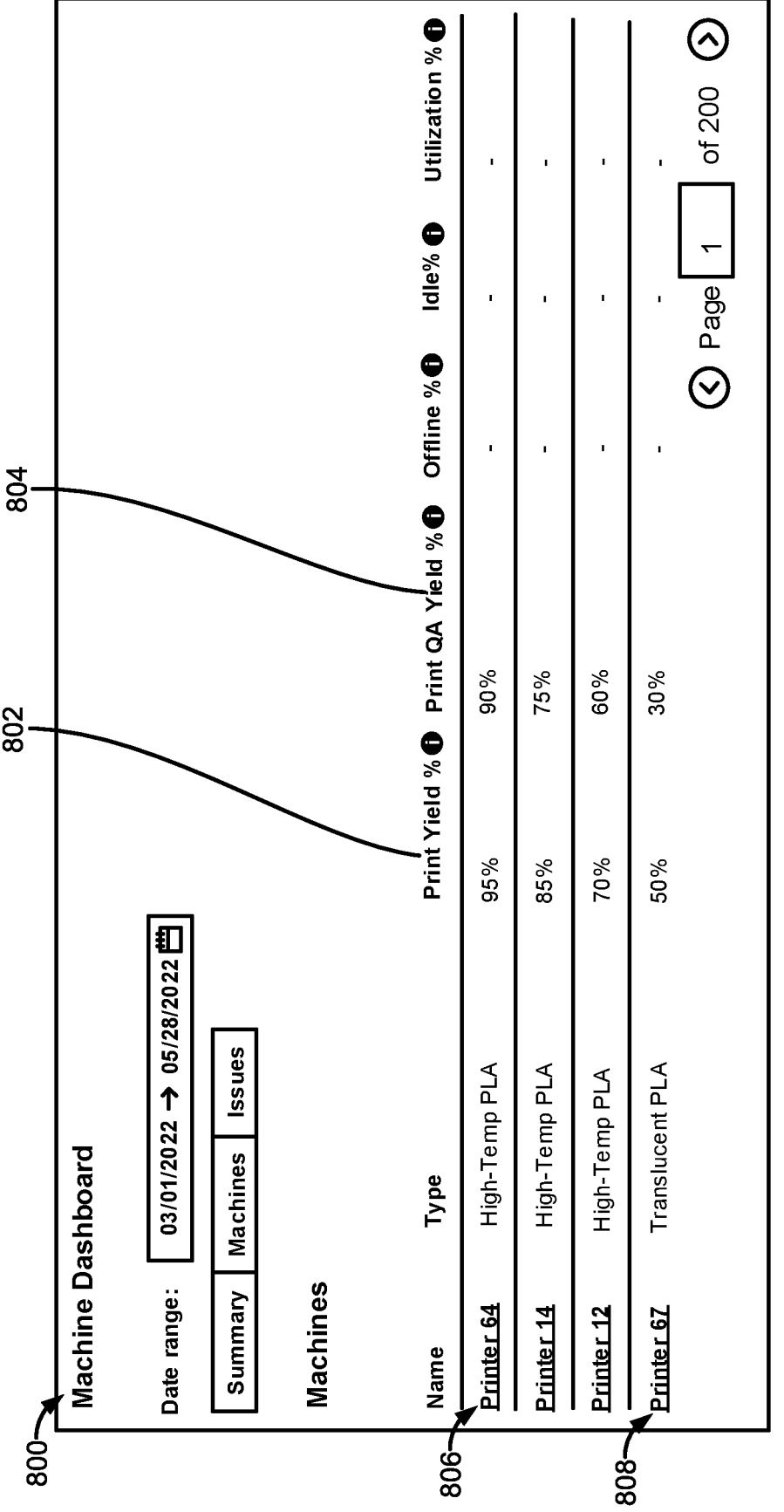
FIG. 8 illustrates an example printer dashboard page that can provide real-time performance metrics concerning all of the 3D printers.

FIG. 8 illustrates one embodiment of a printer dashboard page 800. The printer dashboard page 800 can provide real-time performance metrics or data concerning all of the 3D printers 112. For example, the printer dashboard page 800 can allow a worker 1102 or administrator of the system 100 to determine if certain 3D printers 112 should be taken offline or designated for repair or maintenance.

The printer dashboard page 800 can be rendered on a display of a computing device such as one of the production client devices 110 or a device used by a foreman or manager to monitor the 3D-printing-based manufacturing process. In some embodiments, the printer dashboard page 800 can be accessed through a web browser. In other embodiments, the printer dashboard page 800 can be accessed through a downloadable desktop or mobile software application.

The printer dashboard page 800 can be generated and continuously updated by the administration server 106. The printer dashboard page 800 can be one of several panel screens, dashboard screens, graphical user interface (GUI) screens provided as part of an online administration panel or portal.

As shown in FIG. 8, the printer dashboard page 800 can display a print yield percentage 802 and a print QA yield percentage 804 for each of the 3D printers 112. The administration server 106 can be programmed to calculate and track the print yield percentage 802 and the print QA yield percentage 804 for each of the 3D printers 112.

Figure 9A:
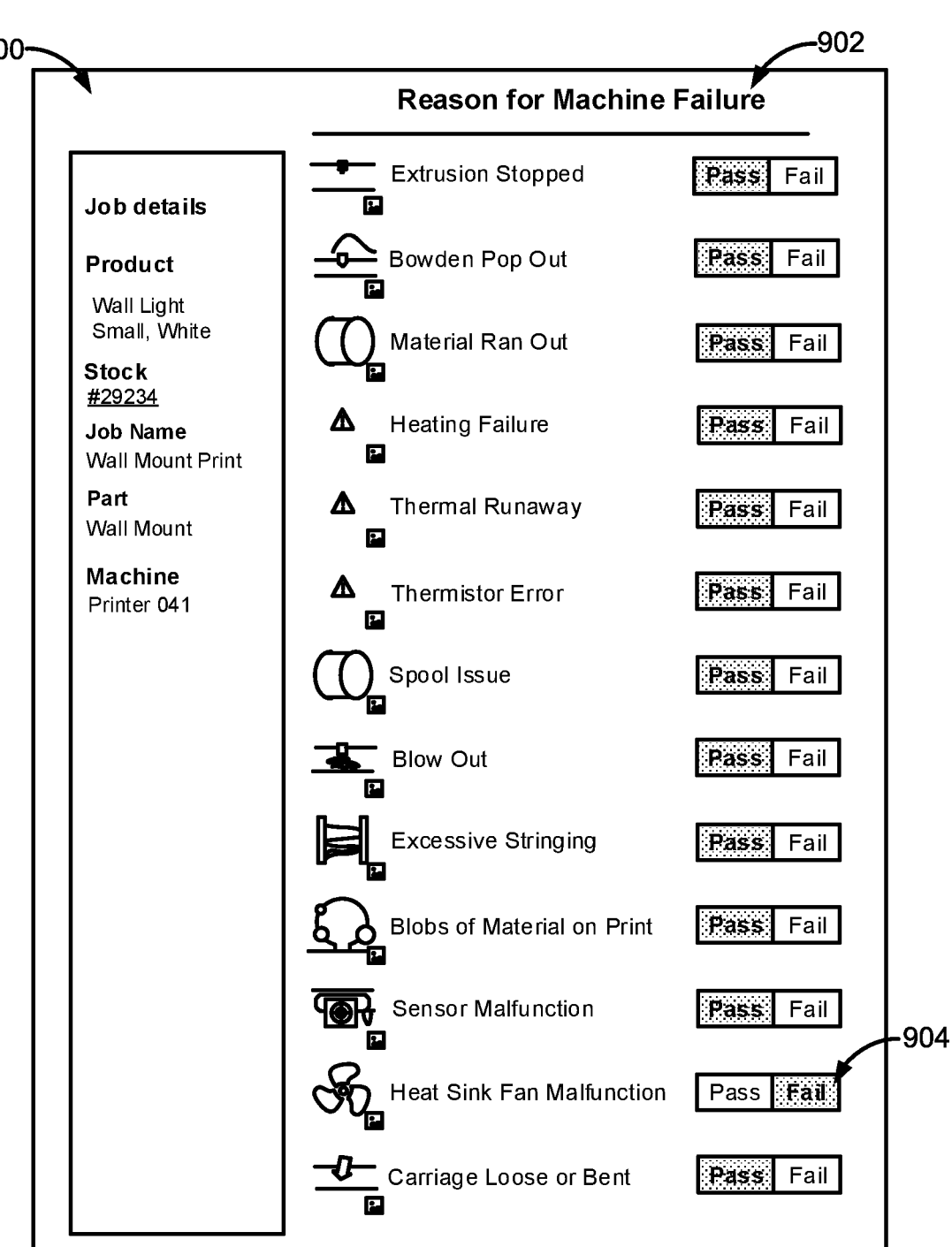
FIG. 9A illustrates one example of a machine failure screen that can be used to provide a reason for a 3D printer malfunction.

As previously discussed, a 3D-printing job 512 undertaken by one of the 3D printers 112 can fail due to a machine failure 902 (see FIG. 9A) or a print quality failure 908 (see FIG. 9B). A print quality failure 908 can occur when an end product (e.g., a 3D-printed part 400) produced as a result of the 3D-printing job 512 fails a QA inspection.

The administration server 106 can be programmed to calculate the print yield percentage 802 for each of the 3D printers 112 based on an amount of 3D-printing jobs 512 started by the 3D printer 112 that finished and an amount of 3D-printing jobs 512 started by the 3D printer 112 that failed due to a machine failure 902.

For example, the administration server 106 can be programmed to calculate the print yield percentage 802 for each of the 3D printers 112 by dividing a total number of 3D-printing jobs 512 started by the 3D printer 112 that finished by a sum of a total number of 3D-printing jobs 512 started by the 3D printer 112 that failed due to a machine failure 902 and the total number of 3D-printing jobs 512 started by the 3D printer 112 that finished (print yield percentage=total number of 3D-printing jobs started by the 3D printer that finished/(total number of 3D-printing jobs started by the 3D printer that failed due to a machine failure+total number of 3D-printing jobs started by the 3D printer that finished)).

The administration server 106 can be programmed to calculate the print QA yield percentage 804 for each of the 3D printers 112 based on an amount of 3D-printing jobs 512 finished by the 3D printer 112 that passed a QA inspection of the 3D-printed part 400 produced as a result of the finished 3D-printing job 512 and an amount of 3D-printing jobs 512 finished by the 3D printer 112 that failed the QA inspection of the 3D-printed part 400 produced as a result of the finished 3D-printing job 512.

For example, the administration server 106 can be programmed to calculate the print QA yield percentage 804 for each of the 3D printers 112 by dividing a total number of 3D-printing jobs 512 finished by the 3D printer 112 that passed the QA inspection of the 3D-printed part 400 produced as a result of the finished 3D-printing job 512 by a sum of a total number of 3D-printing jobs 512 finished by the 3D printer 112 that failed the QA inspection of the 3D-printed part 400 produced as a result of the finished 3D-printing job 512 and the total number of 3D-printing jobs 512 finished by the 3D printer 112 that passed the QA inspection of the 3D-printed part 400 produced as a result of the finished 3D-printing job 512 (print QA yield percentage=total number of 3D-printing jobs finished by the 3D printer that passed a QA inspection of the 3D-printed part produced as a result of the finished 3D-printing job/(total number of 3D-printing jobs finished by the 3D printer that failed the QA inspection of the 3D-printed part produced as a result of the finished 3D-printing job+the total number of 3D-printing jobs finished by the 3D printer that passed the QA inspection of the 3D-printed part produced as a result of the finished 3D-printing job)).

The administration server 106 can also be programmed to take certain action with respect to a 3D printer 112 based on the print yield percentage 802 and the print QA yield percentage 804 of the 3D printer 112. For example, the administration server 106 can be programmed to take certain action with respect to the 3D printer 112 when the print yield percentage 802 falls or is below a minimum print yield threshold percentage. Also, for example, the administration server 106 can be programmed to take certain action with respect to the 3D printer 112 when the print QA yield percentage 804 falls or is below a minimum print QA yield threshold percentage.

In some embodiments, the administration server 106 can be programmed to automatically take the 3D printer 112 offline or to remove the 3D printer 112 from a pool of available 3D printers based on the print yield percentage 802, the print QA yield percentage 804, or a combination thereof. For example, the administration server 106 can be programmed to automatically take the 3D printer 112 offline or to remove the 3D printer 112 from a pool of available 3D printers when the print yield percentage 802 falls or is below a minimum print yield threshold percentage (e.g., when the print yield percentage 802 falls or is below 60% or 70%). Also, for example, the administration server 106 can be programmed to automatically take the 3D printer 112 offline or to remove the 3D printer 112 from a pool of available 3D printers when the print QA yield percentage 804 falls or is below a minimum print QA yield threshold percentage (e.g., when the print QA yield percentage 804 falls or is below 50% or 60%).

Any 3D printer 112 taken offline can be designated for maintenance or diagnostic testing. The 3D printer 112 can remain offline or unavailable until the necessary maintenance or diagnostic testing is performed.

In all such embodiments, when the 3D printer 112 is taken offline or removed from a pool of available 3D printers, no further 3D-printing jobs 512 can be assigned to this 3D printer 112 by the administration server 106. Also, when a 3D printer 112 is taken offline, the ready jobs 530 (and waiting jobs 532) assigned to this 3D printer 112 can be automatically re-assigned by the administration server 106 to currently available 3D printers 112. Those ready jobs 530 (and waiting jobs 532) can then be automatically added to the printer job queues 702 of those available 3D printers 112. Those ready jobs 530 (and waiting jobs 532) can retain their point values when ranking the ready jobs 530 (and waiting jobs 532) against those jobs that were previously included in the printer job queues 702 of the available 3D printers 112.

In certain embodiments, the administration server 106 can be programmed to assign one or more high-priority 3D-printing jobs 512 or 3D-printing jobs 512 having a high point-value to a 3D printer 112 having a relatively high print yield percentage 802, a relatively high print QA yield percentage 804, or a combination thereof. For example, the administration server 106 can be programmed to assign one or more high-priority 3D-printing jobs 512 or 3D-printing jobs 512 having high point-value to a 3D printer 112 if the print yield percentage 802 of the 3D printer 112 exceeds a maximum print yield threshold percentage (e.g., if the print yield percentage 802 of the 3D printer 112 exceeds 80% or 90%). Also, for example, the administration server 106 can be programmed to assign one or more high-priority 3D-printing jobs 512 or 3D-printing jobs 512 having high point-value to a 3D printer 112 if the print QA yield percentage 804 of the 3D printer 112 exceeds a maximum print QA yield threshold percentage (e.g., if the print QA yield percentage 804 of the 3D printer 112 exceeds 70% or 80%). In these embodiments, a 3D printer 112 having a high print yield percentage 802 (i.e., the print yield percentage 802 exceeds the maximum print yield threshold percentage), a high print QA yield percentage 804 (i.e., the print QA yield percentage 804 exceeds a maximum print QA yield threshold percentage), or a combination thereof can be referred to as a high-performing 3D printer 806.

In some embodiments, the administration server 106 can also be programmed to re-assign 3D-printing jobs 512 initially assigned to one or more low-performing 3D printers 808 to one or more high-performing 3D printers 806. For example, the administration server 106 can be programmed to re-assign 3D-printing jobs 512 initially assigned to one or more low-performing 3D printers 808 to one or more high-performing 3D printer 806 if the 3D-printing jobs 512 are associated with a stock identifier 502 and where: the (i) stock yield percentage 544 associated with the stock identifier 502 falls or is below a stock yield minimum threshold percentage (e.g., 40% of 50%), the (ii) stock completion time 550 associated with the stock identifier 502 exceeds a stock completion maximum threshold time (e.g., 30 days or 60 days), the (iii) stock completion percentage 552 associated with the stock identifier 502 falls or is below a stock completion minimum threshold percentage, and the (iv)

number of total job failures 542 associated with the stock identifier 502 exceeds a total job failure threshold, or a combination thereof.

Also, for example, the administration server 106 can be programmed to re-assign a 3D-printing job 512 initially assigned to a low-performing 3D printer 808 to a high-performing 3D printer 806 if the 3D-printing job 512 is related to a specific 3D-printed part 400 and where: the (i) part completion time for the 3D-printed part 400 exceeds a part completion maximum threshold time (e.g., 20 days or 40 days), the (ii) current part yield percentages 546 for the 3D-printed part 400 falls or is below a current part yield minimum threshold percentage (e.g., 40% or 50%), the (iii) part completion percentage for the 3D-printed part 400 falls or is below a part completion minimum threshold percentage, or a combination thereof. By doing so, the administration server 106 can increase the chances that high-priority 3D-printing jobs 510 or relatively difficult 3D-printing jobs 510 are able to be completed by these high-performing 3D printers 806 without further job failures or without a significant number of further job failures.

The administration server 106 can assign or re-assign 3D-printing jobs 512 to a 3D printer 112 by adding the 3D-printing jobs 512 to the printer job queue 702 of the 3D printer 112. The administration server 106 can be programmed to continuously or periodically update or revise the printer job queues 702 of all available 3D printers 112 to account for: 3D printers 112 that go offline, re-assignment of 3D-printing jobs 510 due to low yield rates or longer than expected completion times, or a combination thereof.

FIG. 9A illustrates one embodiment of a machine failure screen 900. The machine failure screen 900 can be rendered on a display of a computing device such as a production client device 110 communicatively coupled to a 3D printer 112. For example, the production client device 110 can be used by a worker 1102 to control or operate the 3D printer 112. In other embodiments, the machine failure screen 900 can be rendered directly on a display of the 3D printer 112. In some embodiments, the machine failure screen 900 can appear as a pop-up window or modal window.

The machine failure screen 900 can be generated by the administration server 106 in response to the administration server 106 receiving a notification, message, or another type of data transmission from the production client device 110 or the 3D printer 112 that a 3D-printing job 512 started by the 3D printer 112 has failed due to a machine failure 902.

The machine failure 902 can occur when a 3D-printing job 512 undertaken by a 3D printer 112 terminates or ends before the completion of the 3D-printing job 512 due to a hardware malfunction or an issue related to one or more components of the 3D printer 112.

For example, the machine failure 902 can occur due to any one of the following reasons: (i) a malfunctioning extruder, (ii) a Bowden tube popping out, (iii) 3D-printing material running out in the middle of a print job, (iv) a heating failure, (v) a thermal runaway or excessive heating issue, (vi) a thermistor error, (vii) a spool issue, (viii) a 3D-printing material blow out, (ix) an excessive stringing issue, (x) blobs of 3D-printing material appearing on the printbed or the item printed, (xi) a sensor malfunction, (xii) a heat sink fan malfunction, and (xiii) a carriage malfunction.

In some embodiments, a worker 1102 operating the 3D printer 112 or otherwise responsible for supervising the 3D printer 112 can provide a reason for the machine failure 902 by applying one user input (e.g., a click input or a touch input) to one of several rendered icons or graphical elements 904 appearing next to each of the possible reasons for the machine failure 902. For example, as shown in FIG. 9A, the worker 1102 operating the 3D printer 112 can apply a user input to either a Pass button or a Fail button appearing next to each of the possible reasons for the machine failure 902. The administration server 106 can receive the reason for the machine failure 902 in response to the user inputs received via the machine failure screen 900.

In alternative embodiments, the 3D printer 112 can conduct a self-initiated diagnostic routine to determine a reason for the machine failure 902. In these embodiments, the 3D printer 112 can transmit the reason for the machine failure 902 directly to the administration server 106.

FIG. 9B illustrates one embodiment of a print QA screen 906. The print QA screen 906 can be rendered on a display of a computing device such as a production client device 110 assigned to a worker 1102. The print QA screen 906 can be used by the worker 1102 to communicate the results of a QA inspection of a 3D-printed part 400. The QA inspection can be part of a QA job 518 assigned to the worker job queue 1104 of the worker 1102 (see FIG. 11).

In other embodiments, the print QA screen 906 can be rendered directly on a display of a 3D printer 112 that has recently finished a 3D-printing job 512. In these embodiments, the worker 1102 can apply user inputs (e.g., click inputs or touch inputs) directly to the display of the 3D printer 112.

The worker 1102 can inspect or evaluate the 3D-printed part 400 based on a number of criteria or benchmarks. For example, as shown in FIG. 9B, the worker 1102 can inspect the 3D-printed part 400 for any print quality issues such as: (a) layer lines, (b) debris longer than 2 millimeters (mm), (c) burns longer than 2 mm, (d) over extrusion, (e) under extrusion, or (f) raft texture. The worker 1102 can report the results of the print QA inspection by applying a user input to one of several graphical icons or graphical elements 904 appearing next to each of the possible print quality issues listed on the print QA screen 906. More specifically, the worker 1102 performing the print QA inspection can apply a user input to a Pass button, a Fail button, or a Severely Failed button next to each of the possible print quality issues listed on the print QA screen 906.

In response to the worker 1102 applying a user input to either the Fail button or the Severely Failed button next to one of the print quality issues, the production client device 110 can notify the administration server 106 that a print quality failure 908 has occurred.

A 3D-printing job 512 can fail due to either a machine failure 902 (see FIG. 9A) or a print quality failure 908. A print quality failure 908 occurs when an end product (e.g., a 3D-printed part 400) produced as a result of the 3D-printing job 512 fails its QA inspection. A 3D-printing job 512 is considered complete when the 3D-printing job 512 has finished without a machine failure 902 occurring and the 3D-printed part 400 produced as a result of 3D-printing job 512 has passed its QA inspection. As previously discussed, the 3D-printing job 512 can be immediately duplicated when the 3D-printing job 512 fails due to either a machine failure 902 or a print quality failure 908.

Figure 10:
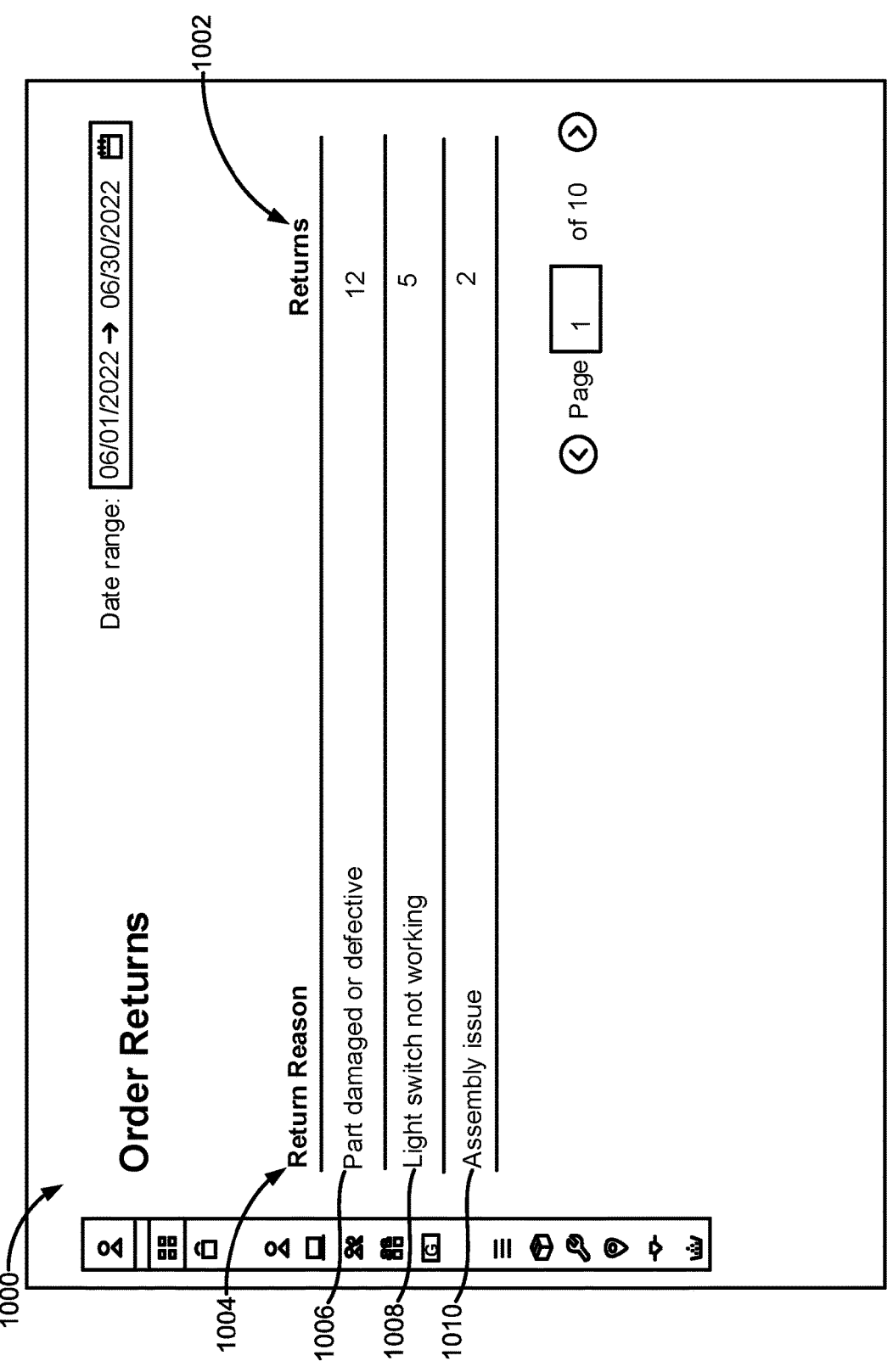
FIG. 10 illustrates an example of a returns page that can provide a real-time overview of all returns processed by the system

FIG. 10 illustrates one embodiment of a returns page 1000. The returns page 1000 can provide a real-time overview or snapshot of all returns 1002 processed by the system 100 (e.g., by the administration server 106, the retail server 102, or a combination thereof). In some embodiments, the returns page 1000 can be rendered as part of a larger dashboard screen (for example, the returns page 1000 can be rendered as a window or portion of a larger dashboard screen).

The returns page 1000 can be rendered on a display of a computing device such as one of the production client devices 110 or a device used by a foreman or manager to monitor the 3D-printing-based manufacturing process. In some embodiments, the returns page 1000 can be accessed through a web browser. In other embodiments, the returns page 1000 can be accessed through a downloadable desktop or mobile software application.

The returns page 1000 can be generated and continuously updated by the administration server 106. The returns page 1000 can be one of several panel screens, dashboard screens, graphical user interface (GUI) screens provided as part of an online administration panel or portal.

In some embodiments, the returns page 1000 can also display at least one return reason 1004. The return reason 1004 can be provided by a customer when the customer initiates the return online. The return reason 1004 can be included as part of a return order notification received by the administration server 106.

The return reason 1004 can be verified by one of the workers 1102 when the returned product 302 is received from the customer. For example, the returned product 302 received from the customer can be inspected or examined by the worker 1102 to ensure that the return reason 1004 is legitimate and in line with the condition of the returned product 302.

In some embodiments, the administration server 106 can receive the return order notification from the retail server 102 or another server programmed to process customer returns. In other embodiments, the administration server 106 can receive the return order notification directly from a computing device of the customer.

The return reason 1004 can be attributed to at least one of a defective 3D-printed part 1006, a defective standardized functional component 1008, and an assembly issue 1010. The defective 3D-printed part 1006 and the defective standardized functional component 1008 can be associated with a stock identifier 502 of the returned product 302. The assembly issue 1010 can be associated with one or more assembly jobs 516 associated with the stock identifier 502 of the returned product 302.

When the return reason 1004 is attributed to a defective 3D-printed part 1006, the administration server 106 can be programmed to trace the defective 3D-printed part 1006 associated with the stock identifier 502 to one of the 3D printers 112 assigned to print the defective 3D-printed part 1006. Since all completed jobs 524, including all completed 3D printing jobs, are stored by the administration server 106 in the administration database 108, the administration server 106 can query the administration database 108 for the 3D printer 112 assigned to print the defective 3D-printed part 1006.

In some embodiments, the administration server 106 can be programmed to adjust the print QA yield percentage 802 of the 3D printer 112 assigned to print the defective 3D-printed part 1006 in view of the return reason 1004. For example, the administration server 106 can be programmed to retroactively change the job status 522 of the 3D-printing job 512 from a completed job 524 to a failed job 528 (with the reason being a print quality failure 908). This can cause the print QA yield percentage 802 of the 3D printer 112 to decrease. The administration server 106 can also be programmed to adjust the total job failures 542 of the 3D printer 112 (increase the number of total job failures 542) to account for this new failed job 528.

In certain embodiments, the administration server 106 can be programmed to trace the defective 3D-printed part 1006 to one or more workers 1102 assigned jobs 510 associated with the defective 3D-printed part 1006. For example, a worker 1102 can be previously assigned a QA job 518 to inspect the defective 3D-printed part 1006. In this example, the administration server 106 can be programmed to retro-actively change the job status 522 of the QA job 518 from a completed job 524 to a failed job 528. The administration server 106 can also be programmed to adjust the worker yield percentage 1106 of the worker 1102 assigned the QA job 518 of inspecting the defective 3D-printed part 1006 to account for this new failed job 528.

When the return reason 1004 is attributed to a defective standardized functional component 1008, the administration server 106 can be programmed to trace the defective stan-dardized functional component 1008 to a standardized func-tional component associated with the stock identifier 502 that was incorporated into the returned product 302. For example, the defective standardized functional component 1008 can be purchased along with other standardized func-tional components 402 as part of an inventory purchase order. The administration server 106 can be programmed to trace the defective standardized functional component 1008 to the specific inventory purchase order. In some embodi-ments, the administration server 106 can be programmed to start a vendor return order related to the defective standard-ized functional component 1008. In other embodiments, the administration server 106 can be programmed to create one or more additional QA jobs 518 to inspect any other stan-dardized functional components 402 obtained as part of the same inventory purchase order for defects.

When the return reason 1004 is attributed to an assembly issue 1010, the administration server 106 can be pro-grammed to trace the assembly issue 1010 to a worker 1102 assigned an assembly job 516 for assembling the 3D-printed parts 400 of the returned product 302. The assembly job 516 can be associated with the stock identifier 502 for the returned product 302.

In some embodiments, the administration server 106 can be programmed to retroactively change the job status 522 of the assembly job 516 from a completed job 524 to a failed job 528. The administration server 106 can also be pro-grammed to adjust the worker yield percentage 1106 of the worker 1102 assigned to this assembly job 516 to account for this new failed job 528.

One technical problem faced by all manufacturers of goods is how to leverage downstream data and information concerning order returns (i.e., when such goods are returned by customers) to better improve the upstream manufacturing process for such goods. One technical solution discovered and developed by the applicant is to trace return reasons provided by the customers to one or more jobs created by the system to manufacture the returned product. For example, when a defective 3D-printed part is provided as a reason for the return, the system can trace the defective 3D-printed part to a 3D printer assigned to print the defective 3D-printed part or to a worker assigned to perform a QA inspection of the defective 3D-printed part. Moreover, when a purchased inventory item is provided as a reason for the return, the system can trace the defective purchased inventory item to a specific vendor or inventory purchase order. Furthermore, when an assembly issue is provided as a reason for the return, the system can trace the assembly issue to a worker assigned to assemble the returned product. Once the system has traced the return reason to the appropriate machine or worker, the system can make certain adjustments to the yield percentages or performance metrics of the machine or worker to take into account the order return. The 3D-printing based manufacturing process disclosed herein is able to leverage downstream data and information concerning order returns to better improve the upstream manufacturing pro-cess because the manufacturing process divides the manu-facturing process into a multitude of discrete jobs and such jobs are continuously tracked along with which machines and workers performed these jobs. That is, any problems with the product produced as a result of the 3D-printing-based manufacturing process disclosed herein can be traced to a specific job, a specific worker, a specific machine, or a specific functionalized component. This ability to trace a defective product or part thereof to a specific job, a specific worker, a specific machine, or a specific functionalized component is not possible for products mass produced using a traditional manufacturing process.

Figure 11:
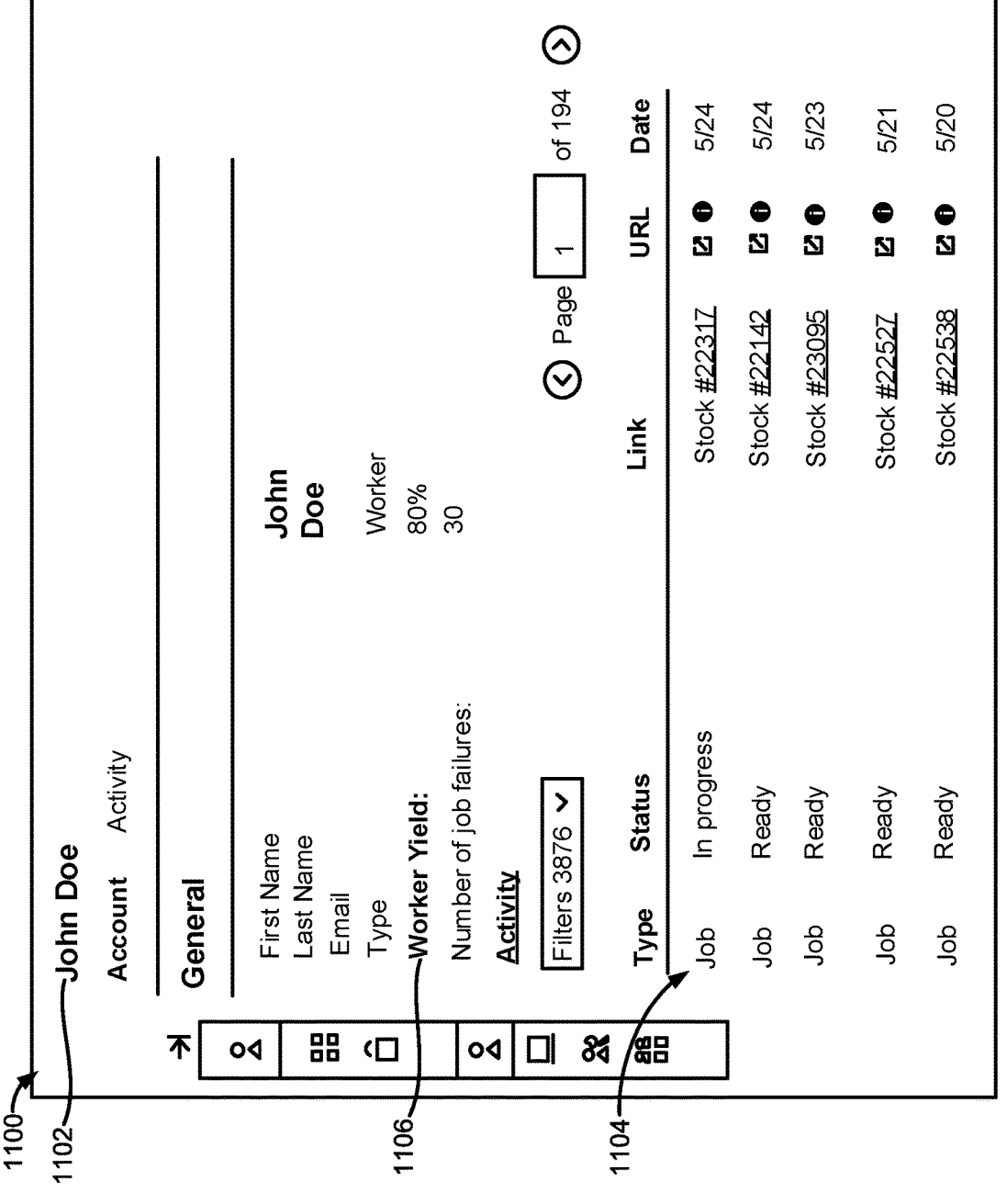
FIG. 11 illustrates an example of a worker status page that can provide a real-time overview of the work-related activities of a worker.

FIG. 11 illustrates one embodiment of a worker status page 1100. The worker status page 1100 can provide a real-time overview or snapshot of the identity and work-related activities of one of the workers 1102.

The worker status page 1100 can be rendered on a display of a computing device such as one of the production client devices 110 or a device used by a foreman or manager of the worker 1102. In some embodiments, the worker status page 1100 can be accessed through a web browser. In other embodiments, the worker status page 1100 can be accessed through a downloadable desktop or mobile software appli-cation.

In some embodiments, the worker status page 1100 can display at least part of a worker job queue 1104 of the worker 1102. As previously discussed, the administration server 106 can be programmed to generate and maintain the worker job queue 1104. The worker job queues 1104 for all of the workers 1102 can be stored as part of the administration database 108.

In some embodiments, the administration server 106 can be programmed to transmit each of worker job queues 1104 to a production client device 110 assigned to the worker 1102. In these embodiments, the administration server 106 can be programmed to continuously or periodically make updates to each of the worker job queues 1104 and transmit updated instances of each of the worker job queues 1104 to each of the production client devices 110.

The administration server 106 can also be programmed to assign ready jobs 530 (e.g., finishing jobs 514, assembly jobs 516, QA jobs 518, etc.) to a worker 1102 by adding the ready jobs 530 to the worker job queue 1104 of the worker 1102. As previously discussed, the ready jobs 530 can be added to the worker job queue 1104 in accordance with a point value associated with each of the ready jobs 530.

As previously discussed, the point value associated with a ready job 530 can be used to rank the ready job 530 against other ready jobs 530 to determine which ready jobs 530 from the worker job queue 1104 are performed first by the worker 1102.

The point value of a ready job 530 can be initially assigned or allotted when an order 300 necessitating the ready job 530 is first received by the retail server 102. The point value initially assigned or allotted to the ready job 530 can be a default amount (e.g., 10 points). This point value (beginning with the default amount on the day that the order 300 was received) can be incremented by a preset amount (e.g., 1 point) periodically (e.g., at the end of each day, each half-day, each hour, each half-hour, etc.) until the ready job 530 is performed and successfully completed by the worker 1102.

As previously discussed, some ready jobs 530 can be created in connection with order(s) 300 having a priority level 534 (e.g., a high priority level 538 or a low priority level 540) attached to the order(s) 300. For example, orders 300 placed by VIP customers or repeat customers can have a high priority level 538 assigned to such orders 300. Also, for example, orders 300 placed for testing purposes, R&D purposes, or marketing purposes can have a lower priority level 538 attached to such orders.

An order 300 having a high priority level 538 attached or otherwise assigned to the order 300 can be treated as a rush or urgent order such that ready jobs 530 associated with the order 300 can be initially assigned or allotted a greater point value than the default point value for purposes of ranking or ordering such ready jobs 530. Moreover, this greater initial point value can be incremented by a higher preset amount periodically until the job is finished or completed. In this way, the administration server 106 can be programmed to prioritize such ready jobs 530 above other jobs. This significantly decreases the completion times or lead times of such higher-priority ready jobs 530 such that there is a higher likelihood that the worker 1102 will complete the higher-priority ready jobs 530 during a worker's work shift.

In some embodiments, waiting jobs 532 can also be added to the worker job queue 1104. In these embodiments, the waiting jobs 532 can be added to the worker job queue 1104 but hidden from view such that waiting jobs 532 are not visible until the job status 522 of such jobs are changed to "ready." As previously discussed, waiting jobs 532 can also be assigned or allotted point values. This point value (beginning with the default amount on the day that the order 300 was received) can also be incremented by a preset amount (e.g., 1 point) periodically. The point value for each waiting job 532 can carry over when the status of the waiting job 532 changes to a ready job 530.

The point value of each waiting job 532 can also be initially assigned or allotted when the order 300 for the product 302 was first received by the retail server 102. The point value initially assigned or allotted to each waiting job 532 associated with the stock identifier 502 can be the same default amount (e.g., 10 points) as that assigned or allotted for each ready job 530. This point value (beginning with the default amount on the day that the order 300 was received) can also be incremented by a preset amount (e.g., 1 point) periodically (e.g., at the end of each day, each half-day, each hour, each half-hour, etc.) until the status of the waiting job 532 changes to a ready job 530 and the ready job 530 is finished or completed. The point value for each waiting job 532 can carry over when the status of the waiting job 532 changes to a ready job 530 (for example, when a particular 3D printer 112 becomes available or when an out-of-stock standardized functional component 402 is replenished). That is, the same point value accrued by the waiting job 532 then becomes the point value of the ready job 530 now taking its place In some embodiments, the point value for each of the ready jobs 530 and waiting jobs 532 can be hidden from view such that the point values are not displayed as part of any worker status pages 1100.

The worker job queue 1104 can comprise ready jobs 530 (e.g., finishing jobs 514, assembly jobs 516, QA jobs 518, etc.) associated with multiple stock identifiers 502 (or multiple products 302). In this sense, ready jobs 530 associated with one stock identifier 502 are "competing" with other ready jobs 530 associated with other stock identifiers 502 for the time of the worker 1102. Moreover, since new ready jobs 530 are likely to be added to the worker job queue 1104 before the worker 1102 can finish the ready jobs 530 already in the worker job queue 1104, those ready jobs 530 that are ranked higher in the worker job queue 1104 will have a better chance of being completed sooner.

The administration server 106 can be programmed to continuously adjust the printer job queue 702 due to: new ready jobs 530 (including any new high-priority ready jobs 530) being added as a result of new incoming orders 300, the statuses of waiting jobs 532 change to ready jobs 530, the statuses of ready jobs 530 change to waiting jobs 532 due to a change in circumstances (e.g., 3D printing material or standardized functional component(s) 402 become unavailable, etc.), certain ready jobs 530 are successfully completed, and certain ready jobs 530 end in failure and are duplicated as duplicated jobs 608.

Moreover, as previously discussed, the administration server 106 can also be programmed to adjust the worker job queue 1104 of each of the workers 1102 by elevating the rank or order of one or more ready jobs 530 in the worker job queue 1104 due to at least one of: a stock completion time 550, a part completion time, a stock yield percentage 544, a current part yield percentage 546, a stock completion percentage 552, a part completion percentage, and a total number of job failures 542.

For example, the administration server 106 can be programmed to increment or raise the point values of all ready jobs 532 (and, in some cases, waiting jobs 532) associated with a stock identifier 502 (i) if the stock yield percentage 544 associated with the stock identifier 520 falls or is below a stock yield minimum threshold percentage, (ii) if an applicable current part yield percentage 546 falls or is below a current part yield minimum threshold percentage, (iii) if the stock completion time 550 exceeds a stock completion maximum threshold time, (iv) if an applicable part completion time exceeds a part completion maximum threshold time, (v) if the stock completion percentage 552 falls or is below a stock completion minimum threshold percentage after a minimum amount of time has passed, (vi) if an applicable part completion percentage falls or is below a part completion minimum threshold percentage after a minimum amount of time has passed, if (vii) the number of total job failures 542 exceeds a total job failure threshold, or a combination thereof. The administration server 106 can be programmed to increment or raise the point values of such ready jobs 532 (and, in some cases, waiting jobs 532) associated with the stock identifier 502 by adding additional points to the current point value, multiplying the current point value by a preset amount, or squaring the current point value.

In some embodiments, a ready job 530 appearing first or on the top of the worker job queue 1104 can have its job status 522 changed from "ready" to "in progress" when the ready job 530 is started by a worker 1102. If this in progress job 526 proceeds to completion, the job status 522 can be changed to "completed." If this in progress job 526 ends in failure, the job status 522 can be changed to "failed."

The administration server 106 can be programmed to track the number of failed jobs 528 attributed to each of the workers 1102. In some embodiments, the administration server 106 can be programmed to calculate and track a worker yield percentage 1106 for each of the workers 1102. The administration server 106 can be programmed to calculate the worker yield percentage 1106 based on an amount of failed jobs 528 and an amount of completed jobs 524 attributed to the worker 1102. For example, the administration server 106 can be programmed to calculate the worker yield percentage 1106 by dividing the total number of completed jobs 524 attributed to the worker 1102 by a sum of the total number of failed jobs 528 and the total number of completed jobs 524 attributed to the worker 1102 (worker yield percentage=total number of completed jobs attributed to a worker/(total number of failed jobs+total number of completed jobs attributed to the worker)).

In some embodiments, the worker yield percentage 1106 for a worker 1102 can be calculated or updated each time the worker 1102 completes a job or fails a job. The worker yield percentage 1106 can provide real-time insights into the efficiency, skillfulness, and competency of a worker 1102.

In certain embodiments, the administration server 106 can also be programmed to track the number consecutive failed jobs attributed to the worker 1102 (i.e., the number of consecutive jobs 510 undertaken by the worker 1102 that ended in failure).

The administration server 106 can be programmed to take certain action with respect to the worker 1102 based on the worker yield percentage 1106, the number of consecutive failed jobs, or a combination thereof. For example, the administration server 106 can be programmed to take certain action with respect to the worker 1102 when the worker yield percentage 1106 falls below a worker yield threshold percentage. As another example, the administration server 106 can be programmed to take certain action with respect to the worker 1102 when the number of consecutive failed jobs exceeds a threshold amount.

In some embodiments, the administration server 106 can be programmed to remove the worker 1102 from a pool of available workers 1102 or designate the worker 1102 for further training or evaluation if the worker yield percentage 1106 falls below or is below a worker yield threshold percentage. The administration server 106 can also be programmed to remove the worker 1102 from a pool of available workers 1102 or designate the worker 1102 for further training or evaluation if the number of consecutive failed jobs exceeds a threshold amount (e.g., when the worker 1102 fails three consecutive jobs).

When a worker 1102 is removed from the pool of available workers 1102 or is designated for further training/evaluation, no further ready jobs 530 (or waiting jobs 532) can be added to the worker job queue 1104 of this worker 1102. Also, when the worker 1102 is removed from the pool of available workers 1102 or is designated for further training/evaluation, the ready jobs 530 (and waiting jobs 532) assigned to this worker 1102 can be automatically re-assigned by the administration server 106 to currently available workers 1102. Those ready jobs 530 (and waiting jobs 532) can then be automatically added to the worker job queues 1104 of those available workers 1102. Those ready jobs 530 (and waiting jobs 532) can retain their point values when ranking the ready jobs 530 (and waiting jobs 532) against those jobs that were previously included in the worker job queues 1104 of the available workers 1102.

Figure 12:
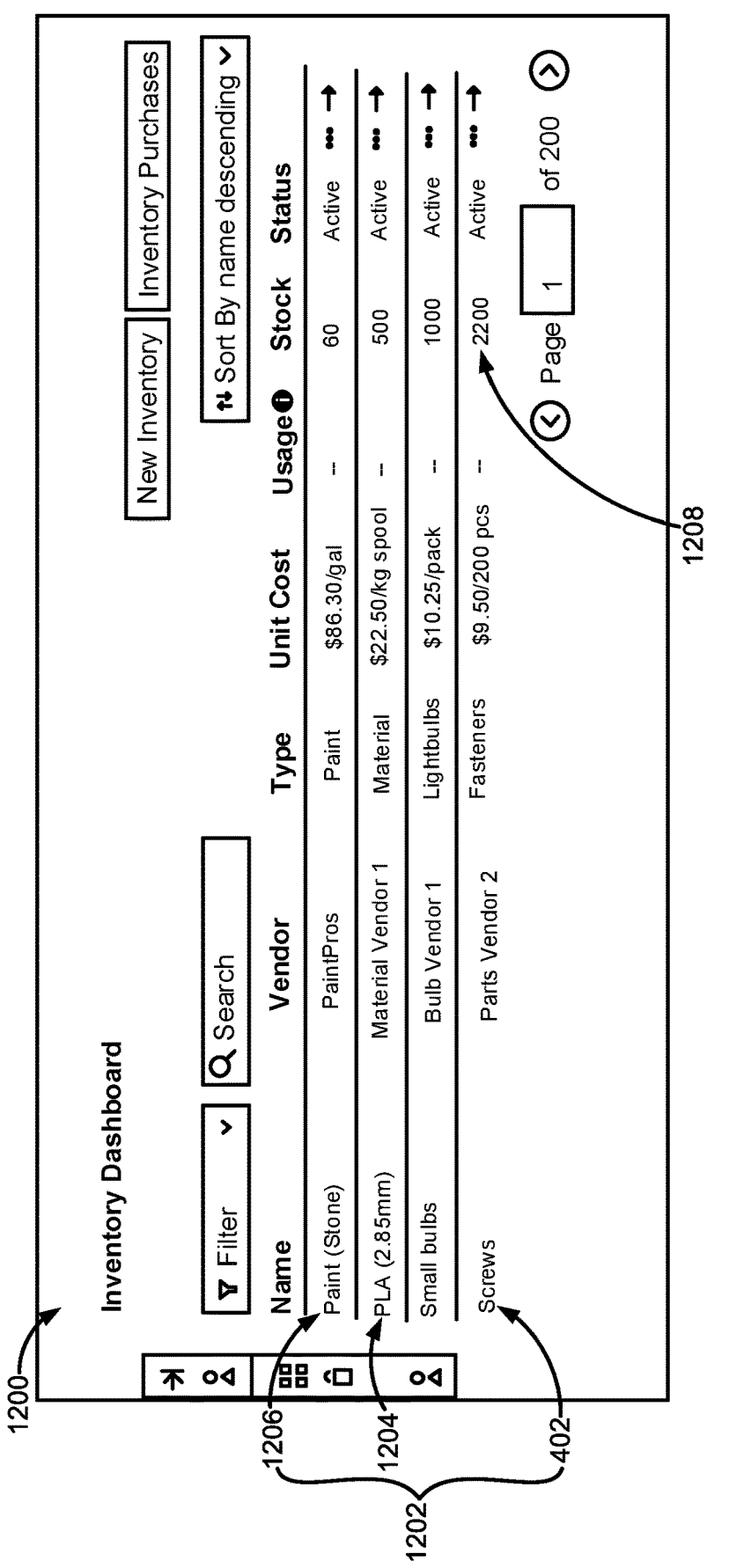
FIG. 12 illustrates an example of an inventory dashboard page that can provide a real-time overview of the amount of inventory items currently in stock.

FIG. 12 illustrates one embodiment of an inventory dashboard page 1200 that can be provided as part of an online administration panel or portal. The inventory dashboard page 1200 can provide a real-time overview or snapshot of the amount of inventory items 1202 currently in stock. The inventory items 1202 can refer to all non-3D-printed items that are needed to manufacture the products 302. For example, the inventory items 1202 can comprise a variety of standardized functional components 402, 3D-printing materials 1204, paints 1206, and adhesives. The inventory items

1202 can also comprise items or tools needed to assemble, pack, and ship the products 302. The inventory items can be purchased from a variety of vendors.

The inventory dashboard page 1200 can be rendered on a display of a computing device such as one of the production client devices 110 or a device used by a foreman or manager to monitor the 3D-printing-based manufacturing process. In some embodiments, the inventory dashboard page 1200 can be accessed through a web browser. In other embodiments, the inventory dashboard page 1200 can be accessed through a downloadable desktop or mobile software application.

The inventory dashboard page 1200 can be generated and continuously updated by the administration server 106. The inventory dashboard page 1200 can be one of several panel screens, dashboard screens, graphical user interface (GUI) screens provided as part of an online administration panel or portal.

As shown in FIG. 12, the inventory dashboard page 1200 can display an inventory level 1208 for each of the inventory items 1202. The inventory level 1208 can be the amount of an inventory item 1202 remaining in stock. The inventory dashboard page 1200 can also display the unit cost of each inventory item 1202.

In some embodiments, the administration server 106 can update the inventory level 1208 of the inventory items 1202 (e.g., the standardized functional components 402, the 3D-printing materials 1204, the paints 1206, the adhesives, etc.) immediately after the creation of each job 510 or series of jobs 510 associated with each incoming order 300. For example, the inventory level 1208 of the specific inventory items 1202 needed to manufacture the product(s) 302 contained in the order 300 can be decremented to match the jobs 510 (including the 3D-printing jobs 512, the finishing jobs 514, the assembly jobs 516, and the packing jobs 520) created by the administration server 106.

The inventory level 1208 of the inventory items 1202 can be decremented to match a usage level based on the jobs 510 created. For example, the inventory level 1208 of the inventory items 1202 can be decremented to match a usage level based on the assumption that all jobs 510 created in order to manufacture the product(s) 302 contained in the order 300 would be completed without any job failures.

In some embodiments, the inventory level 1208 of the inventory items 1202 can be decremented to match a usage level based on the jobs 510 created for each order 300 or each product 302 and an estimated amount of duplicated jobs 608 (see FIG. 6) due to projected job failures. The estimated amount of duplicated jobs 608 can be calculated based on one or more historical part yield percentages 548 (see FIG. 5A), SKU yield percentages, total job failures 542 recorded by the administration server 106 for past products 302 manufactured, or a combination thereof.

The administration server 106 can then automatically order additional inventory items 1202 when the inventory level 1208 of any of the inventory items 1202 falls below an inventory threshold. For example, the administration server 106 can automatically order more paint of a certain color when the inventory level 1208 of this paint (or the amount of paint currently in stock at the production facility) falls below 50 gallons.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated herein by reference in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved. Finally, terms of degree such as "substantially", "about" and "approximately" as used herein mean a reasonable amount of deviation (e.g., a deviation of up to ±0.1%, ±1%, ±5%, or ±10%, as such variations are appropriate) from the specified value such that the end result is not significantly or materially changed.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

I claim:

1. A method of administering a 3D-printing-based manufacturing process, comprising:

receiving an order from a computing device of a customer, wherein the order comprises a product made of 3D-printed parts and one or more standardized functional components;

generating, at an administration server, a stock identifier used to identify the product during and after manufacturing;

creating, at the administration server, a plurality of jobs to be undertaken to manufacture the product, wherein the stock identifier is associated with each of the jobs, and wherein the jobs comprise 3D-printing jobs to print the 3D-printed parts, finishing jobs to finish each of the 3D-printed parts, assembly jobs to assemble the 3D-printed parts and the one or more standardized functional components into an assembled product, quality assurance jobs to inspect the 3D-printed parts and the assembled product, and packing jobs to pack the assembled product;

assigning, at the administration server, a job status to each of the plurality of jobs associated with the stock identifier based on a job order, an availability of one or more 3D printers, an availability of one or more workers, and an inventory level of the one or more standardized functional components and 3D-printing materials and continuously updating the job status of each of the jobs based on one or more completed jobs, the availability of one or more 3D printers, the availability of one or more workers, and the inventory level of the one or more standardized functional components and 3D-printing materials;

assigning at least one 3D-printing job associated with the stock identifier to one of the 3D printers by adding the 3D-printing job to a printer job queue of the 3D printer; and printing one of the 3D-printed parts using the 3D printer as part of the 3D-printing job added to the printer job queue by executing machine-readable instructions at the 3D printer.

2. The method of claim 1, further comprising:

assigning one of the jobs associated with the stock identifier to one of the workers by adding the job to a worker job queue of the worker;

calculating, at the administration server, a stock yield percentage based in part on a total amount of completed jobs and a total amount of failed jobs associated with the stock identifier during the manufacturing process;

calculating a part yield percentage based in part on a total amount of completed jobs and a total amount of failed jobs associated with the manufacturing of one 3D-printed part of the product, wherein the 3D-printed part is also associated with the stock identifier; and adjusting the printer job queue of the 3D printer such that the jobs associated with the stock identifier and assigned to the 3D printer ranks higher in the printer job queue than other jobs not associated with the stock identifier or adjusting the worker job queue of the worker such that the jobs associated with the stock identifier and assigned to the worker ranks higher in the worker job queue than other jobs not associated with the stock identifier due in part to least one of the stock yield percentage and the part yield percentage calculated.

3. The method of claim 2, further comprising:

automatically duplicating, at the administration server, one of the failed jobs associated with the stock identifier resulting in a duplicated job associated with the stock identifier, wherein calculating the stock yield percentage further comprises factoring in an outcome of the duplicated job into any calculations of the stock yield percentage, and wherein calculating the part yield percentage further comprises factoring in the outcome of the duplicated job into any calculations of the part yield percentage of a 3D-printed part when the duplicated job is needed to manufacture the 3D-printed part; and assigning the duplicated job associated with the stock identifier to one of the 3D printers or one of the workers by adding the duplicated job to the printer job queue of the 3D printer or adding the duplicated job to the worker job queue of the worker.

4. The method of claim 2, further comprising:

pre-emptively duplicating one or more of the jobs created to manufacture one of the 3D-printed parts of the product when a historical part yield percentage calculated by the administration server falls below a threshold percentage; and automatically assigning the pre-emptively duplicated job to one of the 3D printers or workers.

5. The method of claim 2, further comprising:

calculating a print yield percentage of one of the 3D printers over a period of time, wherein the print yield percentage is calculated based on an amount of 3D-printing jobs started by the 3D printer that completed and an amount of 3D-printing jobs started by the 3D printer that failed due to a machine failure during this period of time;

calculating a print quality assurance (print QA) yield percentage of the 3D printer over the period of time, wherein the print QA yield percentage is calculated based on an amount of 3D-printing jobs finished by the 3D printer that failed a QA inspection of a 3D-printed part produced as a result of the finished 3D-printing job and an amount of 3D-printing jobs finished by the 3D printer that passed the QA inspection of the 3D-printed part produced as a result of the finished 3D-printing job;

automatically taking the 3D printer offline based on at least one of the print yield percentage and the print QA yield percentage, wherein no further 3D-printing job is automatically assigned to the 3D printer by the administration server when the 3D printer is offline.

6. The method of claim 2, further comprising:

tracking a number of consecutive failed jobs of the 3D printer; and automatically taking the 3D printer offline based on the number of consecutive failed jobs, wherein no further 3D-printing job is automatically assigned to the 3D printer by the administration server when the 3D printer is offline.

7. The method of claim 2, further comprising:

tracking a worker yield percentage of the worker, wherein the worker yield percentage is calculated based on an amount of failed jobs and an amount of completed jobs assigned to the worker; and removing the worker from a set of available workers or designating the worker for further training when the worker yield percentage falls below a worker yield percentage threshold, wherein no further jobs are automatically assigned to the worker by the administration server when the worker is removed from the set of available workers.

8. The method of claim 1, wherein the product is associated with a stock keeping unit (SKU) identifier and product class, and wherein the method further comprises:

calculating a SKU yield percentage based on an amount of failed jobs and an amount of completed jobs associated with the SKU identifier over multiple orders;

calculating a product class yield percentage based on an amount of failed jobs and an amount of completed jobs associated with the product class over multiple orders; and increasing a price of the product associated with the SKU identifier when the SKU yield percentage falls below a SKU yield threshold percentage or increasing a price of all products included within the product class when the product class yield percentage falls below a product class yield threshold percentage.

9. The method of claim 1, further comprising:

receiving a second order from another computing device, wherein the second order is a high-priority order, wherein the second order comprises a second product, and wherein the second product comprises a second set of 3D-printed parts and standardized functional components;

generating, at the administration server, a second stock identifier used to identify the second product during and after manufacturing;

creating, at the administration server, a plurality of second jobs to be undertaken to manufacture the second product, wherein the second stock identifier is associated with each of the second jobs;

automatically assigning at least some of the second jobs to one or more 3D printers; and prioritizing, at the administration server, the completion of the second jobs associated with the second stock identifier by ranking the second jobs above other jobs not associated with the second stock identifier in the printer job queue of one of the 3D printers.

10. The method of claim 1, further comprising:

receiving, at the administration server, a return order notification for the product having a return reason, wherein the return reason is attributed to at least one of:

a defective 3D-printed part, wherein the defective 3D-printed part is associated with the stock identifier, a defective standardized functional component, and an assembly issue;

tracing the defective 3D-printed part associated with the stock identifier to one of the 3D printers assigned to print the defective 3D-printed part if the return reason is attributed to the defective 3D-printed part;

tracing the defective 3D-printed part associated with the stock identifier to one or more workers assigned jobs associated with the defective 3D-printed part if the return reason is attributed to the defective 3D-printed part;

tracing the defective standardized functional component to a standardized functional component associated with the stock identifier that was incorporated into the product if the return reason is attributed to the defective standardized functional component; and tracing the assembly issue to one or more workers assigned to assembly jobs for assembling the 3D-printed parts for the product if the return reason is attributed to the assembly issue, wherein the assembly jobs are associated with the stock identifier.

11. A system for administering a 3D-printing-based manufacturing process, comprising:

a plurality of 3D printers; and a server comprising one or more processors, wherein the one or more processors are programmed to execute instructions to:

receive an order from a computing device of a customer or a retail server, wherein the order comprises a product made of 3D-printed parts and one or more standardized functional components;

generate a stock identifier used to identify the product during and after manufacturing;

create a plurality of jobs to be undertaken to manufacture the product, wherein the stock identifier is associated with each of the jobs, and wherein the jobs comprise 3D-printing jobs to print the 3D-printed parts, finishing jobs to finish each of the 3D-printed parts, assembly jobs to assemble the 3D-printed parts and the one or more standardized functional components into an assembled product, quality assurance jobs to inspect the 3D-printed parts and the assembled product, and packing jobs to pack the assembled product;

assign a job status to each of the plurality of jobs associated with the stock identifier based on a job order, an availability of the 3D printers, an availability of one or more workers, and an inventory level of the one or more standardized functional components and 3D-printing materials and continuously updating the job status of each of the jobs based on one or more completed jobs, the availability of one or more 3D printers, the availability of one or more workers, and the inventory level of the one or more standardized functional components and 3D-printing materials; and assign at least one 3D-printing job associated with the stock identifier to one of the 3D printers by adding the 3D-printing job to a printer job queue of the 3D printer, and wherein one of the plurality of 3D printer is configured to print one of the 3D-printed parts as part of the 3D-printing job added to the printer job queue by executing machine-readable instructions at the 3D printer.

12. The system of claim 11, wherein the one or more processors are programmed to execute further instructions to:

assign one of the jobs associated with the stock identifier to one of the workers by adding the job to a worker job queue of the worker;

calculate a stock yield percentage based in part on a total amount of completed jobs and a total amount of failed jobs associated with the stock identifier during the manufacturing process;

calculate a part yield percentage based in part on a total amount of completed jobs and a total amount of failed jobs associated with the manufacturing of one 3D-printed part of the product, wherein the 3D-printed part is also associated with the stock identifier; and adjust the printer job queue of the 3D printer such that the jobs associated with the stock identifier and assigned to the 3D printer ranks higher in the printer job queue than other jobs not associated with the stock identifier or adjusting the worker job queue of the worker such that the jobs associated with the stock identifier and assigned to the worker ranks higher in the worker job queue than other jobs not associated with the stock identifier due in part to least one of the stock yield percentage and the part yield percentage calculated.

13. The system of claim 12, wherein the one or more processors are programmed to execute further instructions to:

automatically duplicate one of the failed jobs associated with the stock identifier resulting in a duplicated job associated with the stock identifier, wherein calculating the stock yield percentage further comprises factoring in an outcome of the duplicated job into any calculations of the stock yield percentage, and wherein calculating the part yield percentage further comprises factoring in the outcome of the duplicated job into any calculations of the part yield percentage of a 3D-printed part when the duplicated job is needed to manufacture the 3D-printed part; and assign the duplicated job associated with the stock identifier to one of the 3D printers or one of the workers by adding the duplicated job to the printer job queue of the 3D printer or adding the duplicated job to the worker job queue of the worker.

14. The system of claim 12, wherein the one or more processors are programmed to execute further instructions to:

pre-emptively duplicate one or more of the jobs created to manufacture one of the 3D-printed parts of the product when a historical part yield percentage calculated by the administration server falls below a threshold percentage; and automatically assign the pre-emptively duplicated job to one of the 3D printers or workers.

15. The system of claim 12, wherein the one or more processors are programmed to execute further instructions to:

calculate a print yield percentage of one of the 3D printers over a period of time, wherein the print yield percentage is calculated based on an amount of 3D-printing jobs started by the 3D printer that completed and an amount of 3D-printing jobs started by the 3D printer that failed due to a machine failure during this period of time;

calculate a print quality assurance (print QA) yield percentage of the 3D printer over the period of time, wherein the print QA yield percentage is calculated based on an amount of 3D-printing jobs finished by the 3D printer that failed a QA inspection of a 3D-printed part produced as a result of the finished 3D-printing job and an amount of 3D-printing jobs finished by the 3D printer that passed the QA inspection of the 3D-printed part produced as a result of the finished 3D-printing job;

automatically take the 3D printer offline based on at least one of the print yield percentage and the print QA yield percentage, wherein no further 3D-printing job is automatically assigned to the 3D printer by the administration server when the 3D printer is offline.

16. The system of claim 12, wherein the one or more processors are programmed to execute further instructions to:

track a worker yield percentage of the worker, wherein the worker yield percentage is calculated based on an amount of failed jobs and an amount of completed jobs assigned to the worker; and remove the worker from a set of available workers or designating the worker for further training when the worker yield percentage falls below a worker yield percentage threshold, wherein no further jobs are automatically assigned to the worker by the administration server when the worker is removed from the set of available workers.

17. The system of claim 11, wherein the one or more processors are programmed to execute further instructions to:

track a number of consecutive failed jobs of the 3D printer; and automatically take the 3D printer offline based on the number of consecutive failed jobs, wherein no further 3D-printing job is automatically assigned to the 3D printer by the administration server when the 3D printer is offline.

18. The system of claim 11, wherein the product is associated with a stock keeping unit (SKU) identifier and product class, wherein the one or more processors are programmed to execute further instructions to:

calculate a SKU yield percentage based on an amount of failed jobs and an amount of completed jobs associated with the SKU identifier over multiple orders;

calculate a product class yield percentage based on an amount of failed jobs and an amount of completed jobs associated with the product class over multiple orders; and increase a price of the product associated with the SKU identifier when the SKU yield percentage falls below a SKU yield threshold percentage or increasing a price of all products included within the product class when the product class yield percentage falls below a product class yield threshold percentage.

19. The system of claim 11, wherein the one or more processors are programmed to execute further instructions to:

receive a return order notification for the product having a return reason, wherein the return reason is attributed to at least one of:

a defective 3D-printed part, wherein the defective 3D-printed part is associated with the stock identifier, a defective standardized functional component, and an assembly issue;

trace the defective 3D-printed part associated with the stock identifier to one of the 3D printers assigned to print the defective 3D-printed part if the return reason is attributed to the defective 3D-printed part;

trace the defective 3D-printed part associated with the stock identifier to one or more workers assigned jobs associated with the defective 3D-printed part if the return reason is attributed to the defective 3D-printed part;

trace the defective standardized functional component to a standardized functional component associated with the stock identifier that was incorporated into the product if the return reason is attributed to the defective standardized functional component; and trace the assembly issue to one or more workers assigned to assembly jobs for assembling the 3D-printed parts for the product if the return reason is attributed to the assembly issue, wherein the assembly jobs are associated with the stock identifier.

\* \* \* \* \*